(12) United States Patent
Heishi et al.

(10) Patent No.: US 8,151,254 B2
(45) Date of Patent: *Apr. 3, 2012

(54) COMPILER, COMPILER APPARATUS AND COMPILATION METHOD

(75) Inventors: Taketo Heishi, Osaka (JP); Toshiyuki Sakata, Osaka (JP); Hajime Ogawa, Suita (JP); Ryoko Miyachi, Hirakata (JP); Shuji Miyasaka, Neyagawa (JP); Tomokazu Ishikawa, Toyonaka (JP)

(73) Assignee: Panasonic Corporation, Osaka (JP)

( * ) Notice: Subject to any disclaimer, the term of this patent is extended or adjusted under 35 U.S.C. 154(b) by 1353 days.

This patent is subject to a terminal disclaimer.

(21) Appl. No.: 11/790,215

(22) Filed: Apr. 24, 2007

(65) Prior Publication Data
US 2007/0256065 A1 Nov. 1, 2007

Related U.S. Application Data

(62) Division of application No. 10/630,705, filed on Jul. 31, 2003, now Pat. No. 7,284,241.

(30) Foreign Application Priority Data

Aug. 2, 2002 (JP) .................................. 2002-226682

(51) Int. Cl.
*G06F 9/45* (2006.01)

(52) U.S. Cl. ....................................................... 717/151

(58) Field of Classification Search .................. None
See application file for complete search history.

(56) References Cited

U.S. PATENT DOCUMENTS

| 5,758,164 | A | 5/1998 | Inoue |
| 5,822,588 | A | 10/1998 | Sterling et al. |
| 6,113,650 | A | 9/2000 | Sakai |
| 6,247,174 | B1 | 6/2001 | Santhanam et al. |
| 6,460,177 | B1 * | 10/2002 | Lee ................................ 717/146 |
| 6,851,040 | B2 * | 2/2005 | Anvin et al. ................... 711/220 |
| 6,931,635 | B2 | 8/2005 | Inagaki et al. |

(Continued)

FOREIGN PATENT DOCUMENTS

EP 0 633 526 A2 7/1994

(Continued)

OTHER PUBLICATIONS

Partial European Search Report issued Apr. 2, 2009 in European Application No. 07 01 3451.

(Continued)

*Primary Examiner* — Philip Wang
(74) *Attorney, Agent, or Firm* — Wenderoth, Lind & Ponack, L.L.P.

(57) ABSTRACT

An operator definition file 102 and the like included in a source program 101 and a compiler 100 that translates the source program 101 into a machine language program 105 are provided. The operator definition file 102 includes definitions of various fixed point type operators by class definitions. The compiler 100 can generate effectively advanced and specific instructions that a processor executes and make improvements through expanding functions and the like without repeating frequently upgrading of the version of the compiler itself. The compiler 100 is made up of an intermediate code generation unit 121 that generates intermediate codes, a machine language instruction substitution unit 122 that substitutes the intermediate codes referring to classes defined by the operator definition file 102 with machine language instructions and an optimization unit 130 that performs optimization targeting the intermediate codes including the substituted machine language instructions.

30 Claims, 71 Drawing Sheets

U.S. PATENT DOCUMENTS

| | | | | |
|---|---|---|---|---|
| 7,284,241 | B2* | 10/2007 | Heishi et al. | 717/152 |
| 7,530,062 | B2* | 5/2009 | Aronson et al. | 717/159 |
| 7,543,283 | B2* | 6/2009 | Luk et al. | 717/153 |
| 2002/0188830 | A1* | 12/2002 | Boles et al. | 712/224 |
| 2003/0023960 | A1* | 1/2003 | Khan et al. | 717/152 |
| 2004/0006667 | A1 | 1/2004 | Bik et al. | |
| 2004/0064301 | A1 | 4/2004 | Kondo et al. | |

FOREIGN PATENT DOCUMENTS

| | | |
|---|---|---|
| EP | 0 806 725 A2 | 11/1997 |
| EP | 0 947 923 | 10/1999 |
| EP | 1 113 356 A2 | 7/2001 |
| JP | 2-236732 | 9/1990 |
| JP | 5-94310 | 4/1993 |
| JP | 2000-056981 | 2/2000 |
| JP | 2001-273150 | 10/2001 |
| JP | 2004-13190 | 1/2004 |

OTHER PUBLICATIONS

European Search Report issued Apr. 7, 2009 in European Application No. 07 01 3450.

Jiyang Kang, et al., "A 2-Way VLIW Processor Architecture for Embedded Multimedia Applications", Signal Processing Systems, 1999, SIPS 99, 1999 IEEE Workshop on Taipei, Taiwan, Oct. 20-22, 1999, Piscataway, NJ, USA, IEEE, US, Oct. 20, 1999, pp. 211-220, XP010370866, ISBN: 978-0-7803-5650-4.

H. Emmelmann et al., "BEG—a Generator for Efficient Back Ends", ACM SIGPLAN Notices, ACM, Association for Computing Machinery, New York, NY, US, vol. 24, No. 7, Jul. 1, 1989, pp. 227-237, XP002380273.

Yung-Chia Lin et al., "Compiler Optimizations with DSP-Specific Semantic Descriptions", Proceedings of the 15$^{th}$ Workshop on Languages and Compilers for Parallel Computing, LCPC 2002, [Online], Jul. 2002, pp. 1-15, XP002520726.

Alberto La Rosa et al., "A Software Development Tool Chain for a Reconfigurable Processor", Proceedings of the 2001 International Conference on Compilers, Architecture, and Synthesis for Embedded Systems, Cases '01, Atlanta, Georgia, USA, Nov. 16-17, 2001, pp. 93-98, XP002520727.

Santosh G. Abraham et al., "Predictability of Load/Store Instruction Latencies", Microarchitecture, 1993, Proceedings of the 26$^{th}$ Annual International Symposium on Austin, TX, USA, Dec. 1-3, 1993, Los Alamitos, CA, USA, IEEE Comput. Soc., US, Dec. 1, 1993, pp. 139-152, XP010097289, ISBN: 978-0-8186-5280-6.

Tremblay, M. et al., "VIS Speeds New Media Processing", IEEE Micro, IEEE Inc. New York, US, vol. 16, No. 4, Aug. 1, 1996; pp. 10-20 (XP000596509).

"VIS Instructions Set User's Manual", May 2001, Sun Microsystems, Palo Alto (XP002307554).

Shi, Hao et al., "C/C++ Compiler Support for Siemens Tricore DSP Instruction Set", Acoustics, Speech, and Signal Processing, 1999. Proceedings., 1999 IEEE International Conference on Phoenix, AZ, USA, IEEE, US, Mar. 15, 1999, pp. 2147-2150 (XP010327807).

Bertin, V. et al., "FLEXCC2: An Optimizing Retargetable C Compiler for DSP Processors", Embedded Software. Second International Conference, EMSOFT 2002, Proceedings (Lecture Notes in Computer Science vol. 2491) Springler-Verlag Berlin, Germany, Oct. 2002, pp. 382-398 (XP002307133).

Glossner, J., et al. "Trends in Compilable DSP Architecture", IEEE Workshop on Signal Processing Systems. SIPS 2000. Design and Implementation, Oct. 11, 2000, pp. 181-199 (XP010525228).

Wagner, J., et al. "C Complier Design for an Industrial Network Processor", Sigplan Notices ACM USA, vol. 36, No. 8, Aug. 2001, pp. 155-164 (XP002307134).

Batten, D. et al., "A New Approach to DSP Intrinsic Functions", Proceedings of the 33rd Hawaii International Conference on System Sciences, Jan. 4, 2000, pp. 2892-2901 (XP010545579).

Roodzant, M. "Real-Time DSP Applications Benefit From High-Level Language Compilation", Real-Time Magazine Real-Time Consult, Belgium, Apr. 1999, p. 40, 54 (XP002307135).

Chikumi Yoshino; entitled "GNU Struggle Record—6—GNU CC ASM Statement and Interrupt Handling", Sep. 1, 1990.

Shusuke Haruna et al.; entitled "Optimization of CC++ Programs for Embedded Systems", May 15, 1999.

Toshiyuki Sakata; entitled "Extended C Language Compiler for Multimedia", Matsushita Technical Journal, vol. 45, No. 1, Feb. 18, 1999.

Masahiro Yasugi, et al.; entitled "Primitives for Shared Memory and its Implementation with GCC", vol. 43, No. SIG 1 (PRO 13), Jan. 15, 2002.

Akira Hosoi et al.; entitled "MIR-Description: Mechanism for Efficient Media Code Generation", Aug. 4, 1999.

A Communication entitled "Summons to attend oral proceedings pursuant to Rule 115(1) EPC" issued Feb. 1, 2010 in corresponding European Application No. 03 016 683.

Joe H. Wolf, III, "Programming Methods for the Pentium® III Processor's Streaming SIMD Extensions Using the VTune™ Performance Enhancement Environment", Intel Technology Journal, vol. 3, No. 2, May 1999, pp. 1-11, XP007910978.

* cited by examiner

Fig. 11

| Bit | 31 | 30 | 29 | 28 | 27 | 26 | 25 | 24 |
|---|---|---|---|---|---|---|---|---|
| Bit name | reserved | SWE | FXP | reserved | IH | EH | PL | |
| Bit | 23 | 22 | 21 | 20 | 19 | 18 | 17 | 16 |
| Bit name | FIE3 | FIE2 | FIE1 | FIE0 | reserved | reserved | AEE | IE |
| Bit | 15 | 14 | 13 | 12 | 11 | 10 | 9 | 8 |
| Bit name | Reserved | | | | | | | |
| Bit | 7 | 6 | 5 | 4 | 3 | 2 | 1 | 0 |
| Bit name | IM[7:0] | | | | | | | |

| Bit | 31 | 30 | 29 | 28 | 27 | 26 | 25 | 24 |
|---|---|---|---|---|---|---|---|---|
| Bit name | ALN | reserved | | | BPO | | |
| Bit | 23 | 22 | 21 | 20 | 19 | 18 | 17 | 16 |
| Bit name | reserved | | | | VC3 | VC2 | VC1 | VC0 |
| Bit | 15 | 14 | 13 | 12 | 11 | 10 | 9 | 8 |
| Bit name | reserved | | | | | | | |
| Bit | 7 | 6 | 5 | 4 | 3 | 2 | 1 | 0 |
| Bit name | | | | | | | OVS | CAS |
| Bit | C7 | C6 | C5 | C4 | C3 | C2 | C1 | C0 |
| Bit name | | | | | | | | |

32

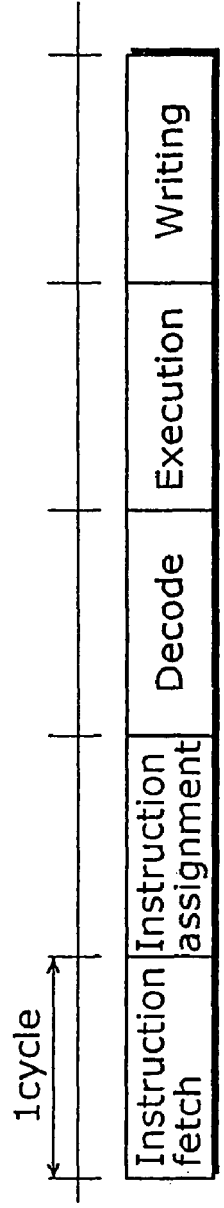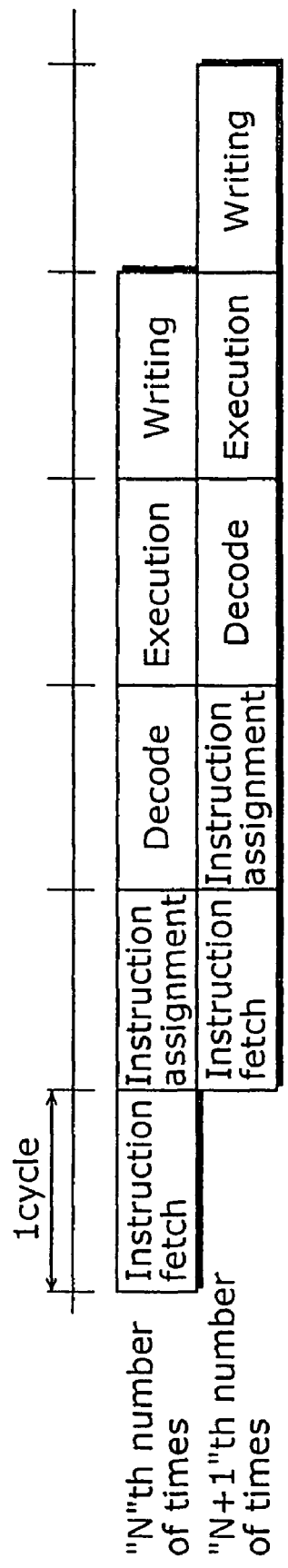

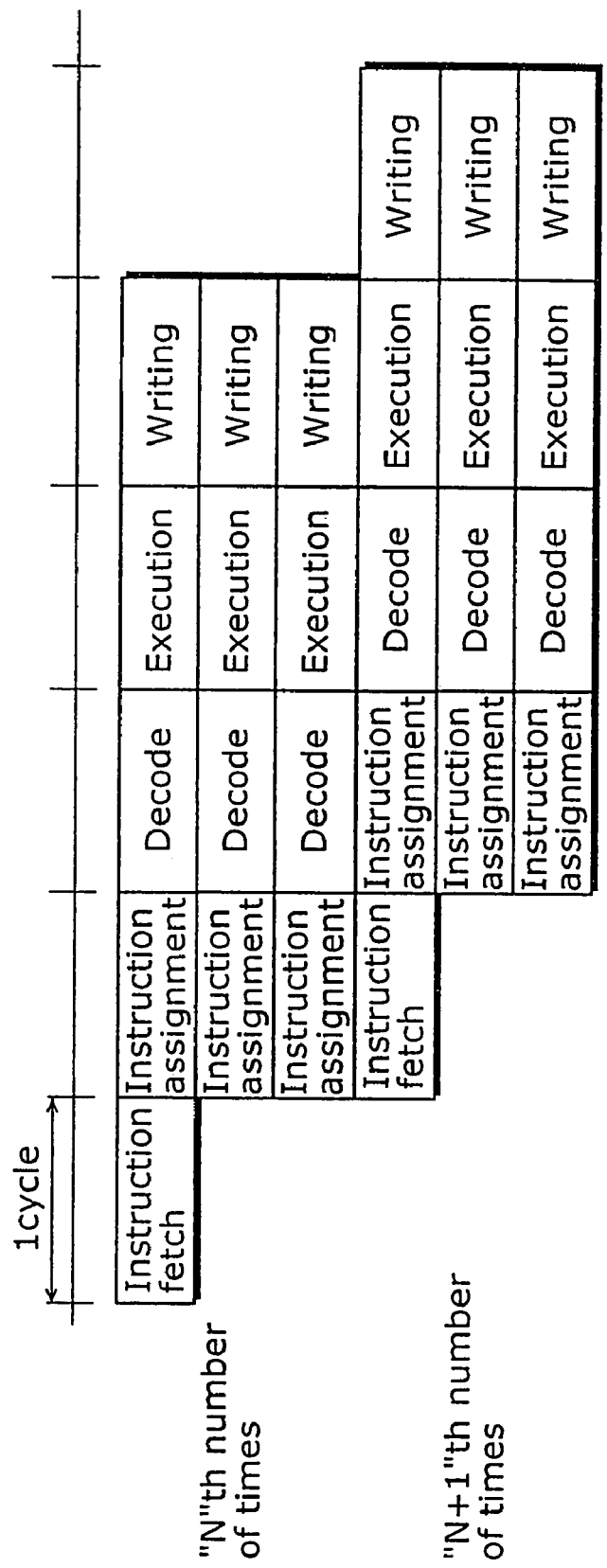

Fig. 20

| 31 | 3 2 | 0 |
|---|---|---|
| OP/R/I/D | | P |

Fig. 21

| Category | SIMD | Size | Instruction | Operand | CFR | PSR | Typical behavior | Operation unit | 31 | 16 |
|---|---|---|---|---|---|---|---|---|---|---|
| ALU add system | SINGLE | Word | add | Rc, Ra, Rb | | | | | | 32 |
| | | | | Rb, Ra, i12s | | | | | | |
| | | | | SP, i19s | | | | | | |
| | | | | Ra2, Rb2 | | | | | | 16 |
| | | | | Rc3, Ra3, Rb3 | | | | | | |
| | | | | Ra2, i05s | | | | | | |
| | | | | SP, i11s | | | | | | |
| | | | addu | Rb, GP, i16u | | | | | | 32 |
| | | | | Rb, SP, i16u | | | | | | |
| | | | | Ra3, SP, i08u | | | | | | 16 |
| | | | addc | Rc, Ra, Rb | W:cas, c0:c1 | | Addition with carry | | | |
| | | | addvw | Rc, Ra, Rb | W:ovs | | Addition with overflow | | | |
| | | | adds | Rc, Ra, Rb | | | Ra + Rb → Rc (>>1) | | | 32 |
| | | | addsr | Rc, Ra, Rb | | | Ra + Rb + 1 → Rc (>>1) | | | |
| | | | sladd | Rc, Ra, Rb | | | Ra + Rb(>>1) → Rc | | | 16 |
| | | | | Rc3, Ra3, Rb3 | | | | | | |
| | | | s2add | Rc, Ra, Rb | | | Ra + Rb(>>2) → Rc | | | 32 |
| | | | | Rc3, Ra3, Rb3 | | | | | | 16 |
| | | | addmsk | Rc, Ra, Rb | R:BP0 | | Ra, CFR.BP + Rb → Rc | | | |
| | | | addarvw | Rc, Ra, Rb | | | | | | |
| | | Half word | faddvh | Rc, Ra, Rb | W:ovs | | | | | |
| | SIMD | Half word | vaddh | Rc, Ra, Rb | | | Ra[16|16] + Rb[16|16] → Rc[16|16] | A | | 32 |
| | | | vaddhvh | Rc, Ra, Rb | W:ovs | | | | | |
| | | | vsaddh | Rb, Ra, i08s | | | [16|16] + Immediate → Rb[16|16] | | | |
| | | | vaddsh | Rc, Ra, Rb | | | Ra[16|16] + Rb[16|16] → Rc[16|16] (>>1) | | | |
| | | | vaddsrh | Rc, Ra, Rb | | | (+1)(+1) (With rounding) | | | |
| | | | vaddhvc | Rc, Ra, Rb | R:VC | | | | | |
| | | | vaddrhvc | Rc, Ra, Rb | | | | | | |
| | | | vxaddh | Rc, Ra, Rb | | | Ra[16|16] × Rb[16|16] → Rc[16|16] | | | |
| | | | vxaddhvh | Rc, Ra, Rb | W:ovs | | | | | |
| | | | vhaddh | Rc, Ra, Rb | | | Ra[16|16] + Rb[16] → Rc[16|16] | | | |
| | | | vhaddhvh | Rc, Ra, Rb | W:ovs | | | | | |
| | | | vladdh | Rc, Ra, Rb | | | Ra[16|16] + Rb[16] → Rc[16|16] | | | |
| | | | vladdhvh | Rc, Ra, Rb | W:ovs | | | | | |
| | | Byte | vaddb | Rc, Ra, Rb | | | Ra[8|8|8|8] + Rb[8|8|8|8] → Rc[8|8|8|8] | | | |
| | | | vsaddb | Rb, Ra, i08s | | | (Immediate value) | | | |
| | | | vaddsb | Rc, Ra, Rb | | | Ra[8|8|8|8] + Rb[8|8|8|8] → Rc[8|8|8|8] (>>1) | | | |
| | | | vaddsrb | Rc, Ra, Rb | | | (+1)(+1)(+1)(+1) (With rounding) | | | |

Fig. 22

| Category | SIMD Size | | Instruction | Operand | CFR | PSR | Typical behavior | Operation unit |
|---|---|---|---|---|---|---|---|---|
| ALU sub system | SINGLE | Word | sub | Rc, Rb, Ra<br>Rb2, Ra2<br>Rc3, Rb3, Ra3 | | | | 31/16, 32/16, 32/16, 32 |
| | | | rsub | Rb, Ra, i08s<br>Ra2, Rb2<br>Ra2, i04s | | | Immediate value (Rb → Ra) | |
| | | | subc | Rc, Rb, Ra | W:cas,c0:c1 | | With carry | |
| | | | subvw | Rc, Rb, Ra | W:ovs | | With overflow | |
| | | | subs | Rc, Rb, Ra | | | Ra − Rb → Rc | |
| | | | submsk | Rc, Rb, Ra | R:BP0 | | CFR BP0 / Ra / Rb → Rc | A |
| | Half word | | fsubvh | Rc, Rb, Ra | | | | |
| | SIMD | Half word | vsubh | Rc, Rb, Ra | | | Ra(16−16), Rb(16−16) → Rc(16,16) | |
| | | | vsubhvh | Rc, Rb, Ra | W:ovs | | | |
| | | | vsrsubh | Rb, Ra, i08s | | | Immediate value (16−16) → Rc | |
| | | | vsubsh | Rc, Rb, Ra | | | | |
| | | | vxsubh | Rc, Rb, Ra | | | | |
| | | | vxsubhvh | Rc, Rb, Ra | W:ovs | | | |
| | | | vhsubh | Rc, Rb, Ra | | | | |
| | | | vhsubhvh | Rc, Rb, Ra | W:ovs | | | |
| | | | vlsubh | Rc, Rb, Ra | | | | |
| | | | vlsubhvh | Rc, Rb, Ra | W:ovs | | | |
| | | Byte | vsubb | Rc, Rb, Ra | | | (Immediate value) Ra(8,8,8,8), Rb(8,8,8,8) → Rc(8,8,8,8) | |
| | | | vsrsubb | Rb, Ra, i08s | | | | |
| | | | vasubb | Rc, Rb, Ra | R:VC | | | |

Fig. 23

| Category | SIMD | Size | Instruction | Operand | CFR | PSR | Typical behavior | Operation unit | 31 16 |
|---|---|---|---|---|---|---|---|---|---|
| ALU logic system | SINGLE | Word | and | Rc, Ra, Rb | | | AND | A | 32 |
| | | | | Rb, Ra, i08u | | | | | |
| | | | | Ra2, Rb2 | | | | | 16 |
| | | | andn | Rc, Ra, Rb | | | | | 32 |
| | | | | Rb, Ra, i08u | | | | | |
| | | | | Ra2, Rb2 | | | | | 16 |
| | | | or | Rc, Ra, Rb | | | OR | | 32 |
| | | | | Rb, Ra, i08u | | | | | |
| | | | | Ra2, Rb2 | | | | | 16 |
| | | | xor | Rc, Ra, Rb | | | Exclusive OR | | 32 |
| | | | | Rb, Ra, i08u | | | | | |
| | | | | Ra2, Rb2 | | | | | 16 |
| ALU mov system | SINGLE | Word | mov | Rb, Reg32 | | | Reg32 = TAR LR SVR PSR CFR MH0 MH1 ML0 ML1 EPSR IPC IPSR PC EPC PSR0 PSR1 PSR2 PSR3 CFR0 CFR1 CFR2 CFR3 | A | 32 |
| | | | | Reg32, Rb | | | | | |
| | | | | Rb2, Reg16 | | | Reg16 = TAR LR MH0 MH1 | | 16 |
| | | | | Reg16, Rb2 | | | | | |
| | | | | Ra2, Rb | | | | | 32 |
| | | | | Ra, i16s | | | | | |
| | | | | Ra2, i08s | | | | | 16 |
| | | | movp | Rc:Rc+1, Ra, Rb | | | Rc<-Ra; Rc+1<-Rb; | | 32 |
| | | | movcf | Ck, Cj, Cm, Cn | | | Ci<-Cj; Cm<-Cn; | | |
| | | | mvclovs | Cm:Cm+1 | W:ovs | | Cm:Cm+1<-CFR. OVS: `CFR. OVS; CFR. OVS<-0; | | 16 |
| | | | mvclcas | Cm:Cm+1 | W:cas | | Cm:Cm+1<-CFR. CAS; `CFR. CAS; CFR. CAS<-0; | | |
| | | | sethi | Ra, i16s | | | | | 32 |
| ALU max min system | SINGLE | Word | max | Rc, Ra, Rb | W:c0:c1 | | Rc <- max(Ra, Rb) | A | 32 |
| | | | min | Rc, Ra, Rb | W:c0:c1 | | Rc <- min(Ra, Rb) | | |
| | SIMD | Half word | vmaxh | Rc, Ra, Rb | | | | | |
| | | | vminh | Rc, Ra, Rb | | | | | |
| | | Byte | vmaxb | Rc, Ra, Rb | | | | | |
| | | | vminb | Rc, Ra, Rb | | | | | |
| ALU abs system | SINGLE | | abs | Rb, Ra | | | Absolute value | A | 32 |
| | | | absvw | Rb, Ra | W:ovs | | With overflow | | |
| | | | fabsvh | Rb, Ra | W:ovs | | | | |
| | SIMD | Half word | vabshvh | Rb, Ra | W:ovs | | | | |
| ALU neg system | SINGLE | Word | negvw | Rb, Ra | W:ovs | | | A | 32 |
| | | Half word | fnegvh | Rb, Ra | W:ovs | | | | |
| | SIMD | | vneghvh | Rb, Ra | W:ovs | | | | |
| ALU sum system | SIMD | Half word | vsumh | Rb, Ra | | | Ra [16][16] -> [Rb] (+) | A | 32 |
| | | | vsumh2 | Rb, Ra | | | Ra [8][8][8][8] -> [16][16] Rb (+) (+) | | |
| | | | vsumrh2 | Rb, Ra | | | (+1) (+1) (Rounding) | | |
| | | Byte | vabssumb | Rc, Ra, Rb | | | | C | |
| ALU other | SINGLE | | frndvh | Rb, Ra | W:ovs | | Rounding | C | 32 |
| | SIMD | | vfrndvh | Rb, Mn | W:ovs | | | | |
| | | | vsel | Rc, Ra, Rb | R:VC | | | A | |
| | | | vsgnh | Rb, Ra | | | | C | |

Fig. 24

| Category | SIMD Size | Instruction | Operand | CFR | PSR | Typical behavior | Operation unit |
|---|---|---|---|---|---|---|---|
| CMP | SINGLE | cmpCCn | Cm, Ra, Rb, Cn<br>Cm, Ra, i05s, Cn<br>Cm:Cm+1, Ra, Rb, Cn<br>Cm:Cm+1, Ra, i05s, Cn | W:CF | | CC = eq, ne, gt, ge, gtu, geu, le, lt, leu, leu<br>Cm <- result & Cn;<br>(Cm+1 <- ~result & Cn;) | 31<br>16<br><br>32 |
| | | cmpCCa | Cm:Cm+1, Ra, Rb, Cn<br>Cm:Cm+1, Ra, i05s, Cn | W:CF | | Cm <- result & Cn;<br>Cm+1 <- ~(result & Cn); | 16 |
| | | cmpCCo | Cm:Cm+1, Ra, Rb, Cn<br>Cm:Cm+1, Ra, i05s, Cn | W:CF | | Cm <- result | Cn;<br>Cm+1 <- ~(result | Cn); | |
| | | cmpCC | C6, Ra2, Rb2<br>C6, Ra2, i04s | W:CF | | CC = eq, ne, gt, ge, le, lt<br>C6 <- result | |
| | | tstzn | Cm, Ra, Rb, Cn<br>Cm, Ra, i05u, Cn<br>Cm:Cm+1, Ra, Rb, Cn<br>Cm:Cm+1, Ra, i05u, Cn | W:CF | | Cm <- (Ra & Rb == 0) & Cn;<br>(Cm+1 <- ~(Ra & Rb ==0) & Cn;) | A |
| | | tstza | Cm:Cm+1, Ra, Rb, Cn<br>Cm:Cm+1, Ra, i05u, Cn | W:CF | | Cm <- (Ra & Rb == 0) & Cn;<br>Cm+1 <- ~((Ra & Rb == 0) & Cn); | |
| | | tstzo | Cm:Cm+1, Ra, Rb, Cn<br>Cm:Cm+1, Ra, i05u, Cn | W:CF | | Cm <- (Ra & Rb == 0) | Cn;<br>Cm+1 <- ~((Ra & Rb == 0) | Cn); | |
| | | tstnn | Cm, Ra, Rb, Cn<br>Cm, Ra, i05u, Cn<br>Cm:Cm+1, Ra, Rb, Cn<br>Cm:Cm+1, Ra, i05u, Cn | W:CF | | Cm <- (Ra & Rb != 0) & Cn;<br>(Cm+1 <- ~(Ra & Rb != 0) & Cn;) | |
| | | tstna | Cm:Cm+1, Ra, Rb, Cn<br>Cm:Cm+1, Ra, i05u, Cn | W:CF | | Cm <- (Ra & Rb != 0) & Cn;<br>Cm+1 <- ~((Ra & Rb != 0) & Cn); | 32 |
| | | tstno | Cm:Cm+1, Ra, Rb, Cn<br>Cm:Cm+1, Ra, i05u, Cn | W:CF | | Cm <- (Ra & Rb != 0) | Cn;<br>Cm+1 <- ~((Ra & Rb != 0) | Cn); | |
| | | tstz | C6, Ra2, Rb2<br>C6, Ra2, i04u | W:CF | | C6 <- (Ra2&Rb2 == 0 ) | |
| | | tstn | C6, Ra2, Rb2<br>C6, Ra2, i04u | W:CF | | C6 <- (Ra2&Rb2 != 0 ) | |
| | SIMD Half word | vcmpCCh | Ra, Rb | W:CF | | CC = eq, ne, gt, le, ge, lt | 16 |
| | | vscmpCCh | Ra, i05s | W:CF | | | |
| | SIMD Byte | vcmpCCb | Ra, Rb | W:CF | | CC = eq, ne, gt, le ge, lt | 32 |
| | | vscmpCCb | Ra, i05s | W:CF | | | |

Fig. 26

| Category | SIMD | Size | Instruction | Operand | CFR | PSR | Typical behavior | Operation unit | 31 16 |
|---|---|---|---|---|---|---|---|---|---|
| mac system | SINGLE | Word×Word | mac | Mm, Rc, Ra, Rb, Mn<br>M0, Rc, Ra, Rb, Rx | | | Sum of products operation using mul | X2 | 16<br>32 |
| | | | fmacww | Mm, Rc, Ra, Rb, Mn<br>M0, Rc, Ra, Rb, Rx | | fxp | Sum of products operation using fmulww | | |
| | | Word×Half word | hmac | Mm, Rc, Ra, Rb, Mn<br>M0, Rc, Ra, Rb, Rx | | | Sum of products operation using hmul | X1 | 16 |
| | | | lmac | Mm, Rc, Ra, Rb, Mn<br>M0, Rc, Ra, Rb, Rx | | | Sum of products operation using lmul | | 32 |
| | | | fmachww | Mm, Rc, Ra, Rb, Mn<br>M0, Rc, Ra, Rb, Rx | | fxp | Sum of products operation using fmulhww | | 16 |
| | | | fmachw | Mm, Rc, Ra, Rb, Mn<br>M0, Rc, Ra, Rb, Rx | | fxp | Sum of products operation using fmulhw | | |
| | | Half word×Half word | fmachh | Mm, Rc, Ra, Rb, Mn<br>M0, Rc, Ra, Rb, Rx | | fxp | Sum of products operation using fmulhh | | 32 |
| | | | fmachhr | Mm, Rc, Ra, Rb, Mn<br>M0, Rc, Ra, Rb, Rx | | fxp | With rounding | | |
| | SIMD | HALF WORD × HALF WORD | vmac | Mm, Rc, Ra, Rb, Mn<br>M0, Rc, Ra, Rb, Rx | | | Sum of products operation using vmul | X2 | 16<br>32<br>16 |
| | | | vfmacw | Mm, Rc, Ra, Rb, Mn | | fxp | Sum of products operation using vfmulw | | |
| | | | vxmac | Mm, Rc, Ra, Rb, Mn<br>M0, Rc, Ra, Rb, Rx | | | Sum of products operation using vxmul | | |
| | | | vxfmacw | Mm, Rc, Ra, Rb, Mn | | fxp | Sum of products operation using vxfmulw | | |
| | | | vxfmach | Mm, Rc, Ra, Rb, Mn<br>M0, Rc, Ra, Rb, Rx | | fxp | Sum of products operation using vxfmulh | | |
| | | | vxfmachr | Mm, Rc, Ra, Rb, Mn<br>M0, Rc, Ra, Rb, Rx | | fxp | With rounding | | |
| | | | vhmac | Mm, Rc, Ra, Rb, Mn<br>M0, Rc, Ra, Rb, Rx | | | Sum of products operation using vhmul | | 32 |
| | | | vhfmacw | Mm, Rc, Ra, Rb, Mn | | fxp | Sum of products operation using vhfmulw | | |
| | | | vhfmach | Mm, Rc, Ra, Rb, Mn<br>M0, Rc, Ra, Rb, Rx | | fxp | Sum of products operation using vhfmulh | | |
| | | | vhfmachr | Mm, Rc, Ra, Rb, Mn<br>M0, Rc, Ra, Rb, Rx | | fxp | | | |
| | | | vlmac | Mm, Rc, Ra, Rb, Mn<br>M0, Rc, Ra, Rb, Rx | | | Sum of products operation using vlmul | | |
| | | | vlfmacw | Mm, Rc, Ra, Rb, Mn | | fxp | Sum of products operation using vlfmulw | | |
| | | | vfmach | Mm, Rc, Ra, Rb, Mn<br>M0, Rc, Ra, Rb, Rx | | fxp | Sum of products operation using vfmulh | | |
| | | | vfmachr | Mm, Rc, Ra, Rb, Mn<br>M0, Rc, Ra, Rb, Rx | | fxp | With rounding | | |
| | | | vlfmach | Mm, Rc, Ra, Rb, Mn<br>Mm, Rc, Ra, Rb, Mn | | fxp | Sum of products operation using vlfmulh | | |
| | | | vlfmachr | Mm, Rc, Ra, Rb, Mn<br>M0, Rc, Ra, Rb, Rx | | fxp | With rounding | | |
| | | Word×Half word | vpfmachww | Mm, Rc:Rc+1, Ra, Rb, Mn | | fxp | | | |

Fig. 27

| Category | SIMD | Size | Instruction | Operand | CFR | PSR | Typical behavior | Operation unit 31:16 |
|---|---|---|---|---|---|---|---|---|
| msu system | SINGLE | Word×Word | msu | Mm, Rc, Ra, Rb, Mn<br>M0, Rc, Ra, Rb, Rx | | | Difference of products operation using mul | X2 |
| | | | fmsuww | Mm, Rc, Ra, Rb, Mn<br>M0, Rc, Ra, Rb, Rx | | fxp | Difference of products operation using fmulww | |
| | | Word<br>×Half word | hmsu | Mm, Rc, Ra, Rb, Mn<br>M0, Rc, Ra, Rb, Rx | | | Difference of products operation using hmul | |
| | | | lmsu | Mm, Rc, Ra, Rb, Mn<br>M0, Rc, Ra, Rb, Rx | | | Difference of products operation using lmul | |
| | | | fmsuhww | Mm, Rc, Ra, Rb, Mn<br>M0, Rc, Ra, Rb, Rx | | fxp | Difference of products operation using fmulhww | X1 |
| | | Half word<br>×Half word | fmsuhw | Mm, Rc, Ra, Rb, Mn<br>M0, Rc, Ra, Rb, Rx | | fxp | Difference of products operation using fmulhw | |
| | | | fmsuhh | Mm, Rc, Ra, Rb, Mn<br>M0, Rc, Ra, Rb, Rx | | fxp | Difference of products operation using fmulhh | |
| | | | fmsuhhr | Mm, Rc, Ra, Rb, Mn<br>M0, Rc, Ra, Rb, Rx | | fxp | With rounding | |
| | HALF | | vmsu | Mm, Rc, Ra, Rb, Mn<br>M0, Rc, Ra, Rb, Rx | | | Difference of products operation using vmul | 32 |
| | | | vfmsuw | Mm, Rc, Ra, Rb, Mn | | fxp | Difference of products operation using vfmul | |
| | | | vfmsuh | Mm, Rc, Ra, Rb, Mn<br>M0, Rc, Ra, Rb, Rx | | fxp | Difference of products operation using vfmulh | |
| | WORD | | vxmsu | Mm, Rc, Ra, Rb, Mn<br>M0, Rc, Ra, Rb, Rx | | | Difference of products operation using vxmul | |
| | | | vxfmsuw | Mm, Rc, Ra, Rb, Mn | | fxp | Difference of products operation using vxfmulw | |
| | | | vxfmsuh | Mm, Rc, Ra, Rb, Mn<br>M0, Rc, Ra, Rb, Rx | | fxp | Difference of products operation using vxfmulh | X2 |
| | X | | vhmsu | Mm, Rc, Ra, Rb, Mn<br>M0, Rc, Ra, Rb, Rx | | | Difference of products operation using vhmul | |
| | HALF | | vhfmsuw | Mm, Rc, Ra, Rb, Mn | | fxp | Difference of products operation using vhfmulw | |
| | | | vhfmsuh | Mm, Rc, Ra, Rb, Mn<br>M0, Rc, Ra, Rb, Rx | | fxp | Difference of products operation using vhfmulh | |
| | WORD | | vlmsu | Mm, Rc, Ra, Rb, Mn<br>M0, Rc, Ra, Rb, Rx | | | Difference of products operation using vlmul | |
| | | | vlfmsuw | Mm, Rc, Ra, Rb, Mn | | fxp | Difference of products operation using vlfmulw | |
| | | | vlfmsuh | Mm, Rc, Ra, Rb, Mn<br>M0, Rc, Ra, Rb, Rx | | fxp | Difference of products operation using vlfmulh | |

Fig. 28

| Category | SIMD | Size | Instruction | Operand | CFR | PSR | Typical behavior | Operation unit | 31 16 |
|---|---|---|---|---|---|---|---|---|---|
| MEM ld system | S I N G L E | Word | ld | Rb, (Ra, d10u)<br>Rb, (GP, d13u)<br>Rb, (SP, d13u)<br>Rb, (Ra+)i10s | | | Registe ← Memory<br>32 ← 32 | M | 32 |
| | | | | Rb2, (Ra2)<br>Rb2, (Ra2, d05u)<br>Rb2, (GP, d06u)<br>Rb2, (SP, d06u)<br>Rb2, (Ra2+) | | | | | 16 |
| | | Half word | ldh | Rb, (Ra, d09u)<br>Rb, (GP, d12u)<br>Rb, (SP, d12u)<br>Rb, (Ra+)i09s | | | 32 ← 16 | | 32 |
| | | | | Rb2, (Ra2)<br>Rb3, (Ra3, d04u)<br>Rb2, (GP, d05u)<br>Rb2, (SP, d05u)<br>Rb2, (Ra2+) | | | | | 16 |
| | | | ldhu | Rb, (Ra, d09u)<br>Rb, (GP, d12u)<br>Rb, (SP, d12u)<br>Rb, (Ra+)i09s | | | | | |
| | | Byte | ldb | Rb, (Ra, d08u)<br>Rb, (GP, d11u)<br>Rb, (SP, d11u)<br>Rb, (Ra+)i08s | | | Register ← Memory<br>32 ← 8 | | 32 |
| | | | ldbu | Rb, (Ra, d08u)<br>Rb, (GP, d11u)<br>Rb, (SP, d11u)<br>Rb, (Ra+)i08s | | | | | |
| | | Byte-><br>Half word | ldbh<br>ldbuh | Rb, (Ra+)i07s<br>Rb, (Ra+)i07s | | | 16 16 ← 8 8 | | |
| | | P A I R | Word | ldp | Rb:Rb+1, (Ra, d11u)<br>LR:SVR, (Ra, d11u)<br>TAR:UDR, (Ra, d11u)<br>Rb:Rb+1, (GP, d14u)<br>LR:SVR, (GP, d14u)<br>TAR:UDR, (GP, d14u)<br>Rb:Rb+1, (SP, d14u)<br>LR:SVR, (SP, d14u)<br>TAR:UDR, (SP, d14u)<br>Rb:Rb+1, (Ra+)i11s | | | 32 ← 32<br>32 ← 32 | |
| | | | | Rb:Rb+1, (SP, d07u)<br>LR:SVR, (SP, d07u)<br>Rb2:Re2, (Ra2+) | | | | | 16 |
| | | Half word | ldhp | Rb:Rb+1, (Ra, d10u)<br>Rb:Rb+1, (Ra+)i10s | | | 32 ← 16 16<br>32 | | 32 |
| | | | | Rb2:Re2, (Ra2+) | | | | | 16 |
| | | Byte | ldbp | Rb:Rb+1, (Ra, d09u)<br>Rb:Rb+1, (Ra+)i09s | | | 32 ← 8 8<br>32 | | |
| | | Byte-><br>Half word | ldbhp<br>ldbuhp | Rb:Rb+1, (Ra+)i07s<br>Rb:Rb+1, (Ra+)i07s | | | 16 16 ← 8 8 8 8<br>16 16 | | 32 |

Fig. 29

| Category | SIMD | Size | Instruction | Operand | CFR | PSR | Typical behavior | Operation unit | 31 16 |
|---|---|---|---|---|---|---|---|---|---|
| MEM store system | SINGLE | Word | st | (Ra, d10u), Rb<br>(GP, d13u), Rb<br>(SP, d13u), Rb<br>(Ra+)i10s, Rb | | | Register 32 → Memory 32 | M | 32 |
| | | | | (Ra2), Rb2<br>(Ra2, d05u), Rb2<br>(GP, d06u), Rb2<br>(SP, d06u), Rb2<br>(Ra2+), Rb2 | | | | | 16 |
| | | Half word | sth | (Ra, d09u), Rb<br>(GP, d12u), Rb<br>(SP, d12u), Rb<br>(Ra+)i09s, Rb | | | 16 → 16 | | 32 |
| | | | | (Ra2), Rb2<br>(Ra2, d04u), Rb2<br>(GP, d05u), Rb2<br>(SP, d05u), Rb2<br>(Ra2+), Rb2 | | | | | 16 |
| | | Byte | stb | (Ra, d08u), Rb<br>(GP, d11u), Rb<br>(SP, d11u), Rb<br>(Ra+)i08s, Rb | | | 8 → 8 | | 32 |
| | | Byte-><br>Half word | stbh | (Ra+)i07s, Rb | | | 8 8 → 16 | | |
| | | PAIR Word | stp | (Ra, d11u), Rb:Rb+1<br>(Ra, d11u), LR:SVR<br>(Ra, d11u), TAR:UDR<br>(GP, d14u), Rb:Rb+1<br>(GP, d14u), LR:SVR<br>(GP, d14u), TAR:UDR<br>(SP, d14u), Rb:Rb+1<br>(SP, d14u), LR:SVR<br>(SP, d14u), TAR:UDR<br>(Ra+)i11s, Rb:Rb+1 | | | 32 → 32<br>32 → 32 | | 32 |
| | | | | (SP, d07u), Rb:Re<br>(SP, d07u), LR:SVR<br>(Ra2+), Rb2:Re2 | | | | | 16 |
| | | Half word | sthp | (Ra, d10u), Rb:Rb+1<br>(Ra+)i10s, Rb:Rb+1 | | | 16<br>16 → 32 | | 32 |
| | | | | (Ra2+), Rb2:Re2 | | | | | 16 |
| | | Byte | stbp | (Ra, d09u), Rb:Rb+1<br>(Ra+)i09s, Rb:Rb+1 | | | 8<br>8 → 16 | | 32 |
| | | Byte-><br>Half word | stbhp | (Ra+)i07s, Rb:Rb+1 | | | 8 8<br>8 8 → 32 | | |

Fig. 30

| Category | SIMD | Size | Instruction | Operand | CFR | PSR | Typical behavior | Operation unit | 31 16 |
|---|---|---|---|---|---|---|---|---|---|
| BRA | | | setlr | d09s | | | Set LR<br>Store instruction fetched from LR in branch buffer | | 32 |
| | | | | C5, d09s | | | | | |
| | | | settar | d09s | W:c6 | | Set TAR<br>Store instruction fetched from TAR in branch buffer | | 16 |
| | | | | C6, d09s | W:c2:c4, c6 | | | | 32 |
| | | | | C6, C2:C4, d09s | W:c6, cm | | | | |
| | | | | C6, Cm, d09s | W:c6 | | | | |
| | | | | C6, C4, d09s | | | | | |
| | | | setbb | LR | | | Store instruction fetched from LR in branch buffer | | 16 |
| | | | | TAR | | | Store instruction fetched from TAE in branch buffer | | |
| | | | jloop | C5, LR, Ra, i08s | W:c5 | | Only predicate [c5] | | 32 |
| | | | | C6, TAR, Ra, i08s | W:c6 | | Only predicate [c6] | | |
| | | | | C6, C2:C4, TAR, Ra, i08s | W:c2:c4, c6 | | | B | |
| | | | | C6, Cm, TAR, Ra, i08s | W:c6, cm | | | | 16 |
| | | | | C6, TAR, Ra2 | W:c6 | | | | |
| | | | | C6, C2:C4, TAR, Ra2 | W:c2:c4, c6 | | | | |
| | | | | C6, Cm, TAR, Ra2 | W:c6 | | | | |
| | | | jmp | TAR | | | | | |
| | | | | LR | | | | | |
| | | | jmpl | TAR | R:CF | | | | |
| | | | | LR | | | | | |
| | | | jmpf | TAR | | | | | |
| | | | | LR | | | | | |
| | | | | Cm, TAR | | | | | |
| | | | | C6, C2:C4, TAR | | | | | |
| | | | jmpr | LR | | | Only predicates [c6][c7] | | 32 16 |
| | | | br | d20s | | | | | 32 |
| | | | | d09s | | | | | 16 |
| | | | brl | d20s | R:CF | | | | |
| | | | | d09s | | | | | |
| | | | rti | | | W:PSR<br>R:eh | | | |

Fig. 31

| Category | SIMD | Size | Instruction | Operand | CFR | PSR | Typical behavior | Operation unit | |
|---|---|---|---|---|---|---|---|---|---|
| BS asl system | SINGLE | Word | asl | Rc, Ra, Rb<br>Rb, Ra, i05u<br>Ra2, i04u | | | Left shift<br><<Rb[0:4]  Ra → Rc | S1 | 31 16 |
| | | | faslvw | Rc, Ra, Rb<br>Rb, Ra, i05u | W:ovs | | With saturation<br><<Rb[0:4]  Ra → Rc | S1 | 32 16 |
| | | Pair word | aslp | Rc, Ra, Rb<br>Rb, Ra, i05u | | | <<Ra[0:4]  MHn → MHn, MLn → MLn, Rb → Rb | S2 | 32 |
| | | | | Mn, Ra, Mn, Rb<br>Mn, Rb, Mn, i06u<br>Mn, Rc, MHn, Ra, Rb<br>Mn, Rb, MHn, Ra, i06u | | | | | |
| | | | faslpvw | Mn, Ra, Mn, Rb<br>Mn, Rb, Mn, i06u | W:ovs | | With saturation<br><<Rb[0:4]  MHn → MHn, MLn → MLn, Rb → Rb | S2 | 32 |
| | SIMD | Word | vasl | Mn, Ra, Mn, Rb<br>Mn, Rb, Mn, i05u | | | Mn (1) (2) ← (1)<<Ra[0:4] (2)<<Ra[0:4] | S2 | |
| | | | vfaslvw | Mn, Ra, Mn, Rb<br>Mn, Rb, Mn, i05u | W:ovs | | Mn (1) (2) ← (1)<<Ra[0:4] (2)<<Ra[0:4] | S2 | |
| | | Half word | vaslh | Rc, Ra, Rb<br>Rb, Ra, i04u | | | <<Rb[0:3] <<Rb[0:3]<br>Ra (1) (2) → Rc (1) (2) | S1 | |
| | | | vfaslvh | Rc, Ra, Rb<br>Rb, Ra, i04u | W:ovs | | With saturation<br><<Rb[0:3] <<Rb[0:3]<br>Ra (1) (2) → Rc (1) (2) | S1 | |
| | | Byte | vaslb | Rc, Ra, Rb<br>Rb, Ra, i03u | | | <<Rb[0:2] <<Rb[0:2] <<Rb[0:2] <<Rb[0:2]<br>Ra (1)(2)(3)(4) → Rc (1)(2)(3)(4) | S1 | 32 |
| BS asr system | SINGLE | Word | asr | Rc, Ra, Rb<br>Rb, Ra, i05u<br>Ra2, i04u | | | Arithmetic shift right<br>>>Rb[0:4]  Ra → Rc | S1 | 32 16 |
| | | Pair word | asrp | Rc, Ra, Rb<br>Mn, Rb, Mn, i06u<br>Mn, Rc, MHn, Ra, Rb<br>Mn, Rb, MHn, Ra, i06u | | | >>Ra[0:4]  MHn → MHn, MLn → MLn, Rb → Rb | S2 | 32 |
| | SIMD | Word | vasr | Mn, Ra, Mn, Rb<br>Mn, Rb, Mn, i05u | | | (1)>>Ra[0:4](2)>>Ra[0:4]<br>Mn (1) (2) → Mn (1) (2) | S2 | |
| | | Half word | vasrh | Rc, Ra, Rb<br>Rb, Ra, i04u | | | >>Rb[0:3] >>Rb[0:3]<br>Ra (1) (2) → Rc (1) (2) | S1 | |
| | | Byte | vasrb | Rc, Ra, Rb<br>Rb, Ra, i03u | | | >>Rb[0:2] >>Rb[0:2] >>Rb[0:2] >>Rb[0:2]<br>Ra (1)(2)(3)(4) → Rc (1)(2)(3)(4) | S1 | |

| Category | SIMD Size | Instruction | Operand | CFR | PSR | Typical behavior | Operation unit | 31 1b |
|---|---|---|---|---|---|---|---|---|
| CNV valn system | | valn | Rc, Ra, Rb | R:aln[1:0] | | << (CFR.ALN[1:0] << 3) [63:32]<br>Ra \| Rb → Rb | C | 32 |
| | SIMD | valn1 | Rc, Ra, Rb | | | Ra (1)<br>Rb (2) → (1) (2) Rc | | |
| | | valn2 | Rc, Ra, Rb | | | Ra (1)<br>Rb (2) → (1) (2) Rc | | |
| | | valn3 | Rc, Ra, Rb | | | Ra (1)<br>Rb (2) → (1) (2) Rc | | |
| | | valnvc1 | Rc, Ra, Rb | R:VC0 | | | | |
| | | valnvc2 | Rc, Ra, Rb | R:VC0 | | | | |
| | | valnvc3 | Rc, Ra, Rb | R:VC0 | | | | |
| | | valnvc4 | Rc, Ra, Rb | R:VC0 | | | | |

Fig. 34

| Category | SIMD | Size | Instruction | Operand | CFR | PSR | Typical behavior | Operation unit | 31 16 |
|---|---|---|---|---|---|---|---|---|---|
| CNV | SINGLE | | bcnt1 | Rb, Ra | | | Count the number of 1s | C | 32 |
| | | | bseq0 | Rb, Ra | | | Count number of values from MSB until first 0 is reached | | |
| | | | bseq1 | Rb, Ra | | | Count number of values from MSB until first 1 is reached | | |
| | | | bseq | Rb, Ra | | | Count number of values from MSB until first -1 is reached | | |
| | | | mskbrvh | Rc, Ra, Rb | R:BP0 | | | | |
| | | | byterev | Rb, Ra | | | | | |
| | | | mskbrvb | Rc, Ra, Rb | R:BP0 | | | | |
| | SIMD | Half word | vintllh | Rc, Ra, Rb | | | | | |
| | | | vintlhh | Rc, Ra, Rb | | | | | |
| | | Byte | vintllb | Rc, Ra, Rb | | | | | |
| | | | vintlhb | Rc, Ra, Rb | | | | | |
| | | Half word | vhunpkh | Rb:Rb+1, Ra | | | | | |
| | | Byte | vhunpkb | Rb:Rb+1, Ra | | | | | |
| | | Half word | vlunpkh | Rb:Rb+1, Ra | | | | | |
| | | | vlunpkhu | Rb:Rb+1, Ra | | | | | |
| | | Byte | vlunpkb | Rb:Rb+1, Ra | | | | | |
| | | | vlunpkbu | Rb:Rb+1, Ra | | | | | |
| | | Half word | vunpk1 | Rb, Mn | | | | | |
| | | | vunpk2 | Rb, Mn | | | | | |
| | | | vstovh | Rb, Ra | | | | | |
| | | Byte | vstovb | Rb, Ra | | | | | |
| | | | vhpkb | Rc, Ra, Rb | | | | | |

Fig. 35

| Category | SIMD | Size | Instruction | Operand | CFR | PSR | Typical behavior | Operation unit |
|---|---|---|---|---|---|---|---|---|
| SAT vlpk system | SIMD | Word-> Half word | vlpkh | Rc, Ra, Rb | | | With saturation | 31 16 |
| | | | vlpkhu | Rc, Ra, Rb | | | With unsigned saturation | 32 |
| | | Half word-> Byte | vlpkb | Rc, Ra, Rb | | | With saturation | |
| | | | vlpkbu | Rc, Ra, Rb | | | With unsigned saturation | |
| SAT sat system | SINGLE | Word | satw | Mm, Rb, Mn | | | Word saturation | C |
| | | | sath | Rb, Ra | | | Half word saturation | |
| | | | satb | Rb, Ra | | | Byte saturation | |
| | | | satbu | Rb, Ra | | | Unsigned byte saturation | |
| | | | sat9 | Rb, Ra | | | 9-bit saturation | |
| | | | sat12 | Rb, Ra | | | 12-bit saturation | |
| | SIMD | Half word | vsath | Mm, Rb, Mn | | | With saturation | 32 |
| | | | vsath8 | Rb, Ra | | | Signed 8-bit saturation | C |
| | | | vsath8u | Rb, Ra | | | Unigned 8-bit saturation | |
| | | | vsath9 | Rb, Ra | | | 9-bit saturation | |
| | | | vsath12 | Rb, Ra | | | 12-bit saturation | |

Fig. 36

| Category | SIMD Size | Instruction | Operand | CFR | PSR | Typical behavior | Operation unit | 31 16 |
|---|---|---|---|---|---|---|---|---|
| MSK | | mskgen | Rc, Rb<br>Rb, I05U, i05u | | | Generate mask<br>Rb[12:8] Rb[4:0]   or   Rb[4:0] Rb[12:8] | S2 | 32 |
| | | msk | Rc, Ra, Rb<br>Rb, Ra, I05U, i05u | | | Rb[12:8] Rb[4:0]   Ra  Rb[4:0] Rb[12:8]<br>Ra or Rb | | 32 |
| EXTR | | extr | Rc, Ra, Rb<br>Rb, Ra, I05U, i05u | | | Rb[12:8] Rb[4:0]   With sign extension<br>Ra<br>Rb (Without sign extension) | S2 | 32 |
| | | extru | Rc, Ra, Rb<br>Rb, Ra, I05U, i05u | | | | | |
| DIV | | div | MHm, Rc, MHn, Ra, Rb | W:ovs | | Division | DIV | 32 |
| | | divu | MHm, Rc, MHn, Ra, Rb | | | | | |
| | | piNl | | | W:ih,ie,f<br>R:PSR | Software interrupt N=0~7 | | 32 |
| | | piN | | | W:ih,ie,p<br>R:PSR | Software interrupt N=0~7 | B | 16 |
| | | scN | | | W:ih,ie,p<br>R:PSR | System call N=0~7 | | |
| | | ldstb | Rb, (Ra) | | | load bus lock | | 32 |
| | | rd | Rb, (Ra) | | R:eee | External register read | | 16 |
| | | wt | Rb2, (d11u)<br>Rb2, (Ra2)<br>(Ra), Rb<br>(d11u), Rb<br>(Ra2), Rb2 | | R:eee | External register write | M | 32 |
| ETC | | dpref | (Ra, d11u) | | | Pre-fetch | | 16 |
| | | dbgmN | i18u | | | N=0~3 | DBGM | |
| | | vcchk | | W:CF R:VC | | VC flag check | | |
| | | vmpsw | LR | | | VMP switching | B | 32 |
| | | vmpsw | | | | | | |
| | | vmpintd1 | | | W:ie | VMP switching disabled | | |
| | | vmpintd2 | | | | | | |
| | | vmpintd3 | | | | | | |
| | | vmpinte1 | | | W:ie | VMP switching enabled | | |
| | | vmpinte2 | | | | | | |
| | | vmpinte3 | | | | | | |
| | | nop | | | | no operation | A | 16 |

Fig. 38

```
/*********************************************************************
*
* (C)Copyright 2002 Matsushita Electric Industrial Co., Ltd.
*   fixammp.h
* Version:
* Release:
* Date:        2002/6/14   v0.9.1-convertible
*
*********************************************************************/
/* Avoid overloading */
#ifndef __FIXAMMP__
#define __FIXAMMP__

/* FIX-Lib. Class definition */
class FIX16_1;
class FIX32_1;
class FIX16_2;
class FIX32_2;

#if defined(__AMMPCC__)
#pragma _pack_struct
#endif //__AMMPCC__

////////////////////////////////////////////////////////////////////////
//                    Member of FIX16_1
//
//                    val : Actual value in 16 bits
//
////////////////////////////////////////////////////////////////////////
class FIX16_1{
    short val;
public:
    // constructor
    FIX16_1() {}
    FIX16_1(int a);
    FIX16_1(float a);
    FIX16_1(double a);
    FIX16_1(FIX16_1& a)
    {
        val = a.val;
    }
    FIX16_1(volatile FIX16_1& a)
    {
        val = a.val;
    }
    FIX16_1(const FIX16_1& a)
    {
        val = a.val;
    }

// Operator
    volatile FIX16_1& operator=(FIX16_1 a) volatile
    {
        val = a.val;
        return *this;
    }
    FIX16_1& operator=(FIX16_1 a)
    {
```

Fig. 39

```
        val = a.val;
        return *this;
}
friend FIX16_1 operator+(FIX16_1 a);
friend FIX16_1 operator-(FIX16_1 a);

friend FIX16_1 operator+(FIX16_1 a, FIX16_1 b);
friend FIX16_1 operator-(FIX16_1 a, FIX16_1 b);

friend FIX16_1 operator*(FIX16_1 a, FIX16_1 b);
friend FIX16_1 operator*(int     a, FIX16_1 b);
friend FIX16_1 operator*(FIX16_1 a, int     b);
friend FIX16_1 operator*(float   a, FIX16_1 b);
friend FIX16_1 operator*(FIX16_1 a, float   b);
friend FIX16_1 operator*(double  a, FIX16_1 b);
friend FIX16_1 operator*(FIX16_1 a, double  b);

friend FIX16_1 operator/(FIX16_1 a, FIX16_1 b);
friend FIX16_1 operator/(FIX16_1 a, int     b);
friend FIX16_1 operator/(FIX16_1 a, float   b);
friend FIX16_1 operator/(FIX16_1 a, double  b);

friend FIX16_1 operator<<(FIX16_1 a, int b);
friend FIX16_1 operator>>(FIX16_1 a, int b);

friend bool operator<(FIX16_1 a, FIX16_1 b);
friend bool operator>(FIX16_1 a, FIX16_1 b);
friend bool operator<=(FIX16_1 a, FIX16_1 b);
friend bool operator>=(FIX16_1 a, FIX16_1 b);
friend bool operator==(FIX16_1 a, FIX16_1 b);
friend bool operator!=(FIX16_1 a, FIX16_1 b);

volatile FIX16_1& operator<<=(int b) volatile;
         FIX16_1& operator<<=(int b);
volatile FIX16_1& operator>>=(int b) volatile;
         FIX16_1& operator>>=(int b);

volatile FIX16_1& operator*=(FIX16_1 b) volatile;
         FIX16_1& operator*=(FIX16_1 b);
volatile FIX16_1& operator*=(int    b) volatile;
         FIX16_1& operator*=(int    b);
volatile FIX16_1& operator*=(float  b) volatile;
         FIX16_1& operator*=(float  b);
volatile FIX16_1& operator*=(double b) volatile;
         FIX16_1& operator*=(double b);

volatile FIX16_1& operator/=(FIX16_1 b) volatile;
         FIX16_1& operator/=(FIX16_1 b);
volatile FIX16_1& operator/=(int    b) volatile;
         FIX16_1& operator/=(int    b);
volatile FIX16_1& operator/=(float  b) volatile;
         FIX16_1& operator/=(float  b);
volatile FIX16_1& operator/=(double b) volatile;
         FIX16_1& operator/=(double b);
volatile FIX16_1& operator+=(FIX16_1 b) volatile;
         FIX16_1& operator+=(FIX16_1 b);
volatile FIX16_1& operator-=(FIX16_1 b) volatile;
         FIX16_1& operator-=(FIX16_1 b);
```

Fig. 40

```
    short value() {return val;}

// Other functions friend FIX16_1 _fix16l(short a);
    friend short   _bptn(FIX16_1 a);
    friend FIX16_1 _fix16l(FIX32_1 a);
    friend float   _float(FIX16_1 a);
    friend double  _double(FIX16_1 a);

friend FIX16_1 _abs(FIX16_1 a);
    friend FIX16_1 _max(FIX16_1 a, FIX16_1 b);
    friend FIX16_1 _min(FIX16_1 a, FIX16_1 b);
    friend FIX16_1 _adds(FIX16_1 a, FIX16_1 b);
    friend FIX16_1 _subs(FIX16_1 a, FIX16_1 b);
    friend int     _bcnt1(FIX16_1 a);
    friend int     _bseq(FIX16_1 a);
    friend int     _bseq0(FIX16_1 a);
    friend int     _bseq1(FIX16_1 a);
    friend FIX16_1 _round(FIX32_1 a);
    friend int _extr(FIX16_1 a, unsigned int b, unsigned int c);
    friend unsigned int _extru(FIX16_1 a, unsigned int b, unsigned int c);

friend void    _mulr(FIX16_1 &c, FIX16_1 a, FIX16_1 b);
    friend void    _mulr(long &mh, long&ml, FIX16_1 &c, FIX16_1 a, FIX16_1 b);
    friend void    _mul(long &mh, long&ml, FIX16_1 &c, FIX16_1 a, FIX16_1 b);
    friend void    _mul(long &mh, long&ml, FIX32_1 &c, FIX16_1 a, FIX16_1 b);
    friend void    _mul(long &mh, long&ml, FIX32_1 &c, FIX16_1 a, FIX32_1 b);
    friend void    _mul(long &mh, long&ml, FIX32_1 &c, FIX32_1 a, FIX16_1 b);
    friend void    _mac(long &mh, long &ml, FIX16_1 &c, FIX16_1 a, FIX16_1 b);
    friend void    _mac(long &mh, long &ml, FIX32_1 &c, FIX16_1 a, FIX16_1 b);
    friend void    _mac(long &mh, long &ml, FIX32_1 &c, FIX32_1 a, FIX16_1 b);
    friend void    _mac(long &mh, long &ml, FIX32_1 &c, FIX16_1 a, FIX32_1 b);
    friend void    _macr(long &mh, long&ml, FIX16_1 &c, FIX16_1 a, FIX16_1 b);
    friend void    _msu(long &mh, long&ml, FIX16_1 &c, FIX16_1 a, FIX16_1 b);
    friend void    _msu(long &mh, long&ml, FIX32_1 &c, FIX16_1 a, FIX16_1 b);
    friend void    _msu(long &mh, long&ml, FIX32_1 &c, FIX32_1 a, FIX16_1 b);
    friend void    _msu(long &mh, long&ml, FIX32_1 &c, FIX16_1 a, FIX32_1 b);
    friend void    _msur(long &mh, long&ml, FIX16_1 &c, FIX16_1 a, FIX16_1 b);
    friend FIX16_1 _div(FIX16_1 a, FIX16_1 b);
    friend FIX16_1 _div(FIX16_1 a, int b);
    friend FIX16_1 _div(FIX16_1 a, float b);
    friend FIX16_1 _div(FIX16_1 a, double b);

};

//////////////////////////////////////////////////////////////
//                  Member of FIX32_1
//
//             val : Actual value in 32 bits
//
//////////////////////////////////////////////////////////////
class FIX32_1{
    long val;
public:
    // constructor
    FIX32_1() {};
    FIX32_1(int a);
```

Fig. 41

```
FIX32_1(float a);
FIX32_1(double a);
FIX32_1(FIX16_1 a);
FIX32_1(FIX32_1& a)
{
    val = a.val;
}
FIX32_1(volatile FIX32_1& a)
{
    val = a.val;
}
FIX32_1(const FIX32_1& a)
{
    val = a.val;
}

// Operator
volatile FIX32_1& operator=(FIX32_1 a) volatile
{
    val = a.val;
    return *this;
}
FIX32_1& operator=(FIX32_1 a)
{
    val = a.val;
    return *this;
}
friend  FIX32_1 operator+(FIX32_1 a);
friend  FIX32_1 operator-(FIX32_1 a);

friend FIX32_1 operator+(FIX32_1 a, FIX32_1 b);
friend FIX32_1 operator-(FIX32_1 a, FIX32_1 b);

friend FIX32_1 operator*(FIX32_1 a, FIX32_1 b);
friend FIX32_1 operator*(int      a, FIX32_1 b);
friend FIX32_1 operator*(FIX32_1 a, int      b);
friend FIX32_1 operator*(float    a, FIX32_1 b);
friend FIX32_1 operator*(FIX32_1 a, float    b);
friend FIX32_1 operator*(double   a, FIX32_1 b);
friend FIX32_1 operator*(FIX32_1 a, double   b);

friend FIX32_1 operator/(FIX32_1 a, FIX32_1 b);
friend FIX32_1 operator/(FIX32_1 a, int      b);
friend FIX32_1 operator/(FIX32_1 a, float    b);
friend FIX32_1 operator/(FIX32_1 a, double   b);

friend FIX32_1 operator<<(FIX32_1 a, int b);
friend FIX32_1 operator>>(FIX32_1 a, int b);

friend bool operator<(FIX32_1 a, FIX32_1 b);
friend bool operator>(FIX32_1 a, FIX32_1 b);
friend bool operator<=(FIX32_1 a, FIX32_1 b);
friend bool operator>=(FIX32_1 a, FIX32_1 b);
friend bool operator==(FIX32_1 a, FIX32_1 b);
friend bool operator!=(FIX32_1 a, FIX32_1 b);

volatile FIX32_1& operator<<=(int b) volatile;
         FIX32_1& operator<<=(int b);
volatile FIX32_1& operator>>=(int b) volatile;
```

Fig. 42

```
         FIX32_1& operator>>=(int b);

volatile FIX32_1& operator*=(FIX32_1 b) volatile;
         FIX32_1& operator*=(FIX32_1 b);
volatile FIX32_1& operator*=(int     b) volatile;
         FIX32_1& operator*=(int     b);
volatile FIX32_1& operator*=(float   b) volatile;
         FIX32_1& operator*=(float   b);
volatile FIX32_1& operator*=(double  b) volatile;
         FIX32_1& operator*=(double  b);

volatile FIX32_1& operator/=(FIX32_1 b) volatile;
         FIX32_1& operator/=(FIX32_1 b);
volatile FIX32_1& operator/=(int     b) volatile;
         FIX32_1& operator/=(int     b);
volatile FIX32_1& operator/=(float   b) volatile;
         FIX32_1& operator/=(float   b);
volatile FIX32_1& operator/=(double  b) volatile;
         FIX32_1& operator/=(double  b);

volatile FIX32_1& operator+=(FIX32_1 b) volatile;
         FIX32_1& operator+=(FIX32_1 b);
volatile FIX32_1& operator-=(FIX32_1 b) volatile;
         FIX32_1& operator-=(FIX32_1 b);

long value() {return val;}

// Other functions
friend FIX32_1 _fix321(long a);
friend long    _bptn(FIX32_1 a);
friend float   _float(FIX32_1 a);
friend double  _double(FIX32_1 a);

friend FIX32_1 _abs(FIX32_1 a);
friend FIX32_1 _max(FIX32_1 a, FIX32_1 b);
friend FIX32_1 _min(FIX32_1 a, FIX32_1 b);
friend FIX32_1 _adds(FIX32_1 a, FIX32_1 b);
friend FIX32_1 _subs(FIX32_1 a, FIX32_1 b);
friend int     _bcnt1(FIX32_1 a);
friend int     _bseq(FIX32_1 a);
friend int     _bseq0(FIX32_1 a);
friend int     _bseq1(FIX32_1 a);
friend FIX16_1 _round(FIX32_1 a);

friend int      _extr(FIX32_1 a, unsigned int b, unsigned int c);
friend unsigned int _extru(FIX32_1 a, unsigned int b, unsigned int c);
friend void     _mul(long &mh, long&ml, FIX32_1 &c, FIX32_1 a, FIX32_1 b);
friend void     _mul(long &mh, long&ml, FIX32_1 &c, FIX16_1 a, FIX16_1 b);
friend void     _mul(long &mh, long&ml, FIX32_1 &c, FIX16_1 a, FIX32_1 b);
friend void     _mul(long &mh, long&ml, FIX32_1 &c, FIX32_1 a, FIX16_1 b);

friend void     _mac(long &mh, long &ml, FIX32_1 &c, FIX16_1 a, FIX16_1 b);
friend void     _mac(long &mh, long &ml, FIX32_1 &c, FIX32_1 a, FIX32_1 b);
friend void     _mac(long &mh, long &ml, FIX32_1 &c, FIX32_1 a, FIX16_1 b);
friend void     _mac(long &mh, long &ml, FIX32_1 &c, FIX16_1 a, FIX32_1 b);

friend void     _msu(long &mh, long&ml, FIX32_1 &c, FIX32_1 a, FIX32_1 b);
friend void     _msu(long &mh, long&ml, FIX32_1 &c, FIX16_1 a, FIX16_1 b);
friend void     _msu(long &mh, long&ml, FIX32_1 &c, FIX32_1 a, FIX16_1 b);
```

Fig. 43

```
    friend void    _msu(long &mh, long&ml, FIX32_1 &c, FIX16_1 a, FIX32_1 b);
    friend FIX32_1 _div(FIX32_1 a,FIX32_1 b);
    friend FIX32_1 _div(FIX32_1 a,int b);
    friend FIX32_1 _div(FIX32_1 a,float b);
    friend FIX32_1 _div(FIX32_1 a,double b);
};
/////////////////////////////////////////////////////////////////////
//                    Member of FIX16_2
//
//              val : Actual value in 16 bits
//
/////////////////////////////////////////////////////////////////////
class FIX16_2{
    short val;
public:
    // constructor
    FIX16_2() {}
    FIX16_2(int a);
    FIX16_2(float a);
    FIX16_2(double a);
    FIX16_2(FIX16_2& a)
    {
        val = a.val;
    }
    FIX16_2(volatile FIX16_2& a)
    {
        val = a.val;
    }
    FIX16_2(const FIX16_2& a)
    {
        val = a.val;
    }

// Operator
    volatile FIX16_2& operator=(FIX16_2 a) volatile
    {
        val = a.val;
        return *this;
    }
    FIX16_2& operator=(FIX16_2 a)
    {
        val = a.val;
        return *this;
    }
    friend FIX16_2 operator+(FIX16_2 a);
    friend FIX16_2 operator-(FIX16_2 a);

friend FIX16_2 operator+(FIX16_2 a, FIX16_2 b);
    friend FIX16_2 operator-(FIX16_2 a, FIX16_2 b);

friend FIX16_2 operator*(FIX16_2 a, FIX16_2 b);
    friend FIX16_2 operator*(int      a, FIX16_2 b);
    friend FIX16_2 operator*(FIX16_2 a, int      b);
    friend FIX16_2 operator*(float    a, FIX16_2 b);
    friend FIX16_2 operator*(FIX16_2 a, float    b);
    friend FIX16_2 operator*(double   a, FIX16_2 b);
    friend FIX16_2 operator*(FIX16_2 a, double   b);
```

Fig. 44

```
friend FIX16_2 operator/(FIX16_2 a, FIX16_2 b);
friend FIX16_2 operator/(FIX16_2 a, int    b);
friend FIX16_2 operator/(FIX16_2 a, float  b);
friend FIX16_2 operator/(FIX16_2 a, double b);

friend FIX16_2 operator<<(FIX16_2 a, int b);
friend FIX16_2 operator>>(FIX16_2 a, int b);

friend bool operator<(FIX16_2 a, FIX16_2 b);
friend bool operator>(FIX16_2 a, FIX16_2 b);
friend bool operator<=(FIX16_2 a, FIX16_2 b);
friend bool operator>=(FIX16_2 a, FIX16_2 b);
friend bool operator==(FIX16_2 a, FIX16_2 b);
friend bool operator!=(FIX16_2 a, FIX16_2 b);

volatile FIX16_2& operator<<=(int b) volatile;
         FIX16_2& operator<<=(int b);
volatile FIX16_2& operator>>=(int b) volatile;
         FIX16_2& operator>>=(int b);

volatile FIX16_2& operator*=(FIX16_2 b) volatile;
         FIX16_2& operator*=(FIX16_2 b);
volatile FIX16_2& operator*=(int    b) volatile;
         FIX16_2& operator*=(int    b);
volatile FIX16_2& operator*=(float  b) volatile;
         FIX16_2& operator*=(float  b);
volatile FIX16_2& operator*=(double b) volatile;
         FIX16_2& operator*=(double b);

volatile FIX16_2& operator/=(FIX16_2 b) volatile;
         FIX16_2& operator/=(FIX16_2 b);
volatile FIX16_2& operator/=(int    b) volatile;
         FIX16_2& operator/=(int    b);
volatile FIX16_2& operator/=(float  b) volatile;
         FIX16_2& operator/=(float  b);
volatile FIX16_2& operator/=(double b) volatile;
         FIX16_2& operator/=(double b);

volatile FIX16_2& operator+=(FIX16_2 b) volatile;
         FIX16_2& operator+=(FIX16_2 b);
volatile FIX16_2& operator-=(FIX16_2 b) volatile;
         FIX16_2& operator-=(FIX16_2 b);

short value() {return val;}

// Other functions
friend FIX16_2 _fix162(short a);
friend short   _bptn(FIX16_2 a);
friend FIX16_2 _fix162(FIX32_2 a);
friend float   _float(FIX16_2 a);
friend double  _double(FIX16_2 a);

friend FIX16_2 _abs(FIX16_2 a);
friend FIX16_2 _max(FIX16_2 a, FIX16_2 b);
friend FIX16_2 _min(FIX16_2 a, FIX16_2 b);
friend FIX16_2 _adds(FIX16_2 a, FIX16_2 b);
friend FIX16_2 _subs(FIX16_2 a, FIX16_2 b);
```

Fig. 45

```
    friend int      _bcnt1(FIX16_2 a);
    friend int      _bseq(FIX16_2 a);
    friend int      _bseq0(FIX16_2 a);
    friend int      _bseq1(FIX16_2 a);
    friend FIX16_2  _round(FIX32_2 a);

friend int _extr(FIX16_2 a, unsigned int b, unsigned int c);
    friend unsigned int _extru(FIX16_2 a, unsigned int b, unsigned int c);

friend void     _mul(long &mh, long&ml, FIX16_2 &c, FIX16_2 a, FIX16_2 b);
    friend void     _mul(long &mh, long&ml, FIX32_2 &c, FIX16_2 a, FIX16_2 b);
    friend void     _mul(long &mh, long&ml, FIX32_2 &c, FIX16_2 a, FIX32_2 b);
    friend void     _mul(long &mh, long&ml, FIX32_2 &c, FIX32_2 a, FIX16_2 b);
    friend void     _mac(long &mh, long &ml, FIX16_2 &c, FIX16_2 a, FIX16_2 b);
    friend void     _mac(long &mh, long &ml, FIX32_2 &c, FIX16_2 a, FIX16_2 b);
    friend void     _mac(long &mh, long &ml, FIX32_2 &c, FIX32_2 a, FIX16_2 b);
    friend void     _mac(long &mh, long &ml, FIX32_2 &c, FIX16_2 a, FIX32_2 b);
    friend void     _msu(long &mh, long&ml, FIX16_2 &c, FIX16_2 a, FIX16_2 b);
    friend void     _msu(long &mh, long&ml, FIX32_2 &c, FIX16_2 a, FIX16_2 b);
    friend void     _msu(long &mh, long&ml, FIX32_2 &c, FIX32_2 a, FIX16_2 b);
    friend void     _msu(long &mh, long&ml, FIX32_2 &c, FIX16_2 a, FIX32_2 b);
    friend FIX16_2  _div(FIX16_2 a, FIX16_2 b);
    friend FIX16_2  _div(FIX16_2 a, int b);
    friend FIX16_2  _div(FIX16_2 a, float b);
    friend FIX16_2  _div(FIX16_2 a, double b);
};

////////////////////////////////////////////////////////////////////////////
//                      Member of FIX32_2
//
//              val : Actual value in 32 bits
//
////////////////////////////////////////////////////////////////////////////
class FIX32_2{
    long val;
public:
    // constructor
    FIX32_2() {}
    FIX32_2(int a);
    FIX32_2(float a);
    FIX32_2(double a);
    FIX32_2(FIX16_2 a);
    FIX32_2(FIX32_2& a)
    {
        val = a.val;
    }
    FIX32_2(volatile FIX32_2& a)
    {
        val = a.val;
    }
    FIX32_2(const FIX32_2& a)
    {
        val = a.val;
    }

// Operator
    volatile FIX32_2& operator=(FIX32_2 a) volatile
    {
```

Fig. 46

```
        val = a.val;
        return *this;
}
FIX32_2& operator=(FIX32_2 a)
{
        val = a.val;
        return *this;
}
friend FIX32_2 operator+(FIX32_2 a);
friend FIX32_2 operator-(FIX32_2 a);

friend FIX32_2 operator+(FIX32_2 a, FIX32_2 b);
friend FIX32_2 operator-(FIX32_2 a, FIX32_2 b);

friend FIX32_2 operator*(FIX32_2 a, FIX32_2 b);
friend FIX32_2 operator*(int      a, FIX32_2 b);
friend FIX32_2 operator*(FIX32_2 a, int      b);
friend FIX32_2 operator*(float    a, FIX32_2 b);
friend FIX32_2 operator*(FIX32_2 a, float    b);
friend FIX32_2 operator*(double   a, FIX32_2 b);
friend FIX32_2 operator*(FIX32_2 a, double   b);

friend FIX32_2 operator/(FIX32_2 a, FIX32_2 b);
friend FIX32_2 operator/(FIX32_2 a, int      b);
friend FIX32_2 operator/(FIX32_2 a, float    b);
friend FIX32_2 operator/(FIX32_2 a, double   b);

friend FIX32_2 operator<<(FIX32_2 a, int b);
friend FIX32_2 operator>>(FIX32_2 a, int b);

friend bool operator<(FIX32_2 a, FIX32_2 b);
friend bool operator>(FIX32_2 a, FIX32_2 b);
friend bool operator<=(FIX32_2 a, FIX32_2 b);
friend bool operator>=(FIX32_2 a, FIX32_2 b);
friend bool operator==(FIX32_2 a, FIX32_2 b);
friend bool operator!=(FIX32_2 a, FIX32_2 b);

volatile FIX32_2& operator<<=(int b) volatile;
         FIX32_2& operator<<=(int b);
volatile FIX32_2& operator>>=(int b) volatile;
         FIX32_2& operator>>=(int b);

volatile FIX32_2& operator*=(FIX32_2 b) volatile;
         FIX32_2& operator*=(FIX32_2 b);
volatile FIX32_2& operator*=(int     b) volatile;
         FIX32_2& operator*=(int     b);
volatile FIX32_2& operator*=(float   b) volatile;
         FIX32_2& operator*=(float   b);
volatile FIX32_2& operator*=(double  b) volatile;
         FIX32_2& operator*=(double  b);

volatile FIX32_2& operator/=(FIX32_2 b) volatile;
         FIX32_2& operator/=(FIX32_2 b);
volatile FIX32_2& operator/=(int     b) volatile;
         FIX32_2& operator/=(int     b);
volatile FIX32_2& operator/=(float   b) volatile;
         FIX32_2& operator/=(float   b);
volatile FIX32_2& operator/=(double  b) volatile;
         FIX32_2& operator/=(double  b);
```

Fig. 47

```
    volatile FIX32_2& operator+=(FIX32_2 b) volatile;
             FIX32_2& operator+=(FIX32_2 b);
    volatile FIX32_2& operator-=(FIX32_2 b) volatile;
             FIX32_2& operator-=(FIX32_2 b);

long value() {return val;}

// Other functions
    friend FIX32_2  _fix322(long a);
    friend long    _bptn(FIX32_2 a);
    friend float   _float(FIX32_2 a);
    friend double  _double(FIX32_2 a);

friend FIX32_2  _abs(FIX32_2  a);
    friend FIX32_2  _max(FIX32_2  a, FIX32_2 b);
    friend FIX32_2  _min(FIX32_2  a, FIX32_2 b);
    friend FIX32_2  _adds(FIX32_2 a, FIX32_2 b);
    friend FIX32_2  _subs(FIX32_2 a, FIX32_2 b);
    friend int      _bcnt1(FIX32_2 a);
    friend int      _bseq(FIX32_2 a);
    friend int      _bseq0(FIX32_2 a);
    friend int      _bseq1(FIX32_2 a);
    friend FIX16_2  _round(FIX32_2 a);

friend int      _extr(FIX32_2 a, unsigned int b, unsigned int c);
    friend unsigned int _extru(FIX32_2 a, unsigned int b, unsigned int c);
    friend void     _mul(long &mh, long&ml, FIX32_2 &c, FIX32_2 a, FIX32_2 b);
    friend void     _mul(long &mh, long&ml, FIX32_2 &c, FIX16_2 a, FIX16_2 b);
    friend void     _mul(long &mh, long&ml, FIX32_2 &c, FIX16_2 a, FIX32_2 b);
    friend void     _mul(long &mh, long&ml, FIX32_2 &c, FIX32_2 a, FIX16_2 b);

friend void     _mac(long &mh, long &ml, FIX32_2 &c, FIX16_2 a, FIX16_2 b);
    friend void     _mac(long &mh, long &ml, FIX32_2 &c, FIX32_2 a, FIX32_2 b);
    friend void     _mac(long &mh, long &ml, FIX32_2 &c, FIX32_2 a, FIX16_2 b);
    friend void     _mac(long &mh, long &ml, FIX32_2 &c, FIX16_2 a, FIX32_2 b);
    friend void     _msu(long &mh, long&ml, FIX32_2 &c, FIX32_2 a, FIX32_2 b);
    friend void     _msu(long &mh, long&ml, FIX32_2 &c, FIX16_2 a, FIX16_2 b);
    friend void     _msu(long &mh, long&ml, FIX32_2 &c, FIX32_2 a, FIX16_2 b);
    friend void     _msu(long &mh, long&ml, FIX32_2 &c, FIX16_2 a, FIX32_2 b);
    friend FIX32_2  _div(FIX32_2 a, FIX32_2 b);
    friend FIX32_2  _div(FIX32_2 a, int b);
    friend FIX32_2  _div(FIX32_2 a, float b);
    friend FIX32_2  _div(FIX32_2 a, double b);
};

#if defined(__AMMPCC__)
#pragma _pack_struct_default
#endif //__AMMPCC__

// other functions
#if defined(__AMMPCC__)

pragma _enable_asm_begin static inline FIX16_1 _fix161(FIX32_1 a)
{
    FIX16_1 result;
```

Fig. 48

```
    asm(vr0 = a) {
    asr  vr1, vr0,16;
    }(result = vr1);

return result;
} static inline FIX16_2 _fix162(FIX32_2 a)
{
    FIX16_2 result;

asm(vr0 = a) {
    asr  vr1, vr0,16;
    }(result = vr1);

return result;
} static inline FIX16_1 _fix161(short a)
{
    FIX16_1 result;

asm(vr0 = a) {
    mov  vr1, vr0;
    }(result = vr1);

return result;
} static inline FIX16_2 _fix162(short a)
{
    FIX16_2 result;

asm(vr0 = a) {
    mov  vr1, vr0;
    }(result = vr1);

return result;
} static inline FIX32_1 _fix321(long a)
{
    FIX32_1 result;

asm(vr0 = a) {
    mov  vr1, vr0;
    }(result = vr1);

return result;
} static inline FIX32_2 _fix322(long a)
{
    FIX32_2 result;

asm(vr0 = a) {
    mov  vr1, vr0;
    }(result = vr1);
```

Fig. 49

```
        return result;
}
static inline short _bptn(FIX16_1 a)
{
    short result;

asm(vr0 = a) {
    mov   vr1, vr0;
    } (result = vr1);

return result;
}
static inline short _bptn(FIX16_2 a)
{
    short result;

asm(vr0 = a) {
    mov   vr1, vr0;
    } (result = vr1);

return result;
}
static inline long _bptn(FIX32_1 a)
{
    long result;

asm(vr0 = a) {
    mov   vr1, vr0;
    } (result = vr1);

return result;
}
static inline long _bptn(FIX32_2 a)
{
    long result;

asm(vr0 = a) {
    mov   vr1, vr0;
    } (result = vr1);

return result;
}
static inline FIX16_1 _abs(FIX16_1 a)
{
    FIX16_1 result;

asm(vr0 = a) {
    absvh vr1, vr0;
    } (result = vr1);

return result;
}
```

Fig. 50

```
static inline FIX32_1 _abs(FIX32_1 a)
{
    FIX32_1 result;

asm(vr0 = a) {
    absvw  vr1, vr0;
    }(result = vr1);

return result;
} static inline FIX16_2 _abs(FIX16_2 a)
{
    FIX16_2 result;

asm(vr0 = a) {
    absvh  vr1, vr0;
    }(result = vr1);

return result;
} static inline FIX32_2 _abs(FIX32_2 a)
{
    FIX32_2 result;

asm(vr0 = a) {
    absvw  vr1, vr0;
    }(result = vr1);

return result;
} static inline FIX16_1 _max(FIX16_1 a, FIX16_1 b)
{
    FIX16_1 result;

asm(vr0 = a, vr1 = b) {
    max vr2, vr0, vr1;
    }(result = vr2);

return result;
} static inline FIX32_1 _max(FIX32_1 a, FIX32_1 b)
{
    FIX32_1 result;

asm(vr0 = a, vr1 = b) {
    max vr2, vr0, vr1;
    }(result = vr2);

return result;
} static inline FIX16_2 _max(FIX16_2 a, FIX16_2 b)
{
    FIX16_2 result;
```

Fig. 51

```
    asm(vr0 = a, vr1 = b) {
    max vr2, vr0, vr1;
    } (result = vr2);

return result;
} static inline FIX32_2  _max(FIX32_2  a, FIX32_2  b)
{
    FIX32_2 result;

asm(vr0 = a, vr1 = b) {
    max vr2, vr0, vr1;
    } (result = vr2);

return result;
} static inline FIX16_1 _min(FIX16_1 a, FIX16_1 b)
{
    FIX16_1  result;

asm(vr0 = a, vr1 = b) {
    min vr2, vr0, vr1;
    } (result = vr2);

return result;
} static inline FIX32_1 _min(FIX32_1 a, FIX32_1 b)
{
    FIX32_1 result;

asm(vr0 = a, vr1 = b) {
    min vr2, vr0, vr1;
    } (result = vr2);

return result;
} static inline FIX16_2  _min(FIX16_2  a, FIX16_2  b)
{
    FIX16_2 result;

asm(vr0 = a, vr1 = b) {
    min vr2, vr0, vr1;
    } (result = vr2);

return result;
} static inline FIX32_2  _min(FIX32_2  a, FIX32_2  b)
{
    FIX32_2 result;

asm(vr0 = a, vr1 = b) {
    min vr2, vr0, vr1;
```

Fig. 52

```
    } (result = vr2);

return result;
} static inline FIX16_1 _adds(FIX16_1 a, FIX16_1 b)
{
    FIX16_1 result;

asm(vr0 = a, vr1 = b) {
    adds    vr2, vr0, vr1;
    } (result = vr2);

return result;
} static inline FIX32_1 _adds(FIX32_1 a, FIX32_1 b)
{
    FIX32_1 result;

asm(vr0 = a, vr1 = b) {
    adds    vr2, vr0, vr1;
    } (result = vr2);

return result;
} static inline FIX16_2 _adds(FIX16_2 a, FIX16_2 b)
{
    FIX16_2 result;

asm(vr0 = a, vr1 = b) {
    adds    vr2, vr0, vr1;
    } (result = vr2);

return result;
} static inline FIX32_2 _adds(FIX32_2 a, FIX32_2 b)
{
    FIX32_2 result;

asm(vr0 = a, vr1 = b) {
    adds    vr2, vr0, vr1;
    } (result = vr2);

return result;
} static inline FIX16_1 _subs(FIX16_1 a, FIX16_1 b)
{
    FIX16_1 result;

asm(vr0 = a, vr1 = b) {
    subs    vr2, vr0, vr1;
    } (result = vr2);

return result;
}
```

Fig. 53

```
static inline FIX32_1 _subs(FIX32_1 a, FIX32_1 b)
{
    FIX32_1  result;

asm(vr0 = a, vr1 = b) {
    subs    vr2, vr0, vr1;
    }(result = vr2);

return result;
} static inline FIX16_2 _subs(FIX16_2 a, FIX16_2 b)
{
    FIX16_2  result;

asm(vr0 = a, vr1 = b) {
    subs    vr2, vr0, vr1;
    }(result = vr2);

return result;
} static inline FIX32_2 _subs(FIX32_2 a, FIX32_2 b)
{
    FIX32_2  result;

asm(vr0 = a, vr1 = b) {
    subs    vr2, vr0, vr1;
    }(result = vr2);

return result;
} static inline int _bcnt1(FIX16_1 a)
{
    int result;

asm(vr0 = a) {
    bcnt1   vr1, vr0;
    }(result = vr1);

return result;
} static inline int _bcnt1(FIX16_2 a)
{
    int result;

asm(vr0 = a) {
        bcnt1   vr1, vr0;
    }(result = vr1);

return result;
} static inline int _bcnt1(FIX32_1 a)
{
    int result;
```

Fig. 54

```
    asm(vr0 = a) {
    bcnt1    vr1, vr0;
    } (result = vr1);

return result;
} static inline int _bcnt1(FIX32_2 a)
{
    int result;

asm(vr0 = a) {
        bcnt1    vr1, vr0;
    } (result = vr1);

return result;
} static inline int _bseq(FIX16_1 a)
{
    int result;

asm(vr0 = a) {
    bseq     vr1, vr0;
    } (result = vr1);

return result;
} static inline int _bseq0(FIX16_1 a)
{
    int result;

asm(vr0 = a) {
    bseq0    vr1, vr0;
    } (result = vr1);

return result;
} static inline int _bseq1(FIX16_1 a)
{
    int result;

asm(vr0 = a) {
    bseq1    vr1, vr0;
    } (result = vr1);

return result;
} static inline int _bseq(FIX32_1 a)
{
    int result;

asm(vr0 = a) {
    bseq     vr1, vr0;
    } (result = vr1);
```

Fig. 55

```
        return result;
} static inline int _bseq0(FIX32_1 a)
{
    int result;

asm(vr0 = a) {
    bseq0    vr1, vr0;
    } (result = vr1);

return result;
} static inline int _bseq1(FIX32_1 a)
{
    int result;

asm(vr0 = a) {
    bseq1    vr1, vr0;
    } (result = vr1);

return result;
} static inline int _bseq(FIX16_2 a)
{
    int result;

asm(vr0 = a) {
    bseq     vr1, vr0;
    } (result = vr1);

return result;
} static inline int _bseq0(FIX16_2 a)
{
    int result;

asm(vr0 = a) {
    bseq0    vr1, vr0;
    } (result = vr1);

return result;
} static inline int _bseq1(FIX16_2 a)
{
    int result;

asm(vr0 = a) {
    bseq1    vr1, vr0;
    } (result = vr1);

return result;
}
```

Fig. 56

```
static inline int _bseq(FIX32_2 a)
{
    int result;

asm(vr0 = a) {
    bseq    vr1, vr0;
    } (result = vr1);

return result;
}
static inline int _bseq0(FIX32_2 a)
{
    int result;

asm(vr0 = a) {
    bseq0   vr1, vr0;
    } (result = vr1);

return result;
}
static inline int _bseq1(FIX32_2 a)
{
    int result;

asm(vr0 = a) {
    bseq1   vr1, vr0;
    } (result = vr1);

return result;
}
static inline FIX16_1 _round(FIX32_1 a)
{
    FIX16_1 result;

asm(vr0 = a) {
    rndvh   vr1, vr0;
    } (result = vr1);

return result;
}
static inline FIX16_2 _round(FIX32_2 a)
{
    FIX16_2 result;

asm(vr0 = a) {
    rndvh   vr1, vr0;
    } (result = vr1);

return result;
}
static inline void _mulr(FIX16_1 &c, FIX16_1 a, FIX16_1 b)
{
    asm(vr0 = a, vr1 = b) {
    fmulhhr m0, vr2, vr0, vr1;
```

Fig. 57

```
    } (c = vr2);
} static inline void _mulr(long &mh, long&ml, FIX16_1 &c, FIX16_1 a, FIX16_1 b)
{
    asm(vr0 = a, vr1 = b) {
    fmulhhr m0, vr2, vr0, vr1;
    } (mh = mh0, ml = ml0, c = vr2);
} static inline void _mul(long &mh, long&ml, FIX16_1 &c, FIX16_1 a, FIX16_1 b)
{
    asm(vr0 = a, vr1 = b) {
    fmulhh m0, vr2, vr0, vr1;
    } (mh = mh0, ml = ml0, c = vr2);
} static inline void _mul(long &mh, long&ml, FIX16_2 &c, FIX16_2 a, FIX16_2 b)
{
    asm(vr0 = a, vr1 = b) {
    fmulhh m0, vr2, vr0, vr1;
    } (mh = mh0, ml = ml0, c = vr2);
} static inline void _mul(long &mh, long&ml, FIX32_1 &c, FIX16_1 a, FIX16_1 b)
{
    asm(vr0 = a, vr1 = b) {
    fmulhw m0, vr2, vr0, vr1;
    } (mh = mh0, ml = ml0, c = vr2);
} static inline void _mul(long &mh, long&ml, FIX32_2 &c, FIX16_2 a, FIX16_2 b)
{
    asm(vr0 = a, vr1 = b) {
    fmulhw m0, vr2, vr0, vr1;
    } (mh = mh0, ml = ml0, c = vr2);
} static inline void _mul(long &mh, long&ml, FIX32_1 &c, FIX32_1 a, FIX32_1 b)
{
    asm(vr0 = a, vr1 = b) {
    fmulww m0, vr2, vr0, vr1;
    } (mh = mh0, ml = ml0, c = vr2);
} static inline void _mul(long &mh, long&ml, FIX32_2 &c, FIX32_2 a, FIX32_2 b)
{
    asm(vr0 = a, vr1 = b) {
    fmulww m0, vr2, vr0, vr1;
    } (mh = mh0, ml = ml0, c = vr2);
} static inline void _mul(long &mh, long&ml, FIX32_1 &c, FIX16_1 a, FIX32_1 b)
{
    asm(vr0 = a, vr1 = b) {
    fmulhww m0, vr2, vr1, vr0;
    } (mh = mh0, ml = ml0, c = vr2);
}
```

Fig. 58

```
static inline void _mul(long &mh, long&ml, FIX32_2 &c, FIX16_2 a, FIX32_2 b)
{
    asm(vr0 = a, vr1 = b) {
    fmulhww m0,vr2,vr1,vr0;
    } (mh = mh0, ml = ml0, c = vr2);
} static inline void _mul(long &mh, long&ml, FIX32_1 &c, FIX32_1 a, FIX16_1 b)
{
    asm(vr0 = a, vr1 = b) {
    fmulhww m0,vr2,vr0,vr1;
    } (mh = mh0, ml = ml0, c = vr2);
} static inline void _mul(long &mh, long&ml, FIX32_2 &c, FIX32_2 a, FIX16_2 b)
{
    asm(vr0 = a, vr1 = b) {
    fmulhww m0,vr2,vr0,vr1;
    } (mh = mh0, ml = ml0, c = vr2);
} static inline void _mac(long &mh, long &ml, FIX16_1 &c, FIX16_1 a, FIX16_1 b)
{
    asm(vr0 = a, vr1 = b, mh0 = mh, ml0 = ml) {
    fmachh  m0,vr2,vr0,vr1,m0;
    } (mh = mh0, ml = ml0, c = vr2);
} static inline void _mac(long &mh, long &ml, FIX16_2 &c, FIX16_2 a, FIX16_2 b)
{
    asm(vr0 = a, vr1 = b, mh0 = mh, ml0 = ml) {
    fmachh  m0,vr2,vr0,vr1,m0;
    } (mh = mh0, ml = ml0, c = vr2);
} static inline void _mac(long &mh, long &ml, FIX32_1 &c, FIX16_1 a, FIX16_1 b)
{
    asm(vr0 = a, vr1 = b, mh0 = mh, ml0 = ml) {
    fmachw  m0,vr2,vr0,vr1,m0;
    } (mh = mh0, ml = ml0, c = vr2);
} static inline void _mac(long &mh, long &ml, FIX32_2 &c, FIX16_2 a, FIX16_2 b)
{
    asm(vr0 = a, vr1 = b, mh0 = mh, ml0 = ml) {
    fmachw  m0,vr2,vr0,vr1,m0;
    } (mh = mh0, ml = ml0, c = vr2);
} static inline void _mac(long &mh, long &ml, FIX32_1 &c, FIX32_1 a, FIX16_1 b)
{
    asm(vr0 = a, vr1 = b, mh0 = mh, ml0 = ml) {
    fmachww m0,vr2,vr0,vr1,m0;
    } (mh = mh0, ml = ml0, c = vr2);
} static inline void _mac(long &mh, long &ml, FIX32_2 &c, FIX32_2 a, FIX16_2 b)
{
    asm(vr0 = a, vr1 = b, mh0 = mh, ml0 = ml) {
```

Fig. 59

```
    fmachww m0,vr2,vr0,vr1,m0;
    } (mh = mh0, ml = ml0, c = vr2);
} static inline void _mac(long &mh, long &ml, FIX32_1 &c, FIX16_1 a, FIX32_1 b)
{
    asm(vr0 = a, vr1 = b, mh0 = mh, ml0 = ml) {
    fmachww m0,vr2,vr1,vr0,m0;
    } (mh = mh0, ml = ml0, c = vr2);
} static inline void _mac(long &mh, long &ml, FIX32_2 &c, FIX16_2 a, FIX32_2 b)
{
    asm(vr0 = a, vr1 = b, mh0 = mh, ml0 = ml) {
    fmachww m0,vr2,vr1,vr0,m0;
    } (mh = mh0, ml = ml0, c = vr2);
} static inline void _mac(long &mh, long &ml, FIX32_1 &c, FIX32_1 a, FIX32_1 b)
{
    asm(vr0 = b, vr1 = a, mh0 = mh, ml0 = ml) {
    fmacww m0,vr2,vr0,vr1,m0;
    } (mh = mh0, ml = ml0, c = vr2);
} static inline void _mac(long &mh, long &ml, FIX32_2 &c, FIX32_2 a, FIX32_2 b)
{
    asm(vr0 = b, vr1 = a, mh0 = mh, ml0 = ml) {
    fmacww m0,vr2,vr0,vr1,m0;
    } (mh = mh0, ml = ml0, c = vr2);
} static inline void _macr(long &mh, long &ml, FIX16_1 &c, FIX16_1 a, FIX16_1 b)
{
    asm(vr0 = a, vr1 = b, mh0 = mh, ml0 = ml) {
    fmachhr m0,vr2,vr0,vr1,m0;
    } (mh = mh0, ml = ml0, c = vr2);
} static inline void _msu(long &mh, long &ml, FIX16_1 &c, FIX16_1 a, FIX16_1 b)
{
    asm(vr0 = a, vr1 = b, mh0 = mh, ml0 = ml) {
    fmsuhh  m0,vr2,vr0,vr1,m0;
    } (mh = mh0, ml = ml0, c = vr2);
} static inline void _msu(long &mh, long &ml, FIX16_2 &c, FIX16_2 a, FIX16_2 b)
{
    asm(vr0 = a, vr1 = b, mh0 = mh, ml0 = ml) {
    fmsuhh  m0,vr2,vr0,vr1,m0;
    } (mh = mh0, ml = ml0, c = vr2);
} static inline void _msu(long &mh, long &ml, FIX32_1 &c, FIX16_1 a, FIX16_1 b)
{
    asm(vr0 = a, vr1 = b, mh0 = mh, ml0 = ml) {
    fmsuhw  m0,vr2,vr0,vr1,m0;
    } (mh = mh0, ml = ml0, c = vr2);
}
```

Fig. 60

```
static inline void _msu(long &mh, long &ml, FIX32_2 &c, FIX16_2 a, FIX16_2 b)
{
    asm(vr0 = a, vr1 = b, mh0 = mh, ml0 = ml) {
    fmsuhw m0,vr2,vr0,vr1,m0;
    } (mh = mh0, ml = ml0, c = vr2);
} static inline void _msu(long &mh, long &ml, FIX32_1 &c, FIX32_1 a, FIX16_1 b)
{
    asm(vr0 = a, vr1 = b, mh0 = mh, ml0 = ml) {
    fmsuhww m0,vr2,vr0,vr1,m0;
    } (mh = mh0, ml = ml0, c = vr2);
} static inline void _msu(long &mh, long &ml, FIX32_2 &c, FIX32_2 a, FIX16_2 b)
{
    asm(vr0 = a, vr1 = b, mh0 = mh, ml0 = ml) {
    fmsuhww m0,vr2,vr0,vr1,m0;
    } (mh = mh0, ml = ml0, c = vr2);
} static inline void _msu(long &mh, long &ml, FIX32_1 &c, FIX16_1 a, FIX32_1 b)
{
    asm(vr0 = a, vr1 = b, mh0 = mh, ml0 = ml) {
    fmsuhww m0,vr2,vr1,vr0,m0;
    } (mh = mh0, ml = ml0, c = vr2);
} static inline void _msu(long &mh, long &ml, FIX32_2 &c, FIX16_2 a, FIX32_2 b)
{
    asm(vr0 = a, vr1 = b, mh0 = mh, ml0 = ml) {
    fmsuhww m0,vr2,vr1,vr0,m0;
    } (mh = mh0, ml = ml0, c = vr2);
} static inline void _msu(long &mh, long &ml, FIX32_1 &c, FIX32_1 a, FIX32_1 b)
{
    asm(vr0 = b, vr1 = a, mh0 = mh, ml0 = ml) {
    fmsuww m0,vr2,vr0,vr1,m0;
    } (mh = mh0, ml = ml0, c = vr2);
} static inline void _msu(long &mh, long &ml, FIX32_2 &c, FIX32_2 a, FIX32_2 b)
{
    asm(vr0 = b, vr1 = a, mh0 = mh, ml0 = ml) {
    fmsuww m0,vr2,vr0,vr1,m0;
    } (mh = mh0, ml = ml0, c = vr2);
} static inline void _msur(long &mh, long &ml, FIX16_1 &c, FIX16_1 a, FIX16_1 b)
{
    asm(vr0 = a, vr1 = b, mh0 = mh, ml0 = ml) {
    fmsuhhr m0,vr2,vr0,vr1,m0;
    } (mh = mh0, ml = ml0, c = vr2);
} inline FIX16_1 operator/(FIX16_1 a, FIX16_1 b)
{
```

Fig. 61

```
    FIX16_1 result;

asm(vr0 = a, vr1 = b) {
    extw  m0, vr3, vr0;
    aslp  m0, vr4, mh0, vr3, 15;
    div   mh1, vr5, mh0, vr4, vr1;
    sath  vr2, vr5;
    } (result = vr2);

return result;
} inline FIX16_2 operator/(FIX16_2 a, FIX16_2 b)
{

FIX16_2 result;

asm(vr0 = a, vr1 = b) {
    extw  m0, vr3, vr0;
    aslp  m0, vr4, mh0, vr3, 14;
    div   mh1, vr5, mh0, vr4, vr1;
    sath  vr2, vr5;
    } (result = vr2);

return result;
} inline FIX32_1 operator/(FIX32_1 a, FIX32_1 b)
{

FIX32_1 result;

asm(vr0 = a, vr1 = b) {
              mskgen  vr3, 31, 31;    //vr3 = 0x80000000
              cmpeq   C0:C1, vr1, vr3;
        [C0]  negvw   vr2, vr0;       //in the case of vr1==(-1), sign-change
              cmpgtn  C2:C3, vr0, 0, C1;  //in the case of vr1!=(-1)
        [C2]  negvw   vr4, vr0;       //sign-change vr0 negatively (vr0')
        [C3]  mov     vr4, vr0;
              cmpgtn  C2:C3, vr1, 0, C1;
        [C2]  negvw   vr5, vr1;       //sign-change vr1 negatively (vr1')
        [C3]  mov     vr5, vr1;
              cmplen  C2:C3, vr4, vr5, C1;
        [C2]  lsr     vr6, vr0, 31;   //vr0' <= 2vr1' in the case of (ovf decision),
over flow
        [C2]  lsr     vr7, vr1, 31;
        [C2]  xor     vr8, vr6, vr7;
              cmpeqn  C4:C5, vr8, 0, C2;
        [C4]  mskgen  vr2, 30, 0;     //vr2 = 0x7fffffff
        [C5]  mskgen  vr2, 31, 31;    //vr2 = 0x80000000
        [C3]  extw    m0, vr9, vr0;   //in the case of dividend<divider
        [C3]  aslp    m0, vr10, mh0, vr9, 31;
        [C3]  div     mh1, vr2, mh0, vr10, vr1;
    } (result = vr2);

return result;
}
```

Fig. 62

```
inline FIX32_2 operator/(FIX32_2 a, FIX32_2 b)
{
    FIX32_2 result;

asm(vr0 = a, vr1 = b) {
                mskgen  vr3,31,31;   //vr3 = 0x80000000
                mskgen  vr4,31,30;   //vr4 = 0xc0000000
                cmpgt   C0:C1,vr0,0;
        [C0]    negvw   vr5,vr0;     //sign-change vr0 negatively (vr0')
        [C1]    mov     vr5,vr0;
                cmpgt   C0:C1,vr1,0;
        [C0]    negvw   vr6,vr1;     //sign-change vr1 negatively (vr1')
        [C1]    mov     vr6,vr1;
                cmpeq   C0:C1,vr0,vr3;
                cmplta  C0:C1,vr6,vr4,C0;//vr0=-2 and vr1'<0xc0000000?
        [C1]    aslvw   vr6,vr6,1;   //!when (vr0=-2 and vr1'<0xc0000000)
                cmplea  C2:C3,vr5,vr6,C1;
        [C2]    lsr     vr7,vr0,31;  //!in the case of (vr0=-2 and vr1'
        [C2]    lsr     vr8,vr1,31;  //<0xc0000000) and vr0' <= 2vr1'
        [C2]    xor     vr9,vr7,vr8; //(ovf decision), overflow
                cmpeqn  C4:C5,vr9,0,C2;
        [C4]    mskgen  vr2,30,0;    //vr2 = 0x7fffffff
        [C5]    mskgen  vr2,31,31;   //vr2 = 0x80000000
        [C3]    extw    m0,vr10,vr0; //other than that
        [C3]    aslp    m0,vr11,mh0,vr10,30;
        [C3]    div     mh1,vr2,mh0,vr11,vr1;
    } (result = vr2);

return result;
}
inline FIX16_1 operator/(FIX16_1 a, int b)
{
    FIX16_1 result;

asm(vr0 = a, vr1 = b) {
    extw m0,vr3,vr0;
    div  mh1,vr4,mh0,vr3,vr1;
    sath vr2,vr4;
    } (result = vr2);

return result;
}
inline FIX16_2 operator/(FIX16_2 a, int b)
{
    FIX16_2 result;

asm(vr0 = a, vr1 = b) {
    extw m0,vr3,vr0;
    div  mh1,vr4,mh0,vr3,vr1;
    sath vr2,vr4;
    } (result = vr2);

return result;
}
```

Fig. 63

```
inline FIX32_1 operator/(FIX32_1 a, int b)
{
    FIX32_1 result;

asm(vr0 = a, vr1 = b) {
                  cmpeq    C0:C1,vr1,1;
        [C0]      mov      vr2,vr0;       //when dividend=1, Rc = Ra
        [C1]      mskgen   vr3,31,31;     //0x80000000
                  cmpeqn   C2:C3,vr0,vr3,C1;
                  cmpeqa   C4:C5,vr1,-1,C2;
        [C4]      mskgen   vr2,30,0;      //when dividend=-1 and divisor=-1, Rc = 0x7fffffff
        [C5]      extw     m0,vr4,vr0;    //other than that
        [C5]      div      mh1,vr2,mh0,vr4,vr1;
    } (result = vr2);

return result;
} inline FIX32_2 operator/(FIX32_2 a, int b)
{
    FIX32_2 result;

asm(vr0 = a, vr1 = b) {
                  mskgen   vr3,31,31;     //Rd = 0x80000000
                  mskgen   vr4,31,30;     //Re = 0xc0000000
                  cmpgt    C0:C1,vr0,0;
        [C0]      negvw    vr5,vr0;       //sign-change Ra negatively (Ra')
        [C1]      mov      vr5,vr0;
                  aslvw    vr6,vr1,30;    //int-->FIX32_2
                  cmpgt    C0:C1,vr6,0;
        [C0]      negvw    vr7,vr6;       //sign-change Rb negatively (Rb')
        [C1]      mov      vr7,vr6;
                  cmpeq    C0:C1,vr0,vr3;
                  cmplta   C0:C1,vr7,vr4,C0;//Ra=-2 and Rb'<0xc0000000?
        [C1]      aslvw    vr7,vr7,1;     //!when(Ra=-2 and Rb'<0xc0000000)
                  cmplea   C2:C3,vr5,vr7,C1;
        [C2]      lsr      vr8,vr0,31;    //!in the case of (Ra=-2 and Rb'<0xc0000000)
        [C2]      lsr      vr9,vr1,31;    // and Ra' <=2Rb' (ovf decision)
        [C2]      xor      vr10,vr8,vr9;  //overflow
                  cmpeqn   C4:C5,vr10,0,C2;
        [C4]      mskgen   vr2,30,0;      //Rc = 0x7fffffff
        [C5]      mskgen   vr2,31,31;     //Rc = 0x80000000
        [C3]      extw     m0,vr11,vr0;   //other than that
        [C3]      div      mh1,vr2,mh0,vr11,vr1;
    } (result = vr2);

return result;
} inline FIX16_1 operator/(FIX16_1 a, float b)
{
    FIX16_1 c = b;
    return a/c;
}
```

Fig. 64

```
inline FIX16_1 operator/(FIX16_1 a, double b)
{
    FIX16_1 c = b;
    return a/c;
} inline FIX32_1 operator/(FIX32_1 a, float b)
{
    FIX32_1 c = b;
    return a/c;
} inline FIX32_1 operator/(FIX32_1 a, double b)
{
    FIX32_1 c = b;
    return a/c;
} inline FIX16_2 operator/(FIX16_2 a, float b)
{
    FIX16_2 c = b;
    return a/c;
} inline FIX16_2 operator/(FIX16_2 a, double b)
{
    FIX16_2 c = b;
    return a/c;
} inline FIX32_2 operator/(FIX32_2 a, float b)
{
    FIX32_2 c = b;
    return a/c;
} inline FIX32_2 operator/(FIX32_2 a, double b)
{
    FIX32_2 c = b;
    return a/c;
} inline FIX16_1& FIX16_1::operator/=(FIX16_1    b)
{
    *this = *this / b;
    return *this;
} inline volatile FIX16_1&  FIX16_1::operator/=(FIX16_1    b) volatile
{
    *this = *this / b;
    return *this;
} inline FIX16_1& FIX16_1::operator/=(int    b)
{
    *this = *this / b;
    return *this;
}
```

Fig. 65

```
inline volatile FIX16_1& FIX16_1::operator/=(int    b) volatile
{
    *this = *this / b;
    return *this;
} inline FIX16_1& FIX16_1::operator/=(float    b)
{
    *this = *this / b;
    return *this;
} inline volatile FIX16_1& FIX16_1::operator/=(float    b) volatile
{
    *this = *this / b;
    return *this;
} inline FIX16_1& FIX16_1::operator/=(double    b)
{
    *this = *this / b;
    return *this;
} inline volatile FIX16_1& FIX16_1::operator/=(double    b) volatile
{
    *this = *this / b;
    return *this;
} inline FIX32_1& FIX32_1::operator/=(FIX32_1    b)
{
    *this = *this / b;
    return *this;
} inline volatile FIX32_1& FIX32_1::operator/=(FIX32_1    b) volatile
{
    *this = *this / b;
    return *this;
} inline FIX32_1& FIX32_1::operator/=(int    b)
{
    *this = *this / b;
    return *this;
} inline volatile FIX32_1& FIX32_1::operator/=(int    b) volatile
{
    *this = *this / b;
    return *this;
} inline FIX32_1& FIX32_1::operator/=(float    b)
{
    *this = *this / b;
    return *this;
```

Fig. 66

```
} inline volatile FIX32_1& FIX32_1::operator/=(float    b) volatile
{
    *this = *this / b;
    return *this;
} inline FIX32_1& FIX32_1::operator/=(double   b)
{
    *this = *this / b;
    return *this;
} inline volatile FIX32_1& FIX32_1::operator/=(double   b) volatile
{
    *this = *this / b;
    return *this;
} inline FIX16_2& FIX16_2::operator/=(FIX16_2   b)
{
    *this = *this / b;
    return *this;
} inline volatile FIX16_2& FIX16_2::operator/=(FIX16_2   b) volatile
{
    *this = *this / b;
    return *this;
} inline FIX16_2& FIX16_2::operator/=(int   b)
{
    *this = *this / b;
    return *this;
} inline volatile FIX16_2& FIX16_2::operator/=(int    b) volatile
{
    *this = *this / b;
    return *this;
} inline FIX16_2& FIX16_2::operator/=(float   b)
{
    *this = *this / b;
    return *this;
} inline volatile FIX16_2& FIX16_2::operator/=(float   b) volatile
{
    *this = *this / b;
    return *this;
} inline FIX16_2& FIX16_2::operator/=(double   b)
{
    *this = *this / b;
```

Fig. 67

```
    return *this;
} inline volatile FIX16_2& FIX16_2::operator/=(double   b) volatile
{
    *this = *this / b;
    return *this;
} inline FIX32_2& FIX32_2::operator/=(FIX32_2   b)
{
    *this = *this / b;
    return *this;
} inline volatile FIX32_2& FIX32_2::operator/=(FIX32_2   b) volatile
{
    *this = *this / b;
    return *this;
} inline FIX32_2& FIX32_2::operator/=(int   b)
{
    *this = *this / b;
    return *this;
} inline volatile FIX32_2& FIX32_2::operator/=(int   b) volatile
{
    *this = *this / b;
    return *this;
} inline FIX32_2& FIX32_2::operator/=(float   b)
{
    *this = *this / b;
    return *this;
} inline volatile FIX32_2& FIX32_2::operator/=(float   b) volatile
{
    *this = *this / b;
    return *this;
} inline FIX32_2& FIX32_2::operator/=(double   b)
{
    *this = *this / b;
    return *this;
} inline volatile FIX32_2& FIX32_2::operator/=(double   b) volatile
{
    *this = *this / b;
    return *this;
} pragma _enable_asm_end
```

Fig. 68

```
#endif //__AMMPCC__
#endif //__FIXAMMP__
```

Fig. 69

```
/*********************************************************************
*
* (C)Copyright 2002 Matsushita Electric Industrial Co., Ltd.
*       funcammp.h
*       Version:
*       Release:
*       Date:          2002/6/19
*
*********************************************************************/

/* Avoid overloading */
#ifndef __FUNCAMMP__
define __FUNCAMMP__ include <stdlib.h> ifndef __AMMPCC__ long _abs(long);
long _max(long, long);
long _min(long, long);
long _adds(long, long);
long _subs(long, long);
int _bcnt1(long);
int _bseq0(long);
int _bseq1(long);
int _bseq(long);
int _log2(size_t size);
long _extr(long, unsigned int, unsigned int);
unsigned long _extru(long, unsigned int, unsigned int);
void _clrm(long&, long&);
void _mul(long&, long&, long&, long, long);
void _mac(long&, long&, long&, long, long);
void _msu(long&, long&, long&, long, long);
void *_modulo_add(void *, int, int, size_t, void *);
void *_brev_add(void *, int, int, int, size_t, void *);

else   /* defined __AMMPCC__ */ pragma _enable_asm_begin
pragma _enable_inline_begin long _extr(long, unsigned int, unsigned int);
unsigned long _extru(long, unsigned int, unsigned int);
int _log2(size_t size);

static inline long
_abs(long data)
{
    long result;

asm(vr0 = data) {
        abs    vr1, vr0;
    } (result = vr1);

return result;
}
```

Fig. 70

```
static inline long
_max(long data1, long data2)
{
    long result;

asm(vr0 = data1, vr1 = data2) {
        max    vr2, vr1, vr0;
    } (result = vr2);

return result;
}
static inline long
_min(long data1, long data2)
{
    long result;

asm(vr0 = data1, vr1 = data2) {
        min    vr2, vr1, vr0;
    } (result = vr2);

return result;
}
static inline long
_adds(long data1, long data2)
{
    long result;

asm(vr0 = data1, vr1 = data2) {
        adds   vr2, vr0, vr1;
    } (result = vr2);

return result;
}
static inline long
_subs(long data1, long data2)
{
    long result;

asm(vr0 = data1, vr1 = data2) {
        subs   vr2, vr0, vr1;
    } (result = vr2);

return result;
}
static inline int
_bcnt1(long data)
{
    long result;

asm(vr0 = data) {
        bcnt1  vr1, vr0;
    } (result = vr1);

return result;
}
```

Fig. 71

```
static inline int
_bseq0(long data)
{
    long result;

asm(vr0 = data) {
        bseq0 vr1, vr0;
    } (result = vr1);

return result;
}
static inline int
_bseq1(long data)
{
    long result;

asm(vr0 = data) {
        bseq1 vr1, vr0;
    } (result = vr1);

return result;
}
static inline int
_bseq(long data)
{
    long result;

asm(vr0 = data) {
        bseq vr1, vr0;
    } (result = vr1);

return result;
}
static inline void
_clrm(long &mh, long &ml)
{
    asm() {
        mul m0, vr1, vr0, 0;
    } (mh = mh0, ml = ml0);
} static inline void
_mul(long &mh, long&ml, long &c, long a, long b)
{
    asm(vr0 = a, vr1 = b) {
        mul m0, vr2, vr0, vr1;
    } (mh = mh0, ml = ml0, c = vr2);
} static inline void
_mac(long &mh, long &ml, long &c, long a, long b)
{
    asm(vr0 = a, vr1 = b, mh0 = mh, ml0 = ml) {
        mac m0, vr2, vr0, vr1, m0;
    } (mh = mh0, ml = ml0, c = vr2);
```

Fig. 72

```
}
static inline void
_msu(long &mh, long &ml, long &c, long a, long b)
{
    asm(vr0 = a, vr1 = b, mh0 = mh, ml0 = ml) {
        msu    m0, vr2, vr0, vr1, m0;
    } (mh = mh0, ml = ml0, c = vr2);
} static inline void *
_modulo_add(void *addr, int imm, int mask, size_t size, void *base)
{
    void *p;
    int tmp1, tmp2, tmp3;

tmp1 = _log2(size);
    tmp2 = mask + tmp1-1;
    tmp3 = imm << tmp1;

asm(vr0 = addr, vr2 = base, vr3 = tmp2, vr4 = tmp3) {
        mov      CFR0, vr3;
        add      vr6, vr0, vr4;
        addmsk   vr7, vr2, vr6;
    } (p = vr7);

return p;
} static inline void *
_brev_add(void *addr, int cnt, int imm, int mask, size_t size, void *base)
{
    void *p;
    int tmp1, tmp2, tmp3, tmp4;

tmp1 = _log2(size);
    tmp2 = mask + tmp1-1;
    tmp3 = 16 - mask - tmp1;
    tmp4 = imm << tmp3;

asm(vr0 = addr, vr1 = cnt, vr2 = base, vr3 = tmp2, vr4 = tmp3, vr5 = tmp4) {
        mov       CFR0, vr3;
        lsl       vr6, vr1, vr4;
        add       vr7, vr6, vr5;
        mskbrvh   vr8, vr2, vr7;
    } (p = vr8);

return p;
}
#pragma _enable_inline_end
pragma _enable_asm_end endif /* __AMMPCC__ */ endif /* __FUNCAMMP__ */
```

Arithmetic tree after optimization

Ordinary arithmetic tree

Fig. 76A

Example of configuring latency 1

```
<Example> Leave a space of 2 cycles between wte and rde
   static inline int getbits(int a)
   {
            int result ;
            asm (vr0 = a) {
                    LATENCY L1, L2, 2 ;
                    mov vr1, AVLD_BASEADDR ;
   L1:          wte C0:C1, (vr1, AVLD_GETBITS), vr0 ;
   L2:          rde C0:C1, vr2, (vr1, AVLD_READPORT) ;
            } (result = vr2) ;
            return result ;
   }
```

Fig. 76B

Example of configuring latency 2

```
<Example> Leave a space of 2 cycles after wte
          until next extended register access
   static inline void skipbits(int a)
   {
            asm (vr0 = a) {
                    mov vr1, AVLD_BASEADDR ;
                    wte C0:C1, (vr1, AVLD_SKIPBITS), vr0, LATENCY(2) ;
            } ;
   }
```

Fig. 77A

```
Sample program pragma _save_fxpmode func
func(void)                          Save FIX-type mode
{                                   Configure FIX-type mode to _1system
        FIX16_1  a;            →         (Main body)
        (Main body)                      Return to FIX-type mode
}
```

Fig. 77B

```
Internal processing

Save:          mov vr0, PSR0
1Configuration: or   vr1, vr0, 0x20 + mov PSR0, vr1
0Configuration: andn vr1, vr0, 0x20 + mov PSR0, vr1
Return:        mov PSR0, vr0
```

Fig. 77C

```
Application Example

Regarding four functions, f11, f21, f22 and f23, in the case of
    the function f11: _1 system calling the function f21: _2 system;
    the function f21: _ 2system calling the function f22: _2 system;
    the function f22: _2 system calling the function f23: _2 system
    _____
    Since the only function that may be called by other modes is f21,
    it is possible to switch to a normal mode by executing a pragma
    designation only to this function.
```

COMPILER, COMPILER APPARATUS AND COMPILATION METHOD

This application is a divisional of application Ser. No. 10/630,705, filed Jul. 31, 2003 now U.S. Pat. No. 7,284,241.

BACKGROUND OF THE INVENTION (1) Field of the Invention

The present invention relates to a compiler that converts a source program described in a high-level language such as C++ language into a machine language, and especially to optimization by a compiler.

(2) Description of the Related Art

A high-performance compiler that can effectively exploit a high function of a processor is highly sought after as the function of the processor has been greatly improved in recent years. In other words, a compiler that effectively generates advanced and specific instructions that the target processor executes is demanded.

For example, a processor that executes operation instructions in various fixed-point formats required for media processing such as digital signal processing and a high-performance processor that executes SIMD (Single Instruction Multiple Data) type instructions have been developed. The compiler that targets such a processor is required to optimize a code size and execution speed by effectively generating the operation instructions in the various fixed-point formats and the SIMD type instructions.

It is not necessarily said, however, that a conventional compiler effectively generates advanced and specific instructions that the processor executes in regard to a source program described in a high-level language such as C++ language. Consequently, in the development of applications for media processing and others that require strict conditions in terms of the code size and the execution speed, a user has no choice but to describe critical points in assembler instructions under the present conditions. But there is a problem that the programming by the assembler instructions not only requires more man-hours but also is vastly inferior in maintainability and portability compared with the development using a high-level language such as C++ language.

Additionally, the conventional compiler has within itself optimization processing for generating the advanced and specific instructions and the like that the processor executes. In other words, a processing module for optimization effectively using features of the target processor is included in the compiler itself and is integrated therein. Consequently, when a function of the compiler is extended or the specifications of the target compiler are changed, it is necessary to reconfigure the whole compiler. There is a problem that an upgrading of the version and the like of the compiler must be repeated numerous times.

SUMMARY OF THE INVENTION

In view of the foregoing, it is the first object of this invention to provide a compiler that can effectively generate advanced and specific instructions that a processor executes.

Moreover, it is the second object of this invention to provide a compiler that can make improvements through expanding functions and the like without frequently upgrading of the version of the compiler itself.

The compiler according to the present invention translates a source program into a machine language program, the program including operation definition information in which an operation that corresponds to a machine language instruction specific to a target processor is defined, the compilation method comprising: a parser step of analyzing the source program; an intermediate code conversion step of converting the analyzed source program into intermediate codes; an optimization step of optimizing the converted intermediate codes; and a code generation step of converting the optimized intermediate codes into machine language instructions, wherein the intermediate code conversion step includes: a detection sub-step of detecting whether or not any of the intermediate codes refer to the operation defined in the operation definition information; and a substitution sub-step of substituting the intermediate code with a corresponding machine language instruction, when the intermediate code is detected, and in the optimization step, the intermediate codes are optimized, the intermediate codes including the machine language instruction substituted for the intermediate code in the substitution sub-step.

For example, the program according to the present invention is made up of a header file included in the source program and the compiler that translates the source program into the machine language program; in the header file, a class made of data and methods is defined; the compilation method comprising: a parser step of analyzing the source program; an intermediate code conversion step of converting the analyzed source program into intermediate codes; an optimization step of optimizing the converted intermediate codes; and a code generation step of converting the optimized intermediate codes into machine language instructions, wherein the intermediate code conversion step includes: a detection sub-step of detecting whether or not any of the intermediate codes refer to the class defined in the header file; and a substitution sub-step of substituting the intermediate code with a corresponding machine language instruction, when the intermediate code is detected, and in the optimization step, the intermediate codes are optimized, the intermediate codes including the machine language instruction substituted for the intermediate code in the substitution sub-step.

Hereby, when there is a statement that refers to the class defined in the header file in the source program, the intermediate code corresponding to the statement becomes a target of the optimization processing after the intermediate code is converted into a machine language instruction, and therefore, the intermediate code can be optimized together with machine language instructions in the vicinity. Additionally, since the compiler performs the optimization not only by the functional capability of the compiler itself (optimization processing) but also in connection with the definitions in the header file, the compiler can increase the statements that are the targets of the optimization and improves the level of the optimization.

Here, it is acceptable that the class defines a fixed point type, and in the detection sub-step, intermediate codes that use the fixed point type data are detected and it is also acceptable that the method in the class defines operators targeting the fixed point type data, in the detection sub-step, the detection is executed based on whether or not a set of the operator and the data type targeting an operation agrees with the definition in the method, and in the substitution step, an intermediate code whose set of the operator and the data type agrees with the definition is substituted with a corresponding machine language instruction.

Hereby, since the fixed point types and the operators defined by the header file are converted similarly with ordinary types into the corresponding intermediate codes and the machine language instructions by the compiler, by simply including the header file in the source program, similarly with the ordinary types, the user can declare and use the type corresponding to the fixed point mode specific to the target processor.

Moreover, the compiler according to the present invention comprises a header file included in the source program and the compiler that translates the source program into the machine language program; in the header file, a function is defined; the compilation method comprising: a parser step of analyzing the source program; an intermediate code conversion step of converting the analyzed source program into intermediate codes; an optimization step of optimizing the converted intermediate codes; and a code generation step of converting the optimized intermediate codes into machine language instructions, wherein the intermediate code conversion step includes: a detection sub-step of detecting whether or not any of the intermediate codes refer to the function defined in the header file; and a substitution sub-step of substituting the intermediate code with a corresponding machine language instruction, when the intermediate code is detected, and in the optimization step, the intermediate codes are optimized, the intermediate codes including the machine language instruction substituted for the intermediate code in the substitution sub-step.

Hereby, when there is a statement that refers to the function (the built-in function) defined in the header file in the source program, the intermediate code corresponding to the statement becomes a target of the optimization processing after the intermediate code is converted into a machine language instruction defined by the header file, and therefore, the intermediate code can be optimized together with machine language instructions in the vicinity. Furthermore, when the user wants to use high-functional instructions specific to the processor, the user just needs to describe that the header file is included in the source program and that a necessary built-in function is called in the source program. In other words, the user is released from coding with assembler instructions.

As is described above, by the compiler according to the present invention, the high-functional and specific instructions that the target processor executes are effectively generated; the optimization is performed at a high level; and a flexible response by the header file such as function expansion become possible, and therefore, the practical value of the compiler is extremely high especially as a development tool for a media processing application for which strict specifications in both of the code size and the execution speed are required.

It should be noted that the present invention can be realized not only as the compiler described above, but also as a compiler apparatus using the steps included in the program for the compiler as the steps and as a computer-readable recoding medium in which the characteristic compiler or the header file are recorded. Then, it goes without saying that the program and the data file can be widely distributed through a recording medium such as a CD-ROM or a transmission medium such as the Internet.

As further information about technical background to this application, Japanese patent application No. 2002-33668 filed Aug. 2, 2002 is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 11 is a diagram showing a configuration of a program status register (PSR) of the processor.

FIG. 12 is a diagram showing a configuration of a condition flag register (CFR) of the processor.

FIG. 17 is a timing diagram showing a pipeline behavior of the processor.

FIG. 18 is a timing diagram showing each stage of the pipeline behavior of the processor at the time of executing an instruction.

FIG. 19 is a diagram showing a parallel behavior of the processor.

FIG. 20 is a diagram showing a format of instructions executed by the processor.

FIG. 21 is a diagram explaining an instruction belonging to a category "ALUadd (addition) system)".

FIG. 22 is a diagram explaining an instruction belonging to a category "ALUsub (subtraction) system)".

FIG. 23 is a diagram explaining an instruction belonging to a category "ALUlogic (logical operation) system and the like".

FIG. 24 is a diagram explaining an instruction belonging to a category "CMP (comparison operation) system".

FIG. 26 is a diagram explaining an instruction belonging to a category "mac (sum of products operation) system".

FIG. 27 is a diagram explaining an instruction belonging to a category "msu (difference of products) system".

FIG. 28 is a diagram explaining an instruction belonging to a category "MEMld (load from memory) system".

FIG. 29 is a diagram explaining an instruction belonging to a category "MEMstore (store in memory) system".

FIG. 30 is a diagram explaining an instruction belonging to a category "BRA (branch) system".

FIG. 31 is a diagram explaining an instruction belonging to a category "BSasl (arithmetic barrel shift) system and the like".

Figure 32:
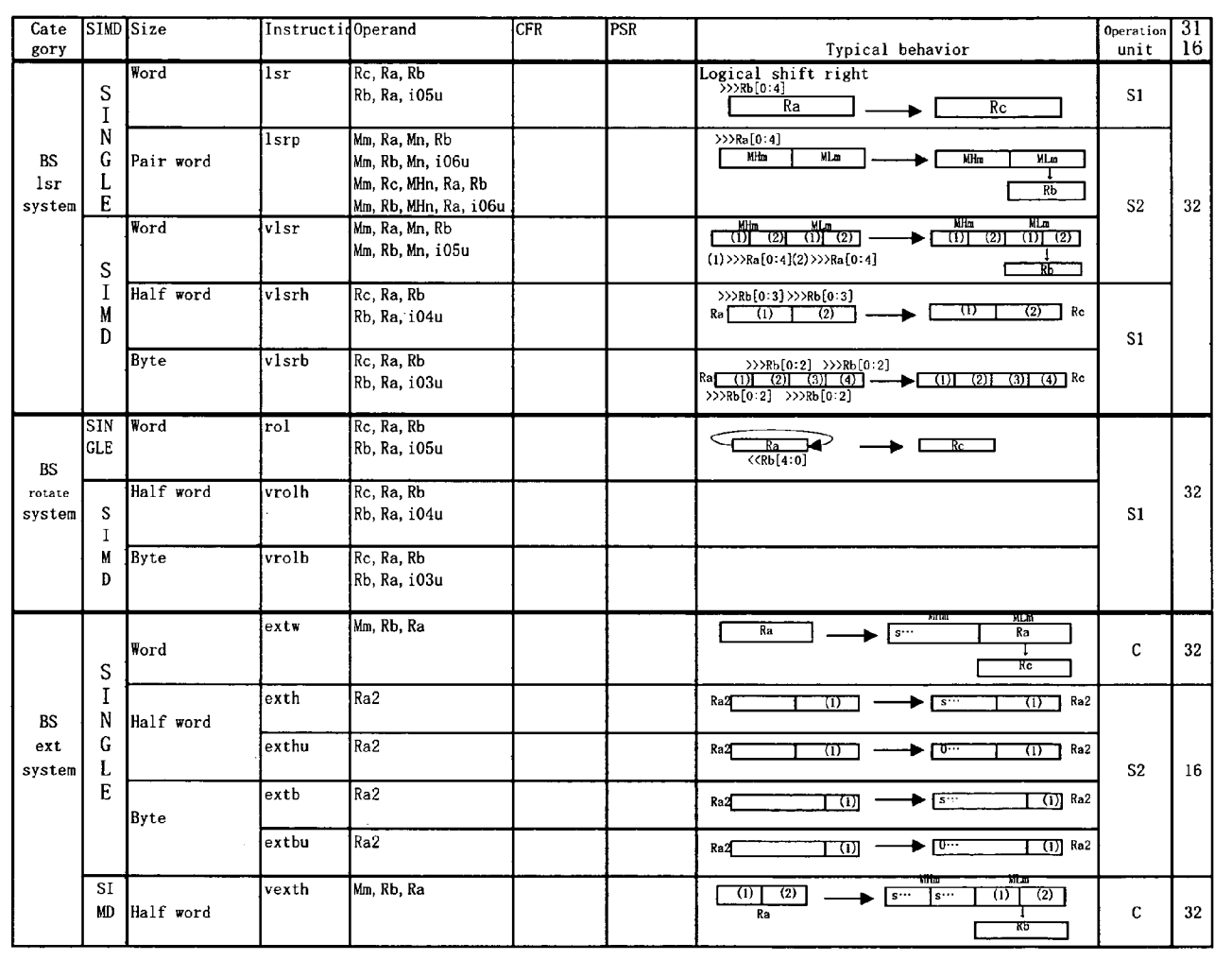

FIG. 32 is a diagram explaining an instruction belonging to a category "BSlsr (logical barrel shift) system and the like".

FIG. 33 is a diagram explaining an instruction belonging to a category "CNVvaln (arithmetic conversion) system".

FIG. 34 is a diagram explaining an instruction belonging to a category "CNV (general conversion) system".

FIG. 35 is a diagram explaining an instruction belonging to a category "SATvlpk (saturation processing) system".

FIG. 36 is a diagram explaining an instruction belonging to a category "ETC (et cetera) system".

FIG. 38 is a diagram showing a part of a list in the operator definition file.

FIG. 39 is a diagram showing a part of a list in the operator definition file.

FIG. 40 is a diagram showing a part of a list in the operator definition file.

FIG. 41 is a diagram showing a part of a list in the operator definition file.

FIG. 42 is a diagram showing a part of a list in the operator definition file.

FIG. 43 is a diagram showing a part of a list in the operator definition file.

FIG. 44 is a diagram showing a part of a list in the operator definition file.

FIG. 45 is a diagram showing a part of a list in the operator definition file.

FIG. 46 is a diagram showing a part of a list in the operator definition file.

FIG. 47 is a diagram showing a part of a list in the operator definition file.

FIG. 48 is a diagram showing a part of a list in the operator definition file.

FIG. 49 is a diagram showing a part of a list in the operator definition file.

FIG. 50 is a diagram showing a part of a list in the operator definition file.

FIG. 51 is a diagram showing a part of a list in the operator definition file.

FIG. 52 is a diagram showing a part of a list in the operator definition file.

FIG. 53 is a diagram showing a part of a list in the operator definition file.

FIG. 54 is a diagram showing a part of a list in the operator definition file.

FIG. 55 is a diagram showing a part of a list in the operator definition file.

FIG. 56 is a diagram showing a part of a list in the operator definition file.

FIG. 57 is a diagram showing a part of a list in the operator definition file.

FIG. 58 is a diagram showing a part of a list in the operator definition file.

FIG. 59 is a diagram showing a part of a list in the operator definition file.

FIG. 60 is a diagram showing a part of a list in the operator definition file.

FIG. 61 is a diagram showing a part of a list in the operator definition file.

FIG. 62 is a diagram showing a part of a list in the operator definition file.

FIG. 63 is a diagram showing a part of a list in the operator definition file.

FIG. 64 is a diagram showing a part of a list in the operator definition file.

FIG. 65 is a diagram showing a part of a list in the operator definition file.

FIG. 66 is a diagram showing a part of a list in the operator definition file.

FIG. 67 is a diagram showing a part of a list in the operator definition file.

FIG. 68 is a diagram showing a part of a list in the operator definition file.

FIG. 69 is a diagram showing a part of a list in the built-in function definition file.

FIG. 70 is a diagram showing a part of a list in the built-in function definition file.

FIG. 71 is a diagram showing a part of a list in the built-in function definition file.

FIG. 72 is a diagram showing a part of a list in the built-in function definition file.

FIGS. 76A and 76B are diagrams showing an example of a sample program to explain behaviors of the latency optimization unit.

FIGS. 77A-77C are diagrams explaining behaviors of the fixed point mode switch unit of the parser unit.

DESCRIPTION OF THE PREFERRED EMBODIMENT(S)

The compiler according to the present embodiment of the present invention is explained below in detail using the figures.

The compiler according to the present embodiment is a cross compiler that translates a source program described in a high-level language such as C/C++ languages into a machine language program that a specific processor (a target) can execute and has a characteristic that it can designate directives of optimization minutely concerning a code size and execution time of the machine language program to be generated.
(Processor)

For a start, an example of a target processor of the compiler according to the present embodiment is explained using FIG. 1 through FIG. 36.

The processor that is the target of the compiler according to the present embodiment is, for example, a general-purpose processor that has been developed targeting on the field of AV media signal processing technology, and executable instructions has higher parallelism compared with ordinary microcomputers.

Figure 1:
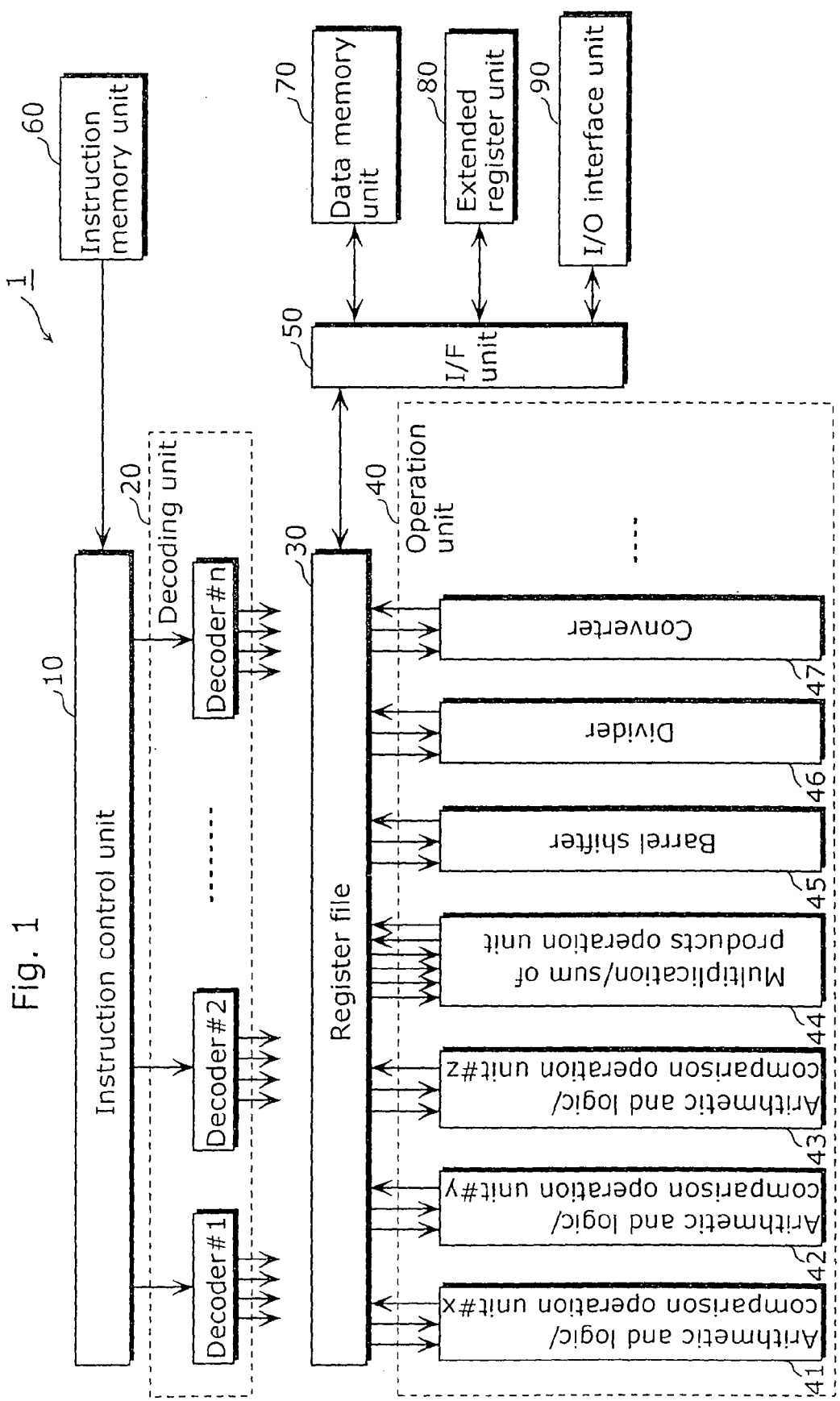
FIG. 1 is a schematic block diagram showing a target processor of a compiler according to the present invention.

FIG. 1 is a schematic block diagram showing the present processor. The processor 1 is an operational apparatus whose word length is 32 bits (a word) and is made up of an instruction control unit 10, a decoding unit 20, a register file 30, an operation unit 40, an I/F unit 50, an instruction memory unit 60, a data memory unit 70, an extended register unit 80, and an I/O interface unit 90. The operation unit 40 includes arithmetic and logic/comparison operation units 41~43, a multiplication/sum of products operation unit 44, a barrel shifter 45, a divider 46, and a converter 47 for performing SIMD instructions. The multiplication/sum of products operation unit 44 is capable of handling a maximum of 65-bit accumulation so as not to decrease bit precision. The multiplication/ sum of products operation unit 44 is also capable of executing SIMD instructions as in the case of the arithmetic and logic/comparison operation units 41~43. Furthermore, the processor 1 is capable of parallel execution of an arithmetic and logic/comparison operation instruction on a maximum of three data elements.

Figure 2:
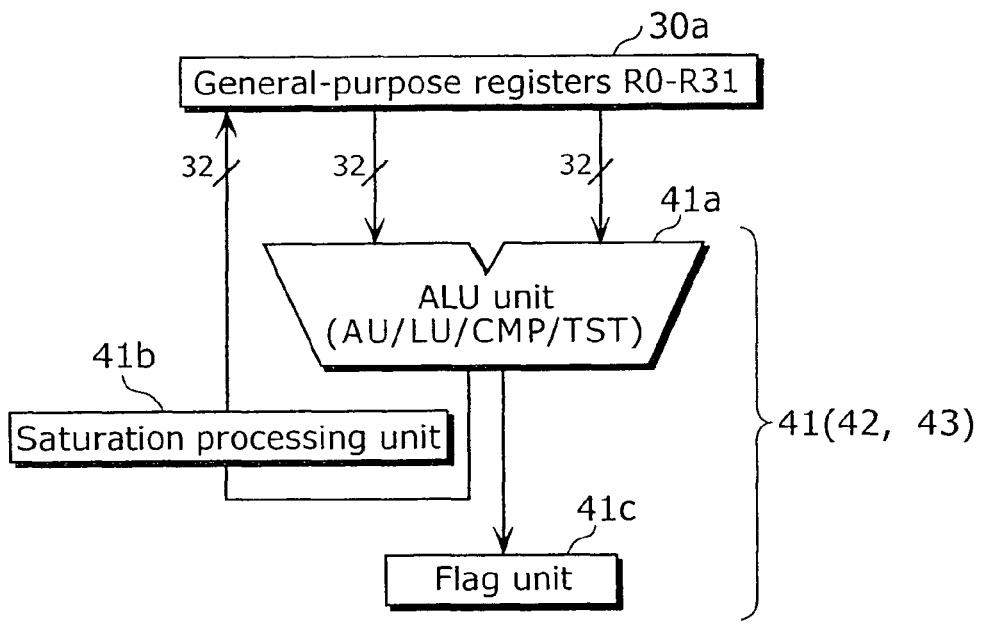
FIG. 2 is a schematic diagram showing arithmetic and logic/comparison operation units of the processor.

FIG. 2 is a schematic diagram showing the arithmetic and logic/comparison operation units 41~43. Each of the arithmetic and logic/comparison operation units 41~43 is made up of an ALU unit 41a, a saturation processing unit 41b, and a flag unit 41c. The ALU unit 41a includes an arithmetic operation unit, a logical operation unit, a comparator, and a TST. The bit widths of operation data to be supported are 8 bits (a byte. At this time, use four operation units in parallel), 16 bits (a half word. At this time, use two operation units in parallel) and 32 bits (a word. At this time, process 32-bit data using all operation units). For a result of an arithmetic operation, the flag unit 41c and the like detect an overflow and generate a condition flag. For a result of each of the operation units, the comparator and the TST, an arithmetic shift right, saturation by the saturation processing unit 41b, the detection of maximum/minimum values, absolute value generation processing are performed.

Figure 3:
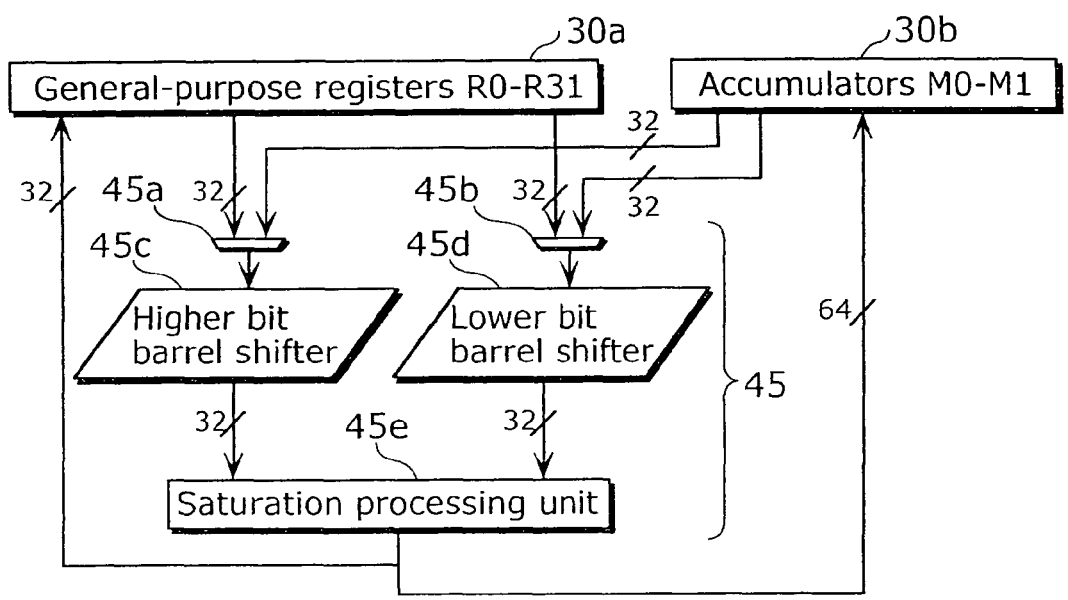
FIG. 3 is a block diagram showing a configuration of a barrel shifter of the processor.

FIG. 3 is a block diagram showing the configuration of the barrel shifter 45. The barrel shifter 45, which is made up of selectors 45a and 45b, a higher bit shifter 45c, a lower bit shifter 45d, and a saturation processing unit 45e, executes an arithmetic shift of data (shift in the 2's complement number system) or a logical shift of data (unsigned shift). Usually, 32-bit or 64-bit data are inputted to and outputted from the barrel shifter 45. The amount of shift of target data stored in the registers 30a and 30b are specified by another register or according to its immediate value. An arithmetic or logical shift in the range of left 63 bits and right 63 bits is performed for the data, which is then outputted in an input bit length.

The barrel shifter 45 is capable of shifting 8-, 16-, 32-, and 64-bit data in response to a SIMD instruction. For example, the barrel shifter 45 can shift four pieces of 8-bit data in parallel.

Arithmetic shift, which is a shift in the 2's complement number system, is performed for aligning decimal points at the time of addition and subtraction, for multiplying a power of 2 (2, the $2^{nd}$ power of 2, the $-1^{st}$ power of 2) and other purposes.

Figure 4:
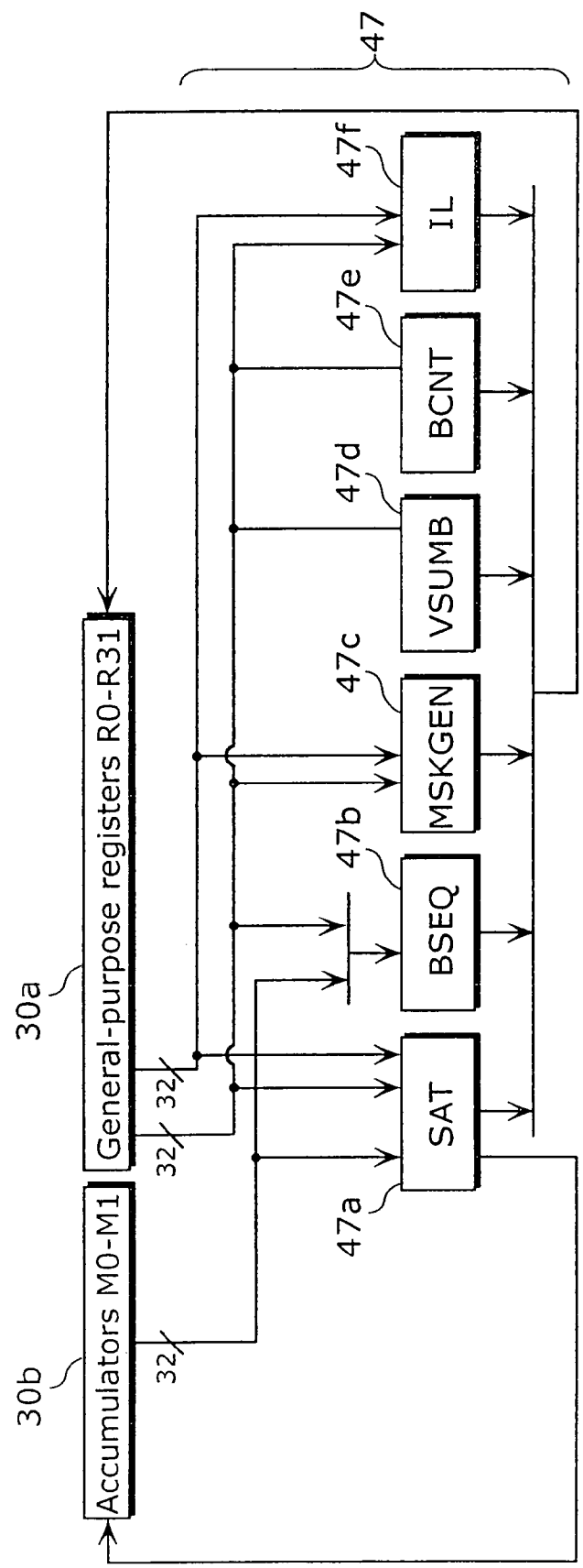
FIG. 4 is a block diagram showing a configuration of a converter of the processor.

FIG. 4 is a block diagram showing the configuration of the converter 47. The converter 47 is made up of a saturation block (SAT) 47a, a BSEQ block 47b, an MSKGEN block 47c, a VSUMB block 47d, a BCNT block 47e, and an IL block 47f.

The saturation block (SAT) 47a performs saturation processing for input data. Having two blocks for the saturation processing of 32-bit data makes it possible to support a SIMD instruction executed for two data elements in parallel.

The BSEQ block 47b counts consecutive 0s or 1s from the MSB.

The MSKGEN block 47c outputs a specified bit segment as 1, while outputting the others as 0.

The VSUMB block 47d divides the input data into specified bit widths, and outputs their total sum.

The BCNT block 47e counts the number of bits in the input data specified as 1.

The IL block 47f divides the input data into specified bit widths, and outputs a value resulted from exchanging the position of each data block.

Figure 5:
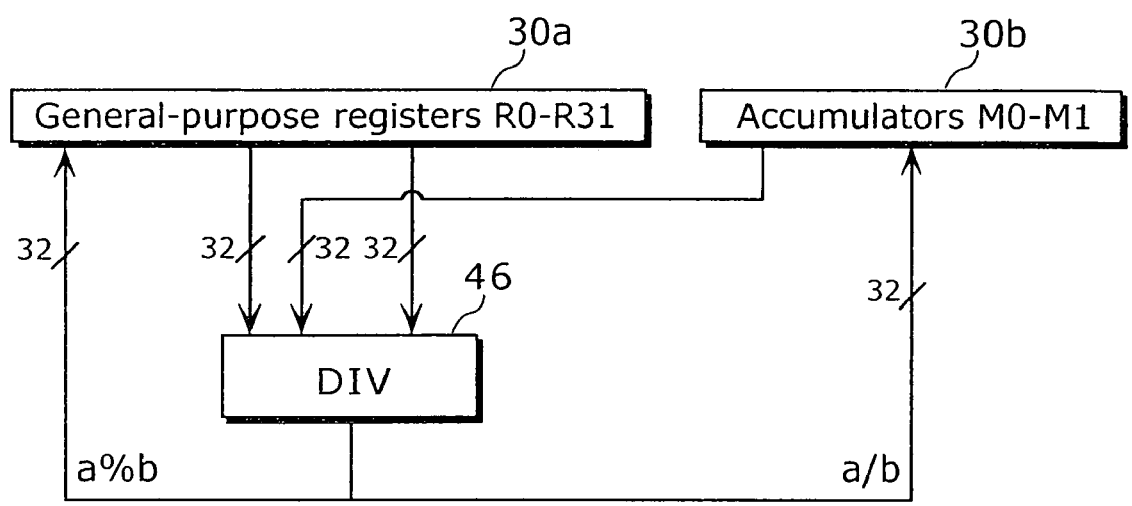
FIG. 5 is a block diagram showing a configuration of a divider of the processor.

FIG. 5 is a block diagram showing the configuration of the divider 46. Letting a dividend be 64 bits and a divisor be 32 bits, the divider 46 outputs 32 bits as a quotient and a modulo, respectively. 34 cycles are involved for obtaining a quotient and a modulo. The divider 46 can handle both singed and unsigned data. It should be noted, however, that an identical setting is made concerning the presence/absence of signs of data serving as a dividend and a divisor. Also, the divider 46 has the capability of outputting an overflow flag, and a 0 division flag.

Figure 6:
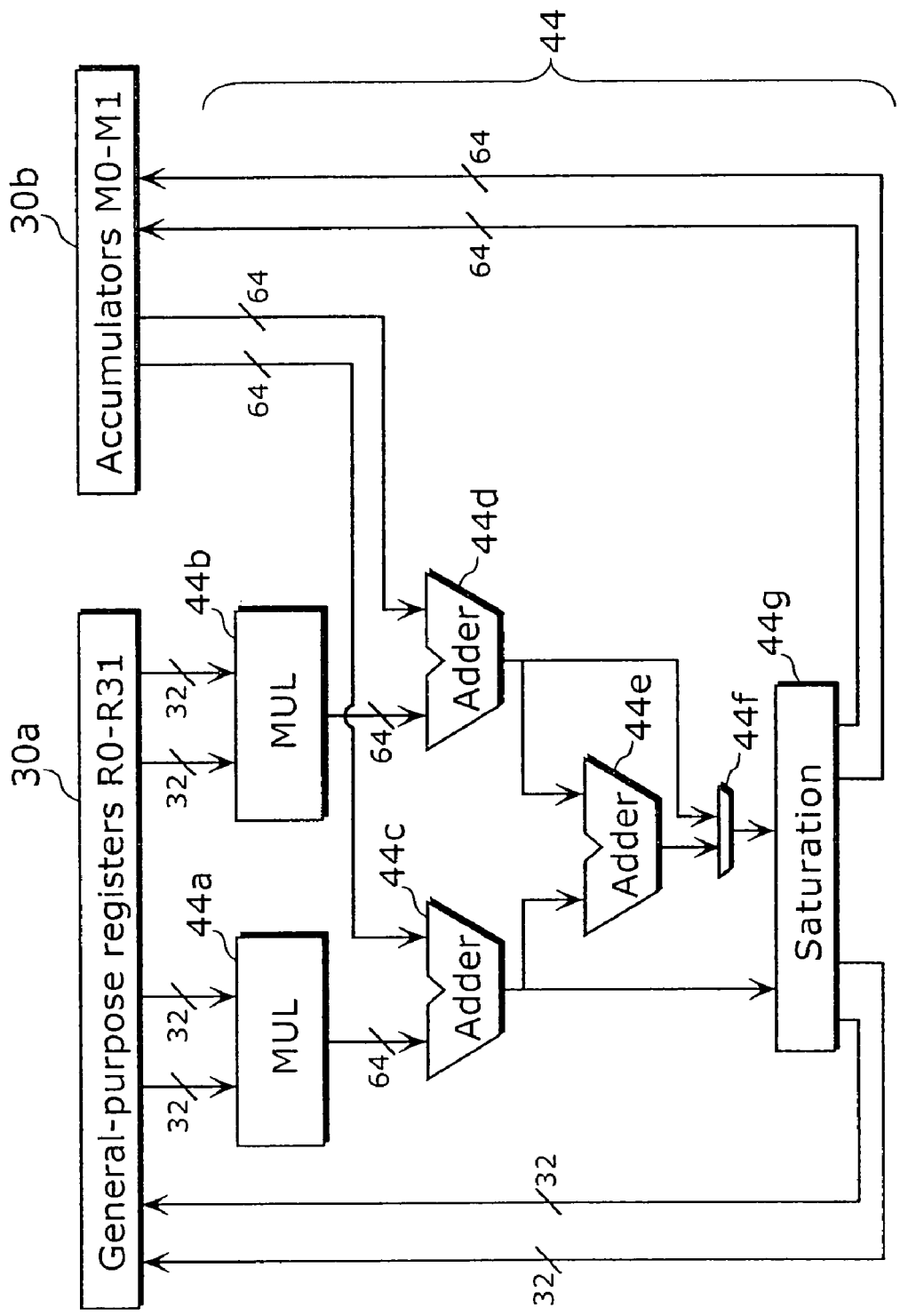
FIG. 6 is a block diagram showing a configuration of a multiplication/sum of products operation unit of the processor.

FIG. 6 is a block diagram showing the configuration of the multiplication/sum of products operation unit 44. The multiplication/sum of products operation unit 44, which is made up of two 32-bit multipliers (MUL) 44a and 44b, three 64-bit adders (Adder) 44c~44e, a selector 44f and a saturation processing unit (Saturation) 44g, performs the following multiplications and sums of products:

32×32-bit signed multiplication, sum of products, and difference of products;

32×32-bit unsigned multiplication;

16×16-bit signed multiplication, sum of products, and difference of products performed on two data elements in parallel; and 32×16-bit t signed multiplication, sum of products, and difference of products performed on two data elements in parallel;

The above operations are performed on data in integer and fixed point format (h1, h2, w1, and w2). Also, the results of these operations are rounded and saturated.

Figure 7:
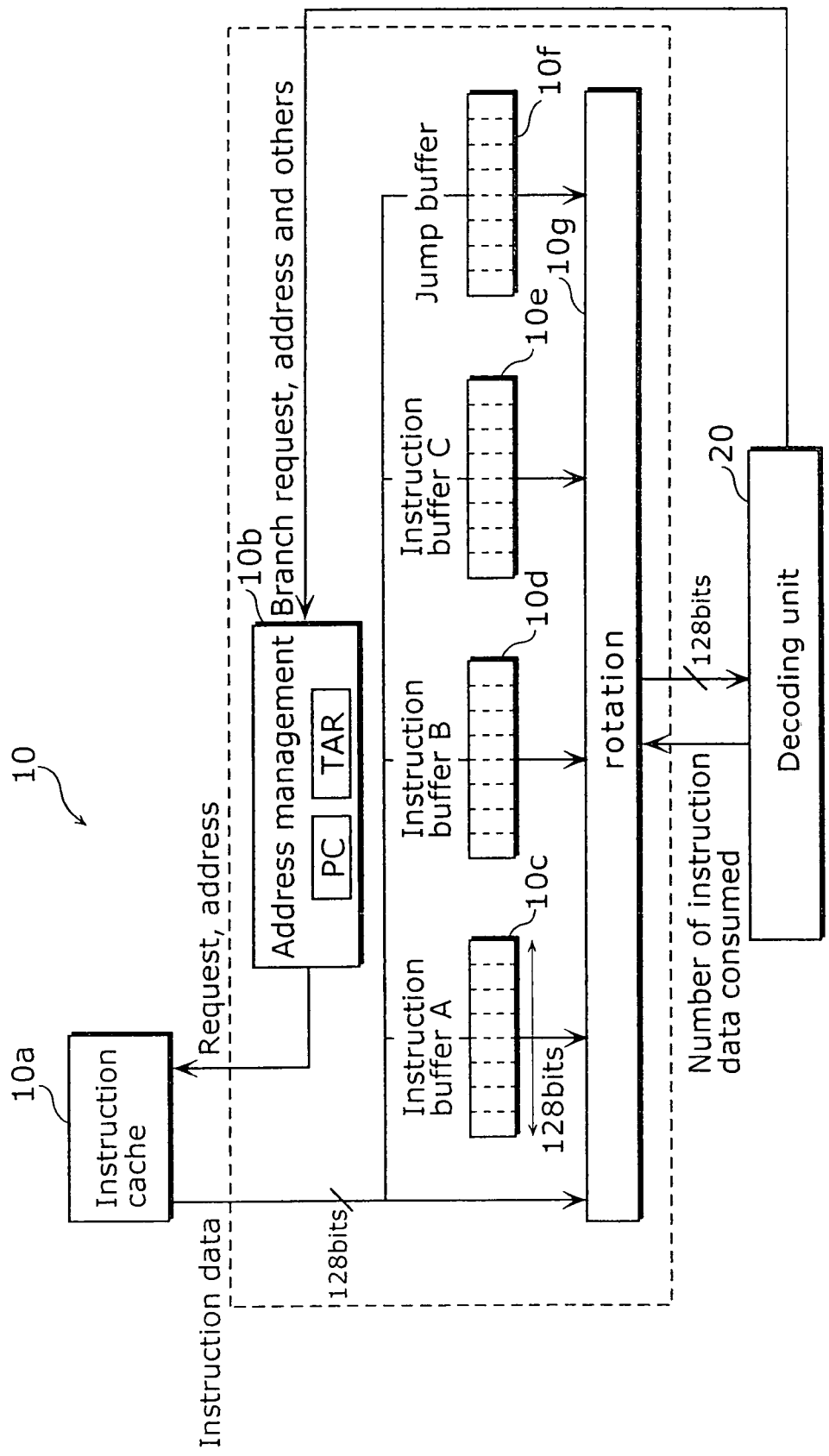
FIG. 7 is a block diagram showing a configuration of an instruction control unit of the processor.

FIG. 7 is a block diagram showing the configuration of the instruction control unit 10. The instruction control unit 10, which is made up of an instruction cache 10a, an address management unit 10b, instruction buffers 10c~10e, a jump buffer 10f, and a rotation unit (rotation) 10g, issues instructions at ordinary times and at branch points. Having three 128-bit instruction buffers (the instruction buffers 10c~10e) makes it possible to support the maximum number of parallel instruction execution. Regarding branch processing, the instruction control unit 10 stores in advance a branch destination address in the below-described TAR register via the jump buffer 10f and others before performing a branch (settar instruction). The branch is performed using the branch destination address stored in the TAR register.

It should be noted that the processor 1 is a processor employing the VLIW architecture. The VLIW architecture is an architecture allowing a plurality of instructions (e.g. load, store, operation, and branch) to be stored in a single instruction word, and such instructions to be executed all at once. By programmers describing a set of instructions which can be executed in parallel as a single issue group, it is possible for such issue group to be processed in parallel. In this specification, the delimiter of an issue group is indicated by ";;". Notational examples are described below.

EXAMPLE 1 mov r1,0×23;;

This instruction description indicates that only an instruction "mov" shall be executed.

EXAMPLE 2 mov r1, 0×38
add r0, r1, r2
sub r3, r1, r2;;

These instruction descriptions indicate that three instructions of "mov", "add" and "sub" shall be executed in parallel.

The instruction control unit 10 identifies an issue group and sends it to the decoding unit 20. The decoding unit 20 decodes the instructions in the issue group, and controls resources required for executing such instructions.

Next, an explanation is given for registers included in the processor 1.

Table 1 below lists a set of registers of the processor 1.

TABLE 1

| Register name | Bit width | No. of registers | Usage |
|---|---|---|---|
| R0~R31 | 32 bits | 32 | General-purpose registers. Used as data memory pointer, data storage and the like when operation instruction is executed. |
| TAR | 32 bits | 1 | Branch register. Used as branch address storage at branch point. |
| LR | 32 bits | 1 | Link register. |
| SVR | 16 bits | 2 | Save register. Used for saving condition flag (CFR) and various modes. |
| M0~M1 (MH0: ML0~MH1~ML1) | 64 bits | 2 | Operation registers. Used as data storage when operation instruction is executed. |

Table 2 below lists a set of flags (flags managed in a condition flag register and the like described later) of the processor 1.

TABLE 2

| Flag name | Bit width | No. of flags | Usage |
|---|---|---|---|
| C0~C7 | 1 | 8 | Condition flags. Indicate if condition is established or not. |
| VC0~VC3 | 1 | 4 | Condition flags for media processing extension instruction. Indicate if condition is established or not. |
| OVS | 1 | 1 | Overflow flag. Detects overflow at the time of operation. |
| CAS | 1 | 1 | Carry flag. Detects carry at the time of operation. |
| BPO | 5 | 1 | Specifies bit position. Specifies bit positions to be processed when mask processing instruction is executed. |
| ALN | 2 | 1 | Specified byte alignment. |
| FXP | 1 | 1 | Fixed point operation mode. |
| UDR | 32 | 1 | Undefined register. |

Figure 8:
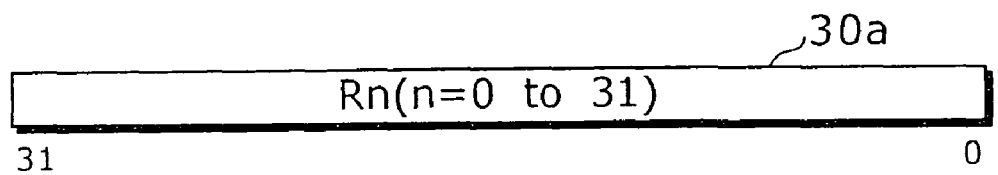
FIG. 8 is a diagram showing a configuration of general-purpose registers (R0~R31) of the processor.

FIG. 8 is a diagram showing the configuration of the general-purpose registers (R0~R31) 30a. The general-purpose registers (R0~R31) 30a are a group of 32-bit registers that constitute an integral part of the context of a task to be executed and that store data or addresses. It should be noted that the general-purpose registers R30 and R31 are used by hardware as a global pointer and a stack pointer respectively.

Figure 9:
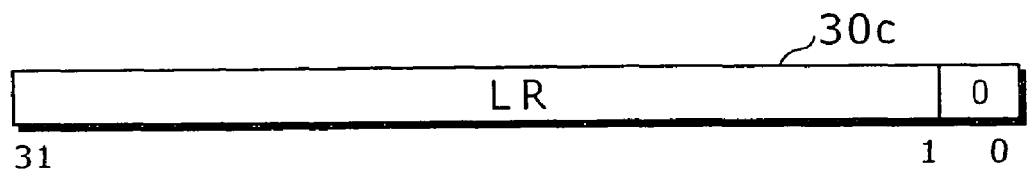
FIG. 9 is a diagram showing a configuration of a link register (LR) of the processor.

FIG. 9 is a diagram showing the configuration of a link register (LR) 30c. In connection with this link register (LR) 30c, the processor 1 also has a save register (SVR) not illustrated in the diagram. The link register (LR) 30c is a 32-bit register for storing a return address at the time of a function call. It should be noted that the save register (SVR) is a 16-bit register for saving a condition flag (CFR.CF) of the condition flag register at the time of a function call. The link register (LR) 30c is used also for the purpose of increasing the speed of loops, as in the case of a branch register (TAR) to be explained later. 0 is always read out as the lower 1 bit, but 0 must be written at the time of writing.

For example, when "call" (brl, jmpl) instruction is executed, the processor 1 saves a return address in the link register (LR) 30c and saves a condition flag (CFR.CF) in the save register (SVR). When "jmp" instruction is executed, the processor 1 fetches the return address (branch destination address) from the link register (LR) 30c, and returns a program counter (PC). Furthermore, when "ret (jmpr)" instruction is executed, the processor 1 fetches the branch destination address (return address) from the link register (LR) 30c, and stores (restores) it in/to the program counter (PC). Moreover, the processor 1 fetches the condition flag from the save register (SVR) so as to store (restores) it in/to a condition flag area CFR.CF in the condition flag register (CFR) 32.

Figure 10:
FIG. 10 is a diagram showing a configuration of a branch register (TAR) of the processor.

FIG. 10 is a diagram showing the configuration of the branch register (TAR) 30d. The branch register (TAR) 30d is a 32-bit register for storing a branch target address, and is used mainly for the purpose of increasing the speed of loops. 0 is always read out as the lower 1 bit, but 0 must be written at the time of writing.

For example, when "jmp" and "jloop" instructions are executed, the processor 1 fetches a branch destination address from the branch register (TAR) 30d, and stores it in the program counter (PC). When the instruction indicated by the address stored in the branch register (TAR) 30d is stored in a branch instruction buffer, a branch penalty will be 0. An increased loop speed can be achieved by storing the top address of a loop in the branch register (TAR) 30d.

FIG. 11 is a diagram showing the configuration of a program status register (PSR) 31. The program status register (PSR) 31, which constitutes an integral part of the context of a task to be executed, is a 32-bit register for storing the following processor status information:

Bit SWE: indicates whether the switching of VMP (Virtual Multi-Processor) to LP (Logical Processor) is enabled or disabled. "0" indicates that switching to LP is disabled and "1" indicates that switching to LP is enabled.

Bit FXP: indicates a fixed point mode. "0" indicates the mode 0 (the mode in which an arithmetic operation is performed supposing that there is the decimal point between the MSB and the first bit from the MSB.

Hereafter, also called "_1 system") and "1" indicates the mode 1 (the mode in which an arithmetic operation is performed supposing that there is the decimal point between the first bit from the MSB and the second bit from the MSB. Hereafter, also called "_2 system").

Bit IH: is an interrupt processing flag indicating that maskable interrupt processing is ongoing or not. "1" indicates that there is an ongoing interrupt processing and "0" indicates that there is no ongoing interrupt processing. This flag is automatically set on the occurrence of an interrupt. This flag is used to make a distinction of whether interrupt processing or program processing is taking place at a point in the program to which the processor returns in response to "rti" instruction.

Bit EH: is a flag indicating that an error or an NMI is being processed or not. "0" indicates that error/NMI interrupt processing is not ongoing and "1" indicates that error/NMI interrupt processing is ongoing. This flag is masked if an asynchronous error or an NMI occurs when EH=1. Meanwhile, when VMP is enabled, plate switching of VMP is masked.

Bit PL [1:0]: indicates a privilege level. "00" indicates the privilege level 0, i.e. the processor abstraction level, "01" indicates the privilege level 1 (non-settable), "10" indicates the privilege level 2, i.e. the system program level, and "11" indicates the privilege level 3, i.e. the user program level.

Bit LPIE3: indicates whether LP-specific interrupt 3 is enabled or disabled. "1" indicates that an interrupt is enabled and "0" indicates that an interrupt is disabled.

Bit LPIE2: indicates whether LP-specific interrupt 2 is enabled or disabled. "1" indicates that an interrupt is enabled and "0" indicates that an interrupt is disabled.

Bit LPIE1: indicates whether LP-specific interrupt 1 is enabled or disabled. "1" indicates that an interrupt is enabled and "0" indicates that an interrupt is disabled.

Bit LPIE0: indicates whether LP-specific interrupt 0 is enabled or disabled. "1" indicates that an interrupt is enabled and "0" indicates that an interrupt is disabled.

Bit AEE: indicates whether a misalignment exception is enabled or disabled. "1" indicates that a misalignment exception is enabled and "0" indicates that a misalignment exception is disabled.

Bit IE: indicates whether a level interrupt is enabled or disabled. "1" indicates that a level interrupt is enabled and "0" indicates a level interrupt is disabled.

Bit IM [7:0]: indicates an interrupt mask, and ranges from levels 0~7, each being able to be masked at its own level. Level 0 is the highest level. Of interrupt requests which are not masked by any IMs, only the interrupt request with the highest level is accepted by the processor 1. When an interrupt request is accepted, levels below the accepted level are automatically masked by hardware. IM[0] denotes a mask of level 0, IM[1] a mask of level 1, IM[2] a mask of level 2, IM[3] a mask of level 3, IM[4] a mask of level 4, IM[5] a mask of level 5, IM[6] a mask of level 6, and IM[7] a mask of level 7.

reserved: indicates a reserved bit. 0 is always read out. 0 must be written at the time of writing.

FIG. 12 is a diagram showing the configuration of the condition flag register (CFR) 32. The condition flag register (CFR) 32, which constitutes an integral part of the context of a task to be executed, is a 32-bit register made up of condition flags, operation flags, vector condition flags, an operation instruction bit position specification field, and a SIMD data alignment information field.

Bit ALN [1:0]: indicates an alignment mode. An alignment mode of "valnvc" instruction is set.

Bit BPO [4:0]: indicates a bit position. It is used in an instruction that requires a bit position specification.

Bit VC0~VC3: are vector condition flags. Starting from a byte on the LSB side or a half word through to the MSB side, each corresponds to a flag ranging from VC0 through to VC3.

Bit OVS: is an overflow flag (summary). It is set on the detection of saturation and overflow. If not detected, a value before the instruction is executed is retained. Clearing of this flag needs to be carried out by software.

Bit CAS: is a carry flag (summary). It is set when a carry occurs under "addc" instruction, or when a borrow occurs under "subc" instruction. If there is no occurrence of a carry under "addc" instruction, or a borrow under "subc" instruction, a value before the instruction is executed is retained. Clearing of this flag needs to be carried out by software.

Bit C0~C7: are condition flags, which indicate a condition (TRUE/FALSE) in an execution instruction with a condition. The correspondence between the condition of the execution instruction with the condition and the bits C0~C7 is decided by the predicate bit included in the instruction. It should be noted that the value of the flag C7 is always 1. A reflection of a FALSE condition (writing of 0) made to the flag C7 is ignored.

reserved: indicates a reserved bit. 0 always read out. 0 must be written at the time of writing.

Figure 13A:
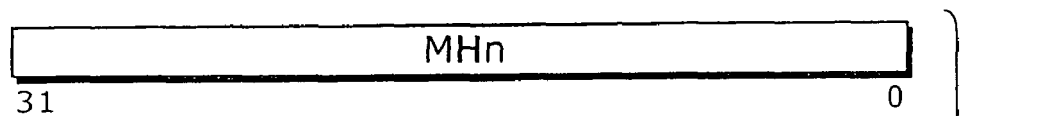
FIGS. 13A and 13B are diagrams showing configurations of accumulators (M0, M1) of the processor.
Figure 13B:
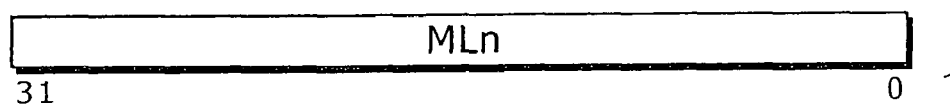

FIGS. 13A and 13B are diagrams showing the configurations of accumulators (M0, M1) 30b. Such accumulators (M0, M1) 30b, which constitute an integral part of the context of a task to be executed, are made up of a 32-bit register MH0-MH1 (register for multiply and divide/sum of products (the higher 32 bits)) shown in FIG. 13A and a 32-bit register ML0-ML1 (register for multiply and divide/sum of products (the lower 32 bits)) shown in FIG. 13B.

The register MH0-MH1 is used for storing the higher 32 bits of operation results at the time of a multiply instruction, while used as the higher 32 bits of the accumulators at the time of a sum of products instruction. Moreover, the register MH0-MH1 can be used in combination with the general-purpose registers in the case where a bit stream is handled. Meanwhile, the register ML0-ML1 is used for storing the lower 32 bits of operation results at the time of a multiply instruction, while used as the lower 32 bits of the accumulators at the time of a sum of products instruction.

Figure 14:
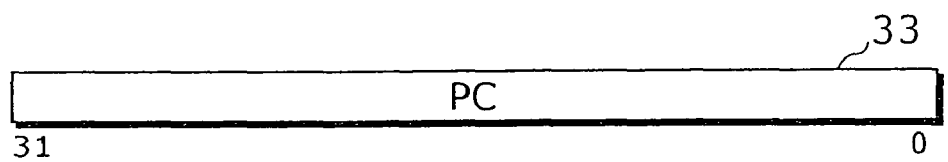
FIG. 14 is a diagram showing a configuration of a program counter (PC) of the processor.

FIG. 14 is a diagram showing the configuration of a program counter (PC) 33. This program counter (PC) 33, which constitutes an integral part of the context of a task to be executed, is a 32-bit counter that holds the address of an instruction being executed.

Figure 15:
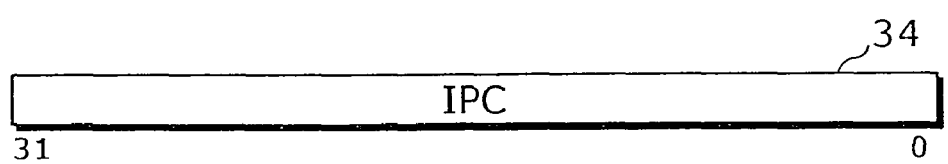
FIG. 15 is a diagram showing a configuration of a PC save register (IPC) of the processor.

FIG. 15 is a diagram showing the configuration of a PC save register (IPC) 34. This PC save register (IPC) 34, which constitutes an integral part of the context of a task to be executed is a 32-bit register.

Figure 16:
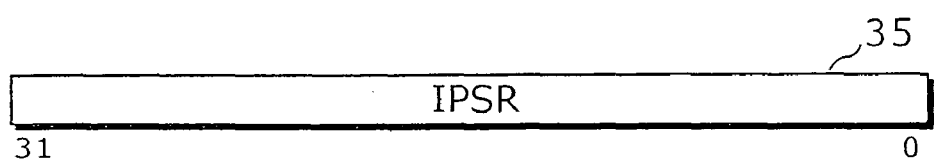
FIG. 16 is a diagram showing a configuration of a PSR save register (IPSR) of the processor.

FIG. 16 is a diagram showing the configuration of a PSR save register (IPSR) 35. This PSR save register (IPSR) 35, which constitutes an integral part of the context of a task to be executed, is a 32-bit register for saving the program status register (PSR) 31. 0 is always read out as a part corresponding to a reserved bit, but 0 must be written at the time of writing.

Next, an explanation is given for the memory space of the processor 1, which is the target of the compiler according to the present embodiment. For example, in the processor 1, a linear memory space with a capacity of 4 GB is divided into 32 segments, and an instruction SRAM (Static RAM) and a data SRAM are allocated to 128-MB segments. With a 128-MB segment serving as one block, an object block to be accessed is set in a SAR (SRAM Area Register). A direct access is made to the instruction SPAM/data SRAM when the accessed address is a segment set in the SAR, but an access request shall be issued to a bus controller (BCU) when such address is not a segment set in the SAR. An on chip memory (OCM), an external memory, an external device, an I/O port and the like are connected to the BUC. Data reading/writing from and to these devices is possible.

FIG. 17 is a timing diagram showing the pipeline behavior of the processor 1, which is the target of the compiler according to the present embodiment. As illustrated in the diagram, the pipeline of the processor 1 basically consists of the following five stages: instruction fetch; instruction assignment (dispatch); decode; execution; and writing.

FIG. 18 is a timing diagram showing each stage of the pipeline behavior of the processor 1 at the time of executing an instruction. In the instruction fetch stage, an access is made to an instruction memory which is indicated by an address specified by the program counter (PC) 33, and an instruction is transferred to the instruction buffers 10c~10e and the like. In the instruction assignment stage, the output of branch destination address information in response to a branch instruction, the output of an input register control signal, the assignment of a variable length instruction are carried out, which is followed by the transfer of the instruction to an instruction register (IR). In the decode stage, the IR is inputted to the decoding unit 20, and an operation unit control signal and a memory access signal are outputted. In the execution stage, an operation is executed and the result of the operation is outputted either to the data memory or the general-purpose registers (R0~R31) 30a. In the writing stage, a value obtained as a result of data transfer, and the operation results are stored in the general-purpose registers.

The VLIW architecture of the processor 1, which is the target of the compiler according to the present embodiment, allows parallel execution of the above processing on a maximum of three data elements. Therefore, the processor 1 performs the behavior shown in FIG. 18 in parallel at the timing shown in FIG. 19.

Next, an explanation is given for a set of instructions executed by the processor 1 with the above configuration.

Tables 3~5 list categorized instructions to be executed by the processor 1, which is the target of the compiler according to the present embodiment.

TABLE 3

| Category | Operation unit | Instruction operation code |
|---|---|---|
| Memory transfer instruction (load) | M | ld, ldh, ldhu, ldb, ldbu, ldp, ldhp, ldbp, ldbh, ldbuh, ldbhp, ldbuhp |
| Memory transfer instruction (store) | M | st, sth, stb, stp, sthp, stbp, stbh, stbhp |
| Memory transfer instruction (others) | M | dpref, ldstb |
| External register transfer instruction | M | rd, rde, wt, wte |
| Software interrupt instruction | B | rti, pi0, pi0l, pi1, pi1l, pi2, pi2l, pi3, pi3l, pi4, pi4l, pi5, pi5l, pi6, pi6l, pi7, pi7l, sc0, sc1, sc2, sc3, sc4, sc5, sc6, sc7 |
| VMP/interrupt control instruction | B | intd, inte, vmpsleep, vmpsus, vmpswd, vmpswe, vmpwait |
| Arithmetic operation instruction | A | abs, absvh, absvw, add, addarvw, addc, addmsk, adds, addsr, addu, addvh, addvw, neg, negvh, negvw, rsub, s1add, s2add, sub, subc, submsk, subs, subvh, subvw, max, min |
| Logical operation instruction | A | and, andn, or, sethi, xor, not |
| Compare instruction | A | cmpCC, cmpCCa, cmpCCn, cmpCCo, tstn, tstna, tstnn, tstno, tstz, tstza, tstzn, tstzo |
| Move instruction | A | mov, movcf, mvclcas, mvclovs, setlo, vcchk |
| NOP instruction | A | nop |
| Shift instruction1 | S1 | asl, aslvh, aslvw, asr, asrvh, asrvw, lsl, lsr, rol, ror |
| Shift instruction2 | S2 | aslp, aslpvw, asrp, asrpvw, lslp, lsrp |

TABLE 4

| Category | Operation unit | Instruction operation code |
|---|---|---|
| Extraction instruction | S2 | ext, extb, extbu, exth, exthu, extr, extru, extu |
| Mask instruction | C | msk, mskgen |
| Saturation instruction | C | sat12, sat9, satb, satbu, sath, satw |
| Conversion instruction | C | valn, valn1, valn2, valn3, valnvc1, valnvc2, valnvc3, valnvc4, vhpkb, vhpkh, vhunpkb, vhunpkh, vintlhb, vintlhh, vintllb, vintllh, vlpkb, vlpkbu, vlpkh, vlpkhu, vlunpkb, vlunpkbu, vlunpkh, vlunpkhu, vstovb, vstovh, vunpkl, vunpk2, vxchngh, vexth |
| Bit count instruction | C | bcnt1, bseq, bseq0, bseq1 |
| Others | C | byterev, extw, mskbrvb, mskbrvh, rndvh, movp |
| Multiply instruction1 | X1 | fmulhh, fmulhhr, fmulhw, fmulhww, hmul, lmul |
| Multiply instruction2 | X2 | fmulww, mul, mulu |
| Sum of products instruction1 | X1 | fmachh, fmachhr, fmachw, fmachww, hmac, lmac |
| Sum of products instruction2 | X2 | fmacww, mac |
| Difference of products instruction1 | X1 | fmsuhh, fmsuhhr, fmsuhw, fmsuww, hmsu, lmsu |
| Difference of products instruction2 | X2 | fmsuww, msu |
| Divide instruction | DIV | div, divu |
| Debugger instruction | DBGM | dbgm0, dbgm1, dbgm2, dbgm3 |

TABLE 5

| Category | Operation unit | Instruction operation code |
|---|---|---|
| SIMD arithmetic operation instruction | A | vabshvh, vaddb, vaddh, vaddhvc, vaddhvh, vaddrhvc, vaddsb, vaddsh, vaddsrb, vaddsrh, vasubb, vcchk, vhaddh, vhaddhvh, vhsubh, vhsubhvh, vladdh, vladdhvh, vlsubh, vlsubhvh, vnegb, vnegh, vneghvh, vsaddb, vsaddh, vsgnh, vsrsubb, vsrsubh, vssubb, vssubh, vsubb, vsubh, vsubhvh, vsubsh, vsumh, vsumh2, vsumrh2, vxaddh, vxaddhvh, vxsubh, vxsubhvh, vmaxb, vmaxh, vminb, vminh, vmovt, vsel |
| SIMD compare instruction | A | vcmpeqb, vcmpeqh, vcmpgeb, vcmpgeh, vcmpgtb, vcmpgth, vcmpleb, vcmpleh, vcmpltb, vcmplth, vcmpneb, vcmpneh, vscmpeqb, vscmpeqh, vscmpgeb, vscmpgeh, vscmpgtb, vscmpgth, vscmpleb, vscmpleh, vscmpltb, vscmplth, vscmpneb, vscmpneh |
| SIMD shift instruction1 | S1 | vaslb, vaslh, vaslvh, vasrb, vasrh, vasrvh, vlslb, vlslh, vlsrb, vlsrh, vrolb, vrolh, vrorb, vrorh |
| SIMD shift instruction2 | S2 | vasl, vaslvw, vasr, vasrvw, vlsl, vlsr |
| SIMD saturation instruction | C | vsath, vsath12, vsath8, vsath8u, vsath9 |
| Other SIMD instruction | C | vabssumb, vrndvh |
| SIMD multiply instruction | X2 | vfmulh, vfmulhr, vfmulw, vhfmulh, vhfmulhr, vhfmulw, vhmul, vlfmulh, vlfmulhr, vlfmulw, vlmul, vmul, vpfmulhww, vxfmulh, vxfmulhr, vxfmulw, vxmul |
| SIMD sum of products instruction | X2 | vfmach, vfmachr, vfmacw, vhfmach, vhfmachr, vhfmacw, vhmac, vlfmach, vlfmachr, vlfmacw, vlmac, vmac, vpfmachww, vxfmach, vxfmachr, vxfmacw, vxmac |
| SIMD difference of products instruction | X2 | vfmsuh, vfmsuw, vhfmsuh, vhfmsuw, vhmsu, vlfmsuh, vlfmsuw, vlmsu, vmsu, vxfmsuh, vxfmsuw, vxmsu |

It should be noted that "Operation units" in the above tables refer to operation units used in the respective instructions. More specifically, "A" denotes ALU instruction, "B" branch instruction, "C" conversion instruction, "DIV" divide instruction, "DBGM" debug instruction, "M" memory access instruction, "S1" and "S2" shift instructions, and "X1" and "X2" multiply instructions.

Figure 20:
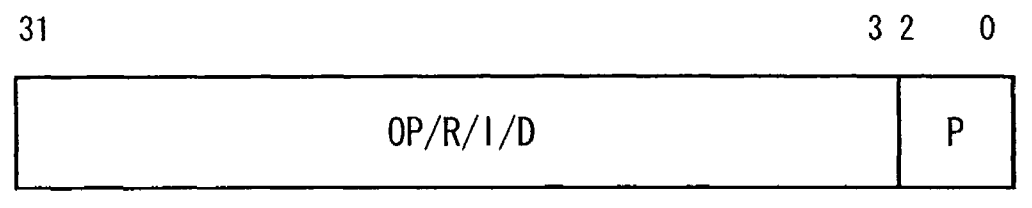

FIG. 20 is a diagram showing the format of the instructions executed by the processor 1.

The following describes what acronyms stand for in the diagrams: "P" is predicate (execution condition: one of the eight condition flags C0~C7 is specified); "OP" is operation code field; "R" is register field; "I" is immediate field; and "D" is displacement field.

Figure 25:
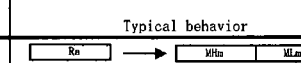
FIG. 25 is a diagram explaining an instruction belonging to a category "mul (multiplication) system".

FIGS. 21~36 are diagrams explaining outlined functionality of the instructions executed by the processor 1. More specifically, FIG. 21 explains an instruction belonging to the category "ALUadd (addion) system)"; FIG. 22 explains an instruction belonging to the category "ALUsub (subtraction) system)"; FIG. 23 explains an instruction belonging to the category "ALUlogic (logical operation) system and the like"; FIG. 24 explains an instruction belonging to the category "CMP (comparison operation) system"; FIG. 25 explains an instruction belonging to the category "mul (multiplication) system"; FIG. 26 explains an instruction belonging to the category "mac (sum of products operation) system"; FIG. 27 explains an instruction belonging to the category "msu (difference of products) system"; FIG. 28 explains an instruction belonging to the category "MEMld (load from memory) system"; FIG. 29 explains an instruction belonging to the category "MEMstore (store in memory) system"; FIG. 30 explains an instruction belonging to the category "BRA (branch) system"; FIG. 31 explains an instruction belonging to the category "BSasl (arithmetic barrel shift) system and the like"; FIG. 32 explains an instruction belonging to the category "BSasl (logical barrel shift) system and the like"; FIG. 33 explains an instruction belonging to the category "CNV-valn (arithmetic conversion) system"; FIG. 34 explains an instruction belonging to the category "CNV (general conversion) system"; FIG. 35 explains an instruction belonging to the category "SATvlpk (saturation processing) system"; and FIG. 36 explains an instruction belonging to the category "ETC (et cetera) system".

The following describes the meaning of each column in these diagrams: "SIMD" indicates the type of an instruction (distinction between SISD (SINGLE) and SIMD); "Size" indicates the size of individual operand to be an operation target; "Instruction" indicates the operation code of an operation; "Operand" indicates the operands of an instruction; "CFR" indicates a change in the condition flag register; "PSR" indicates a change in the processor status register; "Typical behavior" indicates the overview of a behavior; "Operation unit" indicates a operation unit to be used; and "3116" indicates the size of an instruction.

The behaviors of the processor 1 concerning main instructions used in concrete examples that will be described later are explained below.

andn Rc,Ra,Rb
Carry out the inverted logical AND between Ra and Rb and store it in Rc.
asl Rb,Ra,I5
Execute an arithmetic shift left to Ra by only the number of bits in the immediate value (I5).
and Rb,Ra,I8
Carry out the logical AND between Ra and the value (I8) and store it in Rb.
bseq0 Rb,Ra
Count consecutive 0s from the MBS of Ra and store it in Rb.
bseq1 Rb,Ra
Count consecutive 1s from the MBS of Ra and store it in Rb.
bseq Rb,Ra
Count consecutive sign bits from 1 bit below the MSB of Ra and store it in Rb. When Ra is 0, output 0.
bcnt1 Rb,Ra
Count the number of 1s of Ra and store it Rb.
extr Rc,Ra,Rb
Designate the position of a bit by Rb, extract a part of contents of Ra, sign extend and store it in Rc.
extru Rc,Ra,Rb
Designate the position of a bit by Rb, extract a part of contents of Ra and store it in Rc without a sign extension.
fmulhh Mm,Rc,Ra,Rb
Treat Ra, Rb, and Rc as 16-bit values and treat Mm (an accumulator for multiplication) as a 32-bit value. Multiply Ra and Rb by a fixed point. Store the result in Mm and Rc. When the result cannot be represented by signed 32 bits, saturate it.
Fmulhw Mm,Rc,Ra,Rb
Treat Ra and Rb as 16-bit values and treat Mm and Rc as 32-bit values. Multiply Ra and Rb by a fixed point. Store the result in Mm and Rc. When the result cannot be represented by signaled 32 bits, saturate it.
mul Mm,Rc,Ra,Rb
Multiply Ra and Rb by an integer. Store the result in Mm and Rc.
mac Mm,Rc,Ra,Rb,Mn
Multiply Ra and Rb by an integer and add it to Mn. Store the result in Mm and Rc.
mov Rb,Ra
Transfer Ra to Rb.
or Rc,Ra,Rb
Carry out the logical OR between Ra and Rb and store it in Rc.
rde C0:C1,Rb,(Ra)
Let Ra be an external register number and read the value of the external register into Rb. Output a success and a failure of reading to C0 and C1 (condition flags), respectively. In the case of a failure, an exception of an expansion register error arises.
wte C0:C1,(Ra),Rb
Let Ra be an exernal register number and write the value of Rb into the external register. Output a success and a failure of writing to C0 and C1, respectively. In the case of a failure, an exception of an expansion register error arises.
vaddh Rc,Ra,Rb
Treat each register in half-word vector format. Add Ra and Rb (SIMD straight).

(A Compiler)

Next, a compiler, according to the present embodiment, whose target is the above-described processor 1, is explained.

Figure 37:
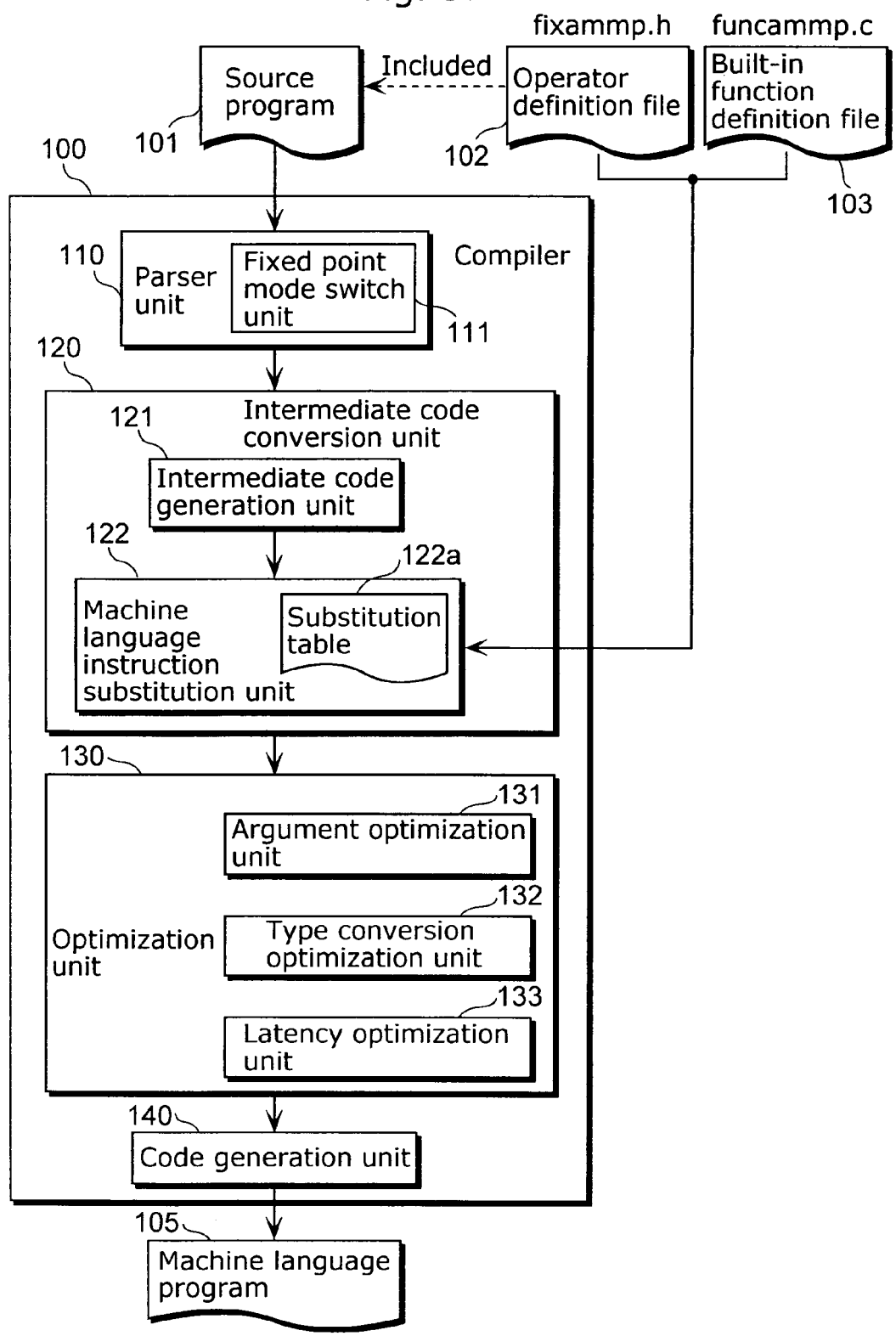
FIG. 37 is a function block diagram showing the configuration of a compiler according to the present invention.

FIG. 37 is a function block diagram showing the configuration of a compiler 100 according to the present embodiment. This compiler 100 is a cross compiler that translates a source program 101 described in a high-level language such as C/C++ language into a machine language program 105 whose target processor is the above-described processor 1, is realized by a program executed on a computer such as a personal computer, and is largely divided into and configured with a parser unit 110, an intermediate code conversion unit 120, an optimization unit 130 and a code generation unit 140.

It should be noted that header files (an operator definition file 102 and a built-in function definition file 103) that efficiently generate the special-purpose instructions specific to the above-mentioned processor 1 are ready in the present compiler 100. A user can acquire the machine language program 105 specialized (optimized) for the processor 1 by including these header files in the source program 101.

The operator definition file 102 is, as shown in list examples in FIG. 38~FIG. 68, a header file that defines classes defining operators that targets fixed points and SIMD-type data. In the header file, FIG. 38~FIG. 40 are lists of a section where an operator whose target is mainly data of 16-bit fixed point of Mode 0 (_1 system) is defined; FIG. 41 and FIG. 42 are lists of a section where an operator whose target is mainly data of 32-bit fixed point of Mode 0 (_1 system) is defined; FIG. 43~FIG. 45 are lists of a section where an operator whose target is mainly data of 16-bit fixed point of Mode 1 (_2 system) is defined; FIG. 45~FIG. 47 are lists of a section where an operator whose target is mainly data of 32-bit fixed point of Mode 1 (_2 system); and FIG. 48~FIG. 68 are lists of a section where the other functions are defined.

The built-in function definition file 103 is, as shown in list examples in FIG. 69~FIG. 72, a header file that defines functions that execute various operations to replace the functions with machine language instructions specific to the processor 1. In the header file, FIG. 69~FIG. 71 are lists of a section where a function to replace the function with one machine language instruction is defined; FIG. 72 is a list of a section where a function to replace the functions with two or more machine language instructions (machine language instruction sequences) are defined.

It should be noted that asm( . . . ){ . . . }( . . . ) in these definition files 102 and 103 is a built-in assembler instruction called an optimization asm, and is processed as follows. In other words, the description format of an optimization asm sentence is >     asm(<<a list of load expressions >>){
>       <<optimization control information>>
>       <<instruction designation unit>>
>     }(<<a list of store expressions>>);.

Here, "the list of load expression" is a section where the load expressions are described; "the load expression" is an expression to store variables in C language and results of expressions such as four operations; it is described like "a register designation identifier=an assignment expression"; and it means that the value indicated on the right side is transferred to the identifier indicated in the left side. "The list of store expressions" is a section where the store expressions are described; "the store expression" is described like "a monomial=a register designation identifier"; and it means to assign a value on the left side represented by the monomial to a value of the register represented by the register designation identifier.

The parser unit 110 is a front processing unit that extracts a reserved word (a keyword) and the like; carries out a lexical analysis of the source program 101 (that contains the header file to be included) that is a target of the compilation; and has a fixed point mode switch unit 111 that supports a switch of the mode on fixed points in addition to an analysis function that an ordinary compiler has. When the fixed point mode switch unit 111 detects in the source program 101 a pragma direction ("#pragma_save_fxpmode func", for example) that saves and restores the fixed point mode, it generates a machine language instruction that saves and restores a bit FXP of PSR31 of the processor 1. This realizes a programming in which the operations in both the Mode 0 and the Mode 1 of the fixed point mix.

It should be noted that a "pragma (or a pragma direction)" is a direction to the compiler 100 that the user can designate (place) arbitrarily in the source program 101 and a character sequence starting with "#pragma".

The intermediate code conversion unit 120 is a processing unit that converts each statement in the source program 101 passed from the parser unit 110 to intermediate codes and is made up of an intermediate code generation unit 121 and a machine language instruction substitution unit 122. The intermediate code generation unit 121 converts each statement in the source program 101 based on a predetermined rules. Here, an intermediate code is typically a code represented in a format of function invocation (a code indicating "+(int a, int b)"; indicating "add an integer a to an integer b", for example). But the intermediate code contains not only the code in the format of the function invocation but also machine language instructions of the processor 1.

The machine language instruction substitution unit 122 converts, out of the intermediate codes generated by the intermediate code generation unit 121, the intermediate codes in the format of the function invocation into the corresponding machine language instructions (or the machine language instruction sequence) referring to the operator definition file 102 and the built-in function definition file 103, and the intermediate codes that match the operators (including types of target data of the operations) defined by these definition files or the built-in functions into the corresponding machine language instructions (or the machine language instruction sequence) following a substitution table 122a, which the machine language instruction substitution unit 122 has inside of itself, or assembler instructions defined by these definition files, and outputs the converted machine language instructions to the optimization unit 130. This enables the optimization unit 130 to execute various optimizations to these intermediate codes because they are passed to the optimization unit 130 not in the format of the built-in functions but in the format of the machine language instructions.

By the way, the substitution table 122a is a table that stores the machine language instructions (or the machine language instruction sequence) corresponding to operations by operators reserved in advance and functions. Additionally, the machine language instruction substitution unit 122 outputs, out of the intermediate codes passed from the intermediate code generation unit 121, the machine language instructions without being processed to the optimization unit 130.

The optimization unit 130 is a processing unit that executes one of the below-mentioned three types of optimization selected by the user to the machine language instructions out of the intermediate codes outputted from the intermediate code conversion unit 120 by executing processing such as combining instructions, removing redundancy, sorting instructions and allocating registers: (1) optimization in which increase of the execution speed has a higher priority; (2) optimization in which reduction of the code size has a higher priority; and (3) optimization of both the increase of the execution speed and the reduction of the code size. The optimization unit 130 has a processing unit (an argument optimization unit 131, a type conversion optimization unit 132 and a latency optimization unit 133) that performs the unique optimization to the present compiler 100 in addition to common optimization (such as "loop unrolling", "if conversion" and "generation of pair memory access instruction").

The argument optimization unit 131 is a processing unit that generates appropriate instructions or sequences (algorithm) according to the arguments of built-in functions (e.g. extr, extru). For example, when all the arguments are constants, the argument optimization unit 131 generates machine language instructions whose operands are the constant values acquired by holding in the constants; when a part of the arguments are constants, machine language instructions whose operands are immediate values; when all the arguments are variables, a sequence of instructions whose operands are registers.

The type conversion optimization unit 132 is a processing unit that makes operations between different types more efficient based on a certain notation in the source program 101. For example, when it is desirable that the multiplication result of a 16-bit data and another 16-bit data be kept as a 32-bit data, the type conversion optimization unit 132 generates one machine language instruction ("fmulhw" or the like) that executes the multiplication with such a type of conversion if there is the certain notation in the source program 101.

The latency optimization unit 133 aligns the machine language instructions based on a directive on latency (designation of the number of cycles) in an assembler instruction incorporated in the source program 101 so that a specific section or a specific action takes execution time only the designated number of cycles. This makes it unnecessary for a programmer to do the conventional work that he inserts the required number of "nop" instructions and makes it possible to perform optimization by inserting other machine language instruction than the "nop" instruction.

By the way, "loop unrolling" is optimization that improves the possibility of parallel execution of a loop by expanding iteration (repetition) of the loop and generating a pair memory access instruction (ldp/stp/ldhp/sthp and the like) in order to execute a plurality of iterations at the same time. Additionally, an "if conversion" is optimization that removes a branch construction by generating an instruction for an execution mechanism with a condition (the instruction that is executed only when the condition (the predicate) included in the instruction matches the state of the processor 1 (the condition flag)). Moreover, "generation of a pair memory access instruction" is optimization that generates the pair memory access instruction (ldp/stp/ldhp/sthp and the like) with a pair register (two successive registers) as the target.

Furthermore, the optimization unit 130 outputs, out of intermediate codes of the function call format, the intermediate codes that cannot be expanded without being processed to the code generation unit 140 because it is impossible to perform the optimization processing at the above-described machine language instruction level.

The code generation unit 140 generates the machine language program 105, replacing all the intermediate codes (including codes of the function call format and optimized machine language instructions) outputted from the optimization unit 130, referring to a translation table and the like held internally.

Next, the characteristic behaviors of the compiler 100 configured as described above are explained indicating specific examples.

Figure 73:
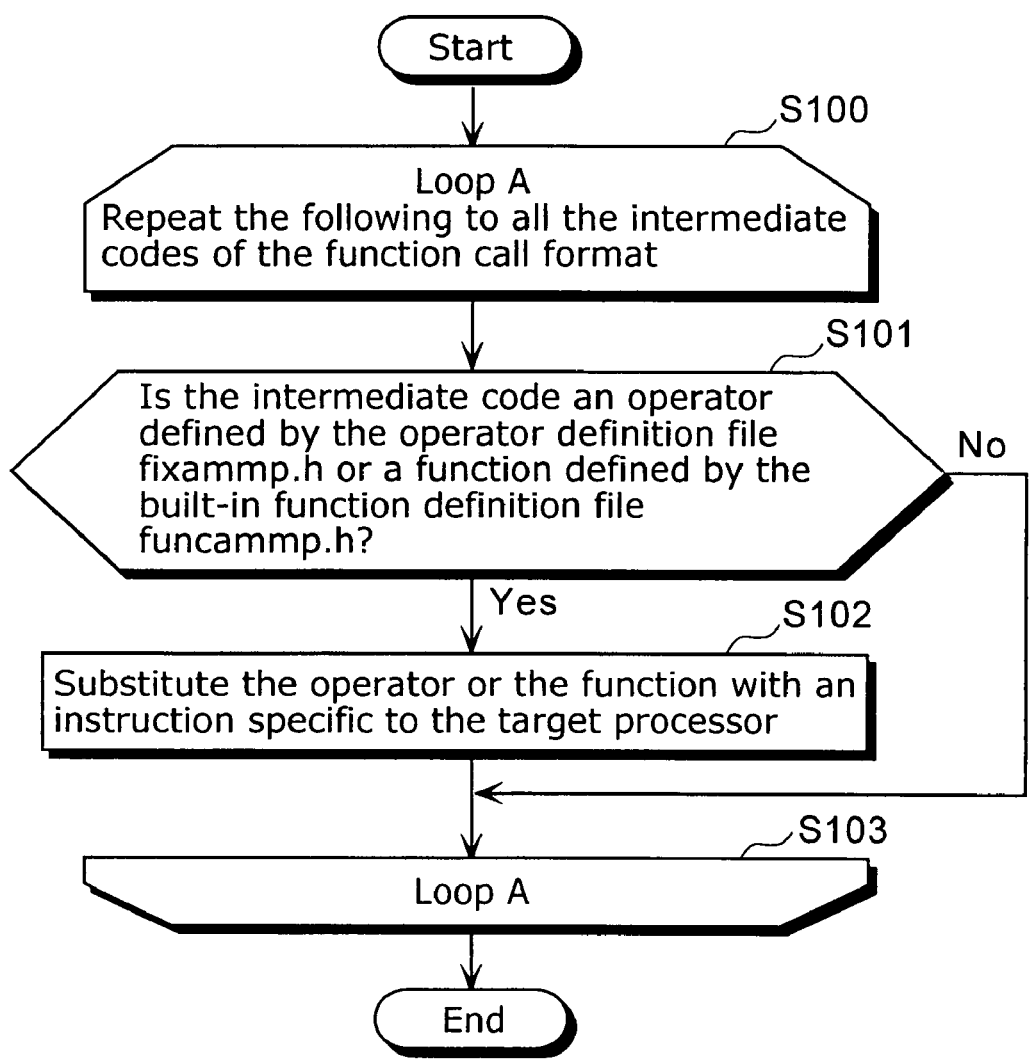
FIG. 73 is a flowchart showing the behaviors of the machine language instruction substitution unit.

FIG. 73 is a flowchart showing the behaviors of the machine language instruction substitution unit 122. The machine language instruction substitution unit 122 repeats the following process: (1) to judge whether the codes of the function call format out of the intermediate codes generated by the intermediate cord generation unit 121 match the operators (including the data type of an operation target) defined by the operator definition file 102 and the functions defined by the built-in function definition file 103 (Step S102) and, when they match (Yes at Step S101), (2) to substitute the operators and the functions with the machine language instructions (Step S102), following the assembler instructions defined by the substitution table 122a, which the machine language instruction substitution unit 122 has inside of itself, and these definition files 102 and 103 (Steps S100~S103).

To be more specific, implicit rules and the like of the type conversion among the different types are stipulated by the definitions of the operator definition file 102 (by the definitions of a constructor); the following four types of fixed points are defined:
"FIX16_1"; Signed 16 bits with the decimal point between the 14th bit and the 15th bit (MSB),
"FIX16_2"; Signed 16 bits with the decimal point between the 13th bit and the 14th bit,
"FIX32_1"; Signed 32 bits with the decimal point between the 30th and the 31st bit (MSB), and
"FIX32_2"; Signed 32 bits with the decimal point between the 29th bit and the 30th bit. Therefore, the machine language instruction substitution unit 122, for example, substitutes a source program
FIX16_1 a, b, c;
c=a*b;
with a machine language instruction
fmulhh m0,Rc,Ra,Rb (a fixed point multiplication operation instruction).

Hereby, the user can declare that the four types, FIX$16_1$1, FIX16_2, FIX32_1 and FIX32_2 are similar to the standard types of an ordinary compiler and use them. Then, the generated machine language instruction including the neighboring codes becomes a target of optimization such as combining instructions, removing redundancy, sorting instructions and allocating registers in the optimization unit 130, and can be optimized.

Similarly, the implicit rules and the like of the type conversion among the different types are stipulated by the definitions of the operator definition file 102 (by the definitions of a constructor); the following four types of SIMD instructions are defined:
"VINT8×4"; 8-bit integer data in 4 parallel,
"VINT16×2"; 16-bit integer data in 2 parallel,
"VFIX161×2"; 16-bit fixed point data of mode 0 (_1 system) in 2 parallel, and
"VFIX162×2"; 16-bit fixed point data of mode 1 (_2 system) in 2 parallel.
Therefore, the machine language instruction substitution unit 122, for example, substitutes a source program
VINT16×2 a,b,c;
c=a+b;
with a machine language instruction
vaddh Rc,Ra,Rb (SIMD addition instruction).

Hereby, the user can declares that the four types, "VINT8× 2", "VINT16×2", "VFIX161×2" and "VFIX162×2 are similar to the standard types of an ordinary compiler and use them. Then, the generated machine language instruction including the neighboring codes becomes an target of optimization such as combining instructions, removing redundancy, sorting instructions and allocating registers in the optimization unit 130, and can be optimized.

Additionally, in the built-in function definition file 103, a function that can use advanced instructions the processor 1 executes ("_abs(a)" and the like, for example) and its corresponding advanced instruction (one machine language instruction "abs Rb, Ra" and the like, for example) are defined. Therefore, the machine language instruction substitution unit 122, for example, substitutes a source program
b=_abs(a);
with a machine language instruction
abs Rb,Ra.

Hereby, the user can realize a complex processing without creating one by C++ language and an assembler instruction, but with only calling a built-in function prepared in advance. Then, the generated machine language instruction including the neighboring codes becomes a target of optimization such as combining instructions, removing redundancy, sorting instructions and allocating registers in the optimization unit 130, and can be optimized.

Similarly, in the built-in function definition file 103, a function that can use advanced instructions the processor 1 executes ("_div(a, b)" and the like, for example) and its corresponding advanced instruction (one machine language instruction sequence "extw, aslp, div" and the like, for example) are defined. Therefore, the machine language instruction substitution unit 122, for example, substitutes a source program
c=_div(a, b);
with a machine language instruction sequence

| | |
|---|---|
| extw | Mn,Rc,Ra |
| aslp | Mn,Rc,Mn,Rc,15 |
| div | MHm,Rc,MHn,Rc,Rb. |

Hereby, the user can realize a complex processing without creating one by C++ language and an assembler instruction, but with only calling a built-in function prepared in advance. Then, the generated machine language instruction sequence including the neighboring codes becomes a target of optimization such as combining instructions, removing redundancy, sorting instructions and allocating registers in the optimization unit 130, and can be optimized.

It should be noted that out of the built-in functions listed in the built-in function definition file 103, representative examples (especially effective for media processing) of (1) functions that are converted into one machine language instruction, (2) functions that are converted into two or more machine language instructions (a machine language instruction sequence) and (3) functions that can designate resources that are not targets of the register allocation (such as an accumulator) are as follows:

(1) The built-in functions that are converted into one machine language instruction "_bseq1(x)":

This is the function that detects how many bit 0s succeed from the MSB of the input. The formats are as follows:

```
int__bseq1(FIX16__1 val) // count 1
int__bseq1(FIX16__2 val) // count 1
int__bseq1(FIX32__1 val) // count 1
int__bseq1(FIX32__2 val) // count 1
```

These functions return the value of the number of successive 0s (the number of bits) in "val" to be counted. The machine language instructions corresponding to these functions are defined in the built-in function definition file 103.

"_bseq0(x)":

This is the function that detects how many bit 0s succeed from the MSB of the input. The formats are as follows:

```
int__bseq0(FIX16__1 val) // count 0
int__bseq0(FIX16__2 val) // count 0
int__bseq0(FIX32__1 val) // count 0
int__bseq0(FIX32__2 val) // count 0
```

These functions return the value of the number of successive 0s (the number of bits) in "val" to be counted. The machine language instructions corresponding to these functions are defined in the built-in function definition file 103.

"_bseq1(x)":

This is the function that detects how many bit 1s succeed from the MSB of the input. The formats are as follows:

```
int__bseq1(FIX16__1 val) // count 1
int__bseq1(FIX16__2 val) // count 1
int__bseq1(FIX32__1 val) // count 1
int__bseq1(FIX32__2 val) // count 1
```

These functions return the value of the number of successive 1s (the number of bits) in "val" to be counted. The machine language instructions corresponding to these functions are defined in the built-in function definition file 103.

"_bseq(x)":

This is the function that detects how many bits of the same value as the MSB succeed from the next bit to the MSB of the input. The formats are as follows:

```
int__bseq(FIX16__1 val)
int__bseq(FIX16__2 val)
int__bseq(FIX32__1 val)
int__bseq(FIX32__2 val)
```

These functions return the number of the normalized bits of "val". The machine language instructions corresponding to these functions are defined in the built-in function definition file 103.

"_bcnt1(x):

This is the function that detects how many bit 1s are included in the all bits of the input. The formats are as follows:

```
int__bcnt1(FIX16__1 val)
int__bcnt1(FIX16__2 val)
int__bcnt1(FIX32__1 val)
int__bcnt1(FIX32__2 val)
```

These functions return the value of the number of 1s in "val" to be counted. The machine language instructions corresponding to these functions are defined in the built-in function definition file 103.

"_extr(a,i1,i2)":

This is the function that extracts and sign-expands the predetermined bit positions of the input. The formats are as follows:

```
int__extr (FIX16__1 val1, int val2, int val3)
int__extr (FIX16__2 val1, int val2, int val3)
int__extr (FIX32__1 val1, int val2, int val3)
int__extr (FIX32__2 val1, int val2, int val3)
```

These functions return the result that the bit field of val1 indicated from the bit position va12 to the bit position va13 is extracted and sign-expanded. The machine language instructions corresponding to these functions are defined in the built-in function definition file 103.

"_extru(a,i1,i2)":

This is the function that extracts and zero-expands the predetermined bit positions of the input. The formats are as follows:

```
unsigned int__extru (FIX16__1 val, int val2, int val3)
unsigned int__extru (FIX16__2 val, int val2, int val3)
unsigned int__extru (FIX32__1 val, int val2, int val3)
unsigned int__extru (FIX32__2 val, int val2, int val3)
```

These functions return the result that the bit field of val1 indicated from the bit position va12 to the bit position va13 is extracted and zero-expanded. The machine language instructions corresponding to these functions are defined in the built-in function definition file 103.

(2) The built-in functions that are converted into two or more machine language instructions (a machine language instruction sequence)

"_modulo add( )":

This is the function that performs an address update of the modulo addressing. The format is as follows:

_modulo_add(void *addr, int imm, int mask, size_t size, void *base)

Here, the meaning of each argument is as follows:
addr: the address before the update or the lower address (the modulo part)
imm: the value of addition (the number of data)
mask: the width of mask (the width of modulo)
size: the size of data (exponentiation of two)
base: the base address (the head address of the array)

This function returns the result that only the addition value imm is added from the address addr by the modulo addressing.

The machine language instructions corresponding to this function is defined in the built-in function definition file 103. In other words, this function uses the instruction (addmsk) that substitutes the predetermined bit field of the first input with the predetermined bit field of the second input to calculate the modulo addressing. A usage example is as follows:

```
int array[MODULO];
p = array;
for (i = 0; i < 100; i++) {
  *q++ = *p;
  p = (int *)_modulo_add(p, 1, N, sizeof(int), array);
}
```

Here, the variable MODULO is the exponentiation of two ($2^N$). In this usage example, 100 elements of the array are placed with the alignment of the MODULO*SIZE bite.

"_brev_add( )":

This is the function that performs an address update of the bit reverse addressing. The format is as follows:
_brev_add(void *addr, int cnt, int imm, int mask, size_t size, void *base)

Here, the meaning of each argument is as follows:
addr: the address before the update
cnt: bit reverse counter
mm: the value of addition (the number of data)
mask: the width of mask (the width of reverse)
size: the size of data (exponentiation of two)
base: the base address (the head address of the array)

This function returns the result that only the addition value mm is added from the address addr that corresponds to the bit reverse counter cnt by the bit reverse addressing.

The machine language instructions corresponding to this function is defined in the built-in function definition file 103. In other words, this function uses the instruction (mskbrvh) that executes a position reverse bit by bit to the predetermined bit field of the first input to calculate the bit reverse addressing. A usage example is as follows:

```
int array[BREV];
p = array;
for (i = 0; i < 100; i++) {
  *q++ = *p;
  p = (int *)_brev_add(p, i, 1, N, sizeof(int), array);
}
```

Here, the variable BREV is the exponentiation of two ($2^N$). In this usage example, 100 elements of the array are placed with the alignment of the BREV*SIZE bite.

(3) Functions that can designate resources that are not targets of the register allocation (such as an accumulator)

In the built-in function definition file 103, in addition to a general-purpose register that is a target resource of the register allocation in the optimization, the built-in functions (multiplication: "_mul" and product-sum operation: "_mac") that (i) are operations (multiplication and product-sum operation) to update also the accumulator that is not a target of register allocation (that is implicit resources) and (ii) can designate a temporary variant with an accumulator as a reference type are prepared. The concrete formats are as follows respectively:
_mul(long &mh, long &ml, FIX16_1 &c, FIX16_1 a, FIX16_1 b);

This function multiplies a variant a and a variant b together, sets up the higher 32 bits of 64-bit data, which is the result, to the higher accumulator for multiplication MH, the lower 32 bits of the 64-bit data to the lower accumulator for multiplication ML, and further, 32-bit data that combine the lower 16 bits of the accumulator MH and the higher 16 bits of the accumulator ML to a variant c.
_mac(long &mh, long &ml, FIX16_1 &c, FIX16_1 a, FIX16_1 b);

This function adds the 64-bit data that combine the higher accumulator for multiplication MH and the lower accumulator for multiplication ML to the result gained by multiplying the variant a and the variant b, and sets up the higher 32 bits of 64-bit data, which is the result, to the higher accumulator for multiplication MH, the lower 32 bits of the 64-bit data to the lower accumulator for multiplication ML, and further, 32-bit data that combine the lower 16 bits of the accumulator MH and the higher 16 bits of the accumulator ML to a variant c.

A usage example is as follows:
The machine language instruction substitution unit 122 substitutes the following source program
long mh,ml;
_mul(mh,ml,dummy,a,b);
mac(mh,ml,e,c,d);
with the following machine language instruction
mul m0,Rx,Ra,Rb
mov r0,mh0
mov r1,mh1
mov mh0,r0
mov mh1,r1
mac m0,Re,Rc,Rd,m0 following the definitions in the built-in function definition file 103. It should be noted that, out of the above-mentioned machine language instruction sequence, the first to the third lines correspond to the function_mul and the fourth to the sixth lines correspond to the function_mac. The second to the fifth lines of the machine language instruction sequence like this are deleted by removing redundancy in the optimization unit 130 and the machine language instruction sequence is optimized to the following machine language instruction sequence
mul m0,Rx,Ra,Rb
mac m0,Re,Rc,Rd,m0.

As is described above, when the functions that can designate resources that are not targets of the register allocation (such as an accumulator) are used, it is highly probable that a set of the definition (storage of the value) and the usage (reference to the value) is deleted by the optimization within the compiler (the optimization unit 130) and therefore the built-in function like this is effective in terms of the optimization, too.

Next, behaviors by the optimization unit 130 out of the characteristic behaviors of the present compiler 100 are explained.

Figure 74:
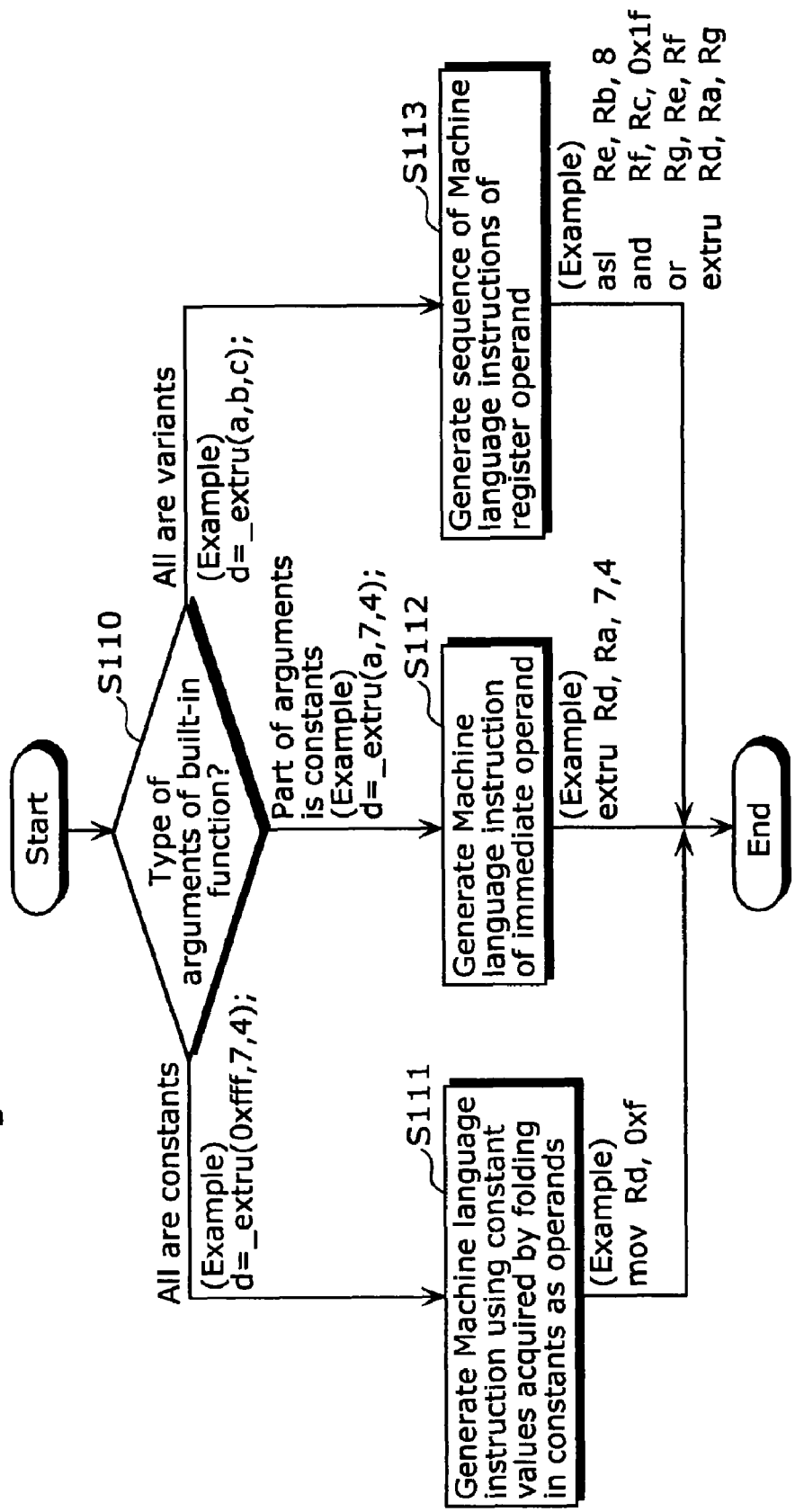
FIG. 74 is a flowchart showing the behaviors of the argument optimization unit of the optimization unit.

FIG. 74 is a flowchart showing the behaviors of the argument optimization unit 131 of the optimization unit 130. To generate an appropriate instructions or an appropriate sequence (algorithm) depending on the arguments, the argument optimization unit 131 generates:

(1) a machine language instruction using the constant values acquired by folding in the constants set out below as operands (Step S111) when all the arguments of the function are constants (left at Step S110);

(2) a machine language instruction of an immediate operand (Step 112) when a part of the arguments are constants (center at Step S110); and (3) a sequence of machine language instructions of a register operand (Step 113) when all the arguments are variables (right at Step S110).

For example, when all the arguments are constants like d=_extru(0×fff, 7, 4);

a machine language instruction with the constant values acquired by folding in the constants like movRd,0×f is generated.

On the other hand, when a part of the arguments are constants like d=_extru(a, 7, 4);

a machine language instruction of an immediate operand like extruRd,Ra,7,4 is generated.

Further, when all the arguments are variables like d=_extru (a, b, c);

a sequence of machine language instructions like aslRe,Rb,8
andRf,Rc,0×1f
orRg,Re,Rf
extruRd,Ra,Rg is generated.

As just described, from one built-in function, the same machine language instruction is not always generated fixedly but a machine language instruction (or a sequence of machine language instructions) optimized depending on the nature of the argument is generated by the argument optimization unit 131.

Figure 75B:
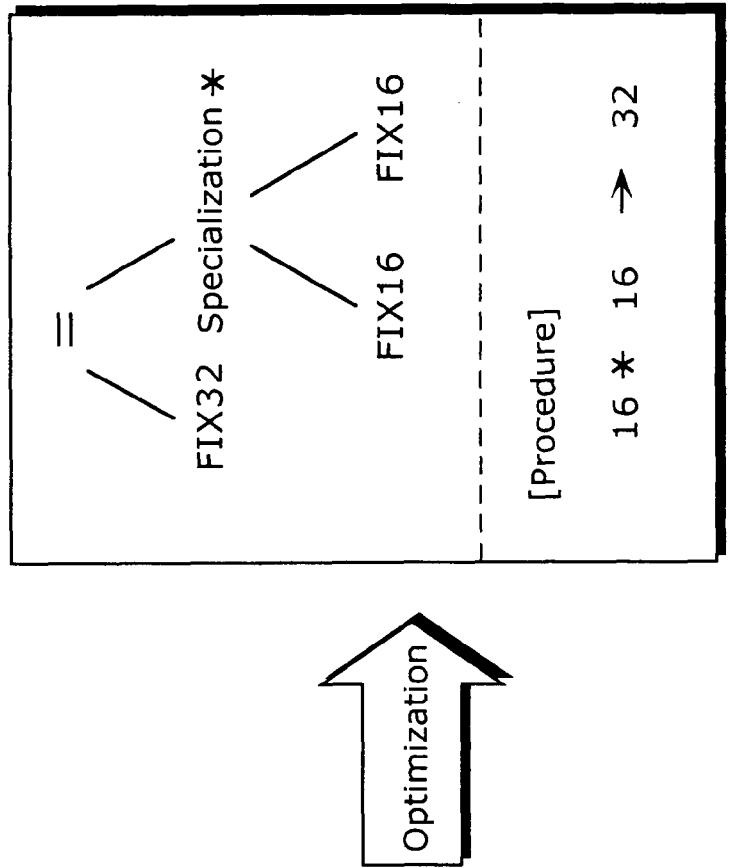
FIGS. 75A and 75B are diagrams showing an arithmetic tree to explain behaviors of the type conversion optimization unit of the optimization unit.
Figure 75A:
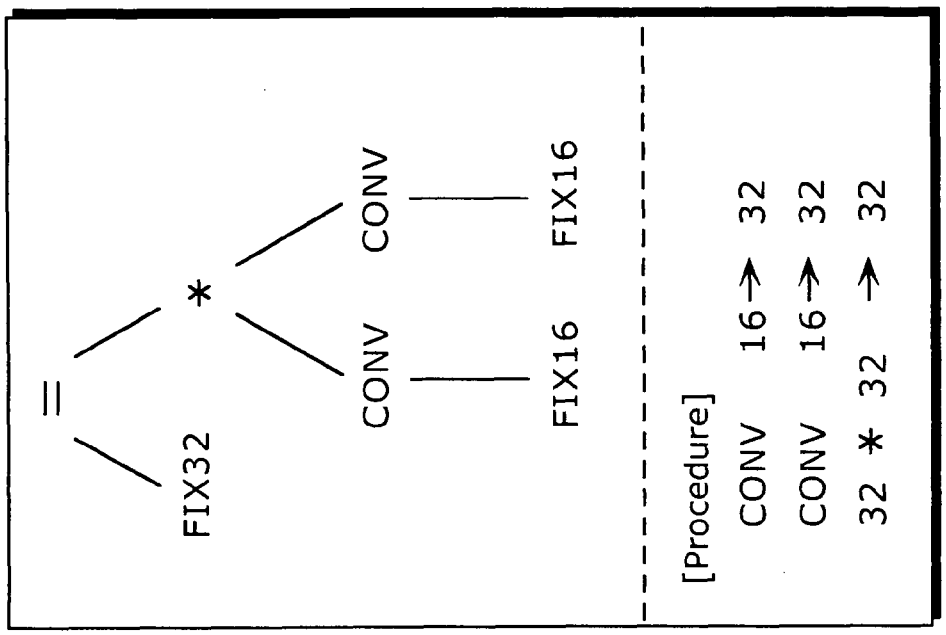

FIGS. 75A and 75B are diagrams showing an arithmetic tree to explain behaviors of the type conversion optimization unit 132 of the optimization unit 130. The type conversion optimization unit 132 generates a machine language instruction with the type conversion (such as fmulhw) to the operations of a certain notation in the source program to perform the efficient operations among different types.

In the ordinary C language, the type of the result of 16 bit×16 bit is 16 bit. An instruction of 16 bit×16 bit -->32 bit exists, but two different machine language instructions are generated as described below. For example, to the description of f32=f16*f16;

two instructions are generated:

| | |
|---|---|
| fmulhh | // 16bit x 16bit -> 16bit |
| asl | // 16bit -> type conversion of 32bit |

Consequently, when (FIX32)16 bit * (FIX32)16 bit is described in the source program, the type conversion optimization unit 132 ordinarily generates an arithmetic tree shown in FIG. 75A (a cord of the type conversion is generated) but one instruction (fmulhw) of 16 bit×16 bit -->32 bit by converting this arithmetic tree into the arithmetic tree shown in FIG. 75B.

FIGS. 76A and 76B are diagrams showing an example of a sample program to explain behaviors of the latency optimization unit 133. The latency optimization unit 133 executes scheduling a machine language instruction based on a directive concerning latency (designation of the number of cycles) in an assembler instruction (an optimized asm sentence) built in the source program 101 so that it takes execution time only the designated number of cycles in behaviors in a specific section or a specific behavior.

The user can set up the latency by two kinds of designation methods.

One method is to designate the latency among labels attached to the specific instructions like the designation in the program (LATENCY L1, L2, 2;) shown in FIG. 76A. In the example of FIG. 76A, the latency optimization unit 133 executes scheduling the allocation of the machine language instruction sequence so that only 2 cycles pass since the instruction wte is executed until the instruction rde is executed by the processor 1.

The other method is to designate the latencty on the instructions (rd, wt, rde, wte) that access the expansion register unit 80 until the instructions access the expansion register unit 80 the next time like the designation in the program (LATENCY (2) inside the instruction wte) shown in FIG. 76B. In the example of FIG. 76B, the latency optimization unit 133 executes scheduling the allocation of the machine language instruction sequence in order that only 2 cycles pass since the instruction wte is executed by the processor 1 and the expansion register unit 80 is accessed until the expansion register unit 80 is accessed again.

With the configuration of the latency like this, it is possible to execute the optimization (combining instructions, removing redundancy, sorting instructions and allocating registers) between the codes that have been in-line expanded and the codes that have not yet been in-line expanded and the latency between the designated instructions or accesses is secured. In other words, conventionally the user must insert explicitly a nop instruction but when he uses the compiler 100, all he must do is to designate a necessary latency for a necessary instruction or a necessary access.

FIGS. 77A-77C are diagrams explaining behaviors of the fixed point mode switch unit 111 of the parser unit 110.

When the fixed point mode switch unit 111 detects a pragma directive to save and return the fixed point mode ("#pragma _save_fxpmode func", for example) in the source program 101, the fixed mode switch 111 generates a machine language instruction to save and return the bit FXP of PSR 31 of the processor 1.

It should be noted that as the specifications on the fixed point that are premises, a_1 system (FIX16_1, FIX32_1) type and a _2 system (FIX16_2, FIX32_2) type exist; the mode is switched by one bit (FXP) of PSR31 in hardware (the processor 1); and further a condition that only single system can be used within a function exists.

Consequently, as the method for switching and using these two systems on the program, it is made a rule to designate a pragma ("#pragma _save_fxpmode" the name of a function) as a function that may be called by other systems. Hereby, the fixed point mode switch unit 111 inserts the codes corresponding to the save and the return of the FIX-type mode into the head and the tail of the function. Additionally, a FIX-type declaration of each function is searched; by which FIX-type declaration the function is compiled is decided; and the code to set up the mode is inserted.

FIG. 77A shows an example of a function with the pragma directive. The comment written in the right side of FIG. 77A is the insertion processing by the fixed point mode switch unit 111 and its concrete processing is shown in FIG. 77B.

An applied example of the pragma directive like this is shown in FIG. 77C. For example, regarding four functions, f11, f21, f22 and f23, when the function f11: _1 system calls the function f21: _2 system; the function f21: _2 system calls the function f22: _2 system; the function f22: _2 system calls the function f23: _2 system, since the only function that may be called by other modes is f21, it is possible to switch to a normal mode by executing a pragma designation only to this function.

As described above, using the compiler 100 according to the present embodiment, by cooperative processing between the operator definition file 102, the built-in function definition file 103 and the machine language instruction substitution unit 122, the user can declare and use the fixed point types of mode 0 and mode 1 as ordinary types and generate effectively high-functional machine language instructions that the processor 1 executes by calling the built-in functions at the level of a high-level language.

Additionally, with optimization of the arguments of the built-in functions by the argument optimization unit 131, machine language instructions with effective operands are generated. Moreover, with optimization of the type conversion by the type conversion optimization unit 132, an operation with a type conversion is converted into one high-functional machine language instruction that the processor 1 executes. Further, with the scheduling of machine language instructions by the latency optimization unit 133, the user can secure latency in the access between the specific instructions or to the expansion register without inserting the nop instruction.

Up to this point, the compiler according to the present invention has been explained based on the embodiment, but the present invention is not limited by this embodiment.

For example, in the present embodiment, the types of the fixed point are 16 bits or 32 bits and the decimal point is placed at the MSB or its lower digit, but the present invention is not limited to the format like this and it is acceptable that the type whose fixed points are 8 bits or 64 bits and whose decimal point is placed at another digit is a target.

Additionally, it is also acceptable to offer a behavior verification technique using a class library as a development support tool for the user.

Figure 78B:
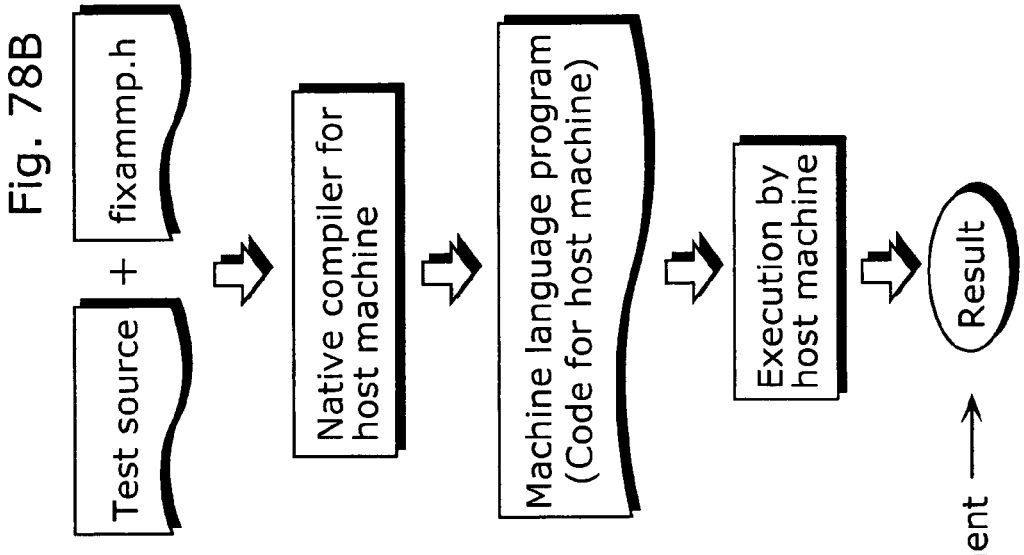
FIGS. 78A and 78B are diagrams explaining a behavior verification technique using a class library.
Figure 78A:
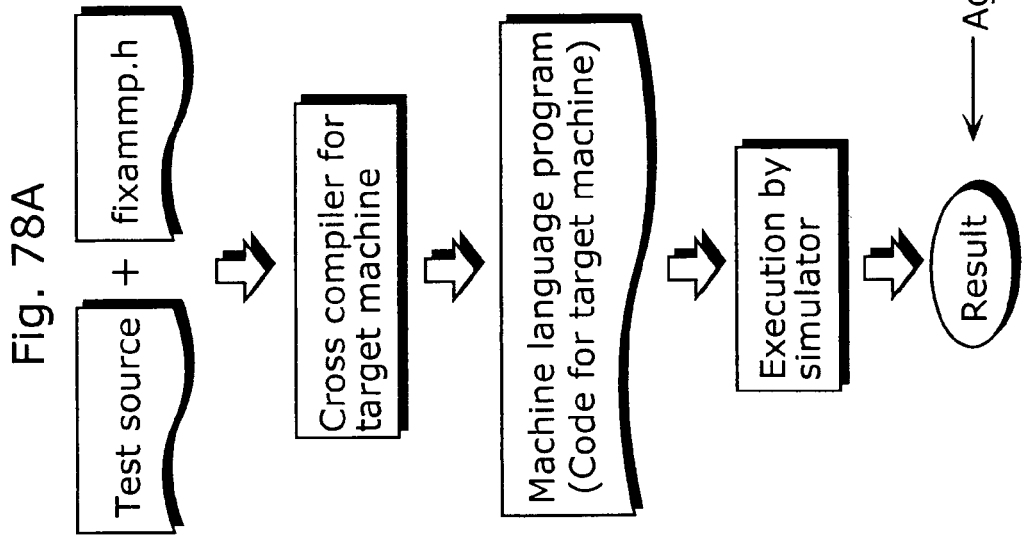

In other words, ordinarily, as is shown in FIG. 78A, the test source and the definition files 102 and 103 are compiled using the cross compiler (the compiler 100) for the target machine (the processor 1) according to the present embodiment; the behavior verification is performed by executing the obtained machine language program for the processor 1 with the special-purpose simulator. Instead of this, as is shown in FIG. 78B, it is acceptable that a class library (a definition file that associates the operator definition file 102 and the built-in function definition file 103 respectively with machine language instructions of a host machine not the processor 1) whose target is a host machine for development (a processor produced by Intel Corporation, for example) is prepared and compiled together with the test source, the definition files 102 and 103 by a native compiler (such as Visual C++ (R)), and the host machine executes the obtained machine language program as-is. Hereby, it is possible to execute a simulation in the familiar environment at high speed and perform the behavior verification.

Further, in the present embodiment, the operators and the built-in functions that are associated with the machine language instructions that are specific to the target processor are supplied as the header files (the definition files 102 and 103), but the compiler according to the present invention may be configured to incorporate the information of the definition files like these in the compiler itself. In other words, the compiler according to the present invention is an integral-type program into which the above-mentioned definition files 102 and 103 are incorporated and it is acceptable that the compiler is configured in order that the compiler that translates a source program into a machine language program, the program including operation definition information in which an operation that corresponds to a machine language instruction specific to a target processor is defined, the compilation method comprising: a parser step of analyzing the source program; an intermediate code conversion step of converting the analyzed source program into intermediate codes; an optimization step of optimizing the converted intermediate codes; and a code generation step of converting the optimized intermediate codes into machine language instructions, wherein the intermediate code conversion step includes: a detection sub-step of detecting whether or not any of the intermediate codes refer to the operation defined in the operation definition information; and a substitution sub-step of substituting the intermediate code with a corresponding machine language instruction, when the intermediate code is detected, and in the optimization step, the intermediate codes are optimized, the intermediate codes including the machine language instruction substituted for the intermediate code in the substitution sub-step. Hereby, the user does not need to include the definition files in the source program.

What is claimed is:

1. A compilation method for translating a source program into a machine language program, using operation definition information in which an operation that corresponds to a machine language instruction for a target processor is defined in a format of a function invocation, the compilation method comprising:
   a parser step of analyzing, using a processor, the source program; and
   a code generation step of generating machine language instructions including first instructions and second instructions from the analyzed source program which includes operations defined in the operation definition information, the first instructions corresponding to the operations, the second instructions not corresponding to the operations,
   wherein the code generation step includes a combining sub-step of combining the first instructions and the second instructions into one machine language instruction.

2. A compilation method for translating a source program into a machine language program, using operation definition information in which an operation that corresponds to a machine language instruction for a target processor is defined in a format of a function invocation, the compilation method comprising:
   a parser step of analyzing, using a processor, the source program; and
   a code generation step of generating machine language instructions including first instructions and second instructions from the analyzed source program which includes operations defined in the operation definition information, the first instructions corresponding to the operations, the second instructions not corresponding to the operations,
   wherein the code generation step includes a removing sub-step of removing redundancy between the first instructions and the second instructions.

3. A compilation method for translating a source program into a machine language program, using operation definition information in which an operation that corresponds to a machine language instruction for a target processor is defined in a format of a function invocation, the compilation method comprising:
   a parser step of analyzing, using a processor, the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

4. The compilation method according to claim 1, wherein the operations include a function that returns the number of bits of 1 included in input data, and one of the first instructions counts the number of bits of 1 of a value stored in a first register and stores the result in a second register.

5. The compilation method according to claim 1, wherein the operations include a function that returns a sign-expanded value based on bits extracted at designated bit positions from input data, and one of the first instructions takes out bits at the bit positions designated by a second register from a value stored in a first register, sign-expands said bits and stores the sign-expanded bits in a third register.

6. The compilation method according to claim 1, wherein the operations include a function that returns a zero-expanded value based on bits extracted at designated bit positions from input data, and one of the first instructions takes out bits at the bit positions designated by a second register from a value stored in a first register, zero-expands said bits and stores the zero-expanded bits in a third register.

7. The compilation method according to claim 2, wherein the operations include a function that returns the number of bits of 1 included in input data, and one of the first instructions counts the number of bits of 1 of a value stored in a first register and stores the result in a second register.

8. The compilation method according to claim 2, wherein the operations include a function that returns a sign-expanded value based on bits extracted at designated bit positions from input data, and one of the first instructions takes out bits at the bit positions designated by a second register from a value stored in a first register, sign-expands said bits and stores the sign-expanded bits in a third register.

9. The compilation method according to claim 2, wherein the operations include a function that returns a zero-expanded value based on bits extracted at designated bit positions from input data, and one of the first instructions takes out bits at the bit positions designated by a second register from a value stored in a first register, zero-expands said bits and stores the zero-expanded bits in a third register.

10. The compilation method according to claim 3, wherein the operations include a function that returns the number of bits of 1 included in input data, and one of the first instructions counts the number of bits of 1 of a value stored in a first register and stores the result in a second register.

11. The compilation method according to claim 3, wherein the operations include a function that returns a sign-expanded value based on bits extracted at designated bit positions from input data, and one of the first instructions takes out bits at the bit positions designated by a second register from a value stored in a first register, sign-expands said bits and stores the sign-expanded bits in a third register.

12. The compilation method according to claim 3, wherein the operations include a function that returns a zero-expanded value based on bits extracted at designated bit positions from input data, and one of the first instructions takes out bits at the bit positions designated by a second register from a value stored in a first register, zero-expands said bits and stores the zero-expanded bits in a third register.

13. A system comprising a target processor and a compiler apparatus for the target processor, the compiler apparatus using a compilation method for translating a source program into a machine language program, using operation definition information in which an operation that corresponds to a machine language instruction for the target processor is defined in a format of a function invocation, wherein the compilation method includes:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a combining sub-step of combining the first instructions and the second instructions into one machine language instruction.

14. A system comprising a target processor and a non-transitory computer-readable recording medium on which a compiler program for the target processor is recorded, the compiler program using a compilation method for translating a source program into a machine language program, using operation definition information in which an operation that corresponds to a machine language instruction for the target processor is defined in a format of a function invocation, wherein the compilation method includes:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a combining sub-step of combining the first instructions and the second instructions into one machine language instruction.

15. A system comprising a target processor and a server distributing a compiler through a transmission media, the compiler using a compilation method for translating a source program into a machine language program, using operation definition information in which an operation that corresponds to a machine language instruction for the target processor is defined in a format of a function invocation, the compilation method including:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a combining sub-step of combining the first instructions and the second instructions into one machine language instruction.

16. A target processor for which a compiler uses a compilation method for translating a source program into a machine language program, using operation definition information in which an operation that corresponds to a machine language instruction for the target processor is defined in a format of a function invocation, the compilation method including:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a combining sub-step of combining the first instructions and the second instructions into one machine language instruction.

17. A system comprising a target processor and a compiler apparatus for the target processor, the compiler apparatus using a compilation method for translating a source program into a machine language program, using operation definition information in which an operation that corresponds to a machine language instruction for the target processor is defined in a format of a function invocation, wherein the compilation method includes:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a removing sub-step of removing redundancy between the first instructions and the second instructions.

18. A system comprising a target processor and a non-transitory computer-readable recording medium on which a compiler program for the target processor is recorded, the compiler program using a compilation method for translating a source program into a machine language program, using operation definition information in which an operation that corresponds to a machine language instruction for the target processor is defined in a format of a function invocation, wherein the compilation method includes:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a removing sub-step of removing redundancy between the first instructions and the second instructions.

19. A system comprising a target processor and a server distributing a compiler through a transmission media, the compiler using a compilation method for translating a source program into a machine language program, using operation definition information in which an operation that corresponds to a machine language instruction for the target processor is defined in a format of a function invocation, the compilation method including:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a removing sub-step of removing redundancy between the first instructions and the second instructions.

20. A target processor for which a compiler uses a compilation method for translating a source program into a machine language program, using operation definition information in which an operation that corresponds to a machine language instruction for the target processor is defined in a format of a function invocation, the compilation method including:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a removing sub-step of removing redundancy between the first instructions and the second instructions.

21. A system comprising a target processor and a compiler apparatus for the target processor, the compiler apparatus using a compilation method for translating a source program into a machine language program, using operation definition information in which an operation that corresponds to a machine language instruction for the target processor is defined in a format of a function invocation, wherein the compilation method includes:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

22. A system comprising a target processor and a non-transitory computer-readable recording medium on which a compiler program for the target processor is recorded, the compiler program using a compilation method for translating a source program into a machine language program, using operation definition information in which an operation that corresponds to a machine language instruction for the target processor is defined in a format of a function invocation, wherein the compilation method includes:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

23. A system comprising a target processor and a server distributing a compiler through a transmission media, the compiler using a compilation method for translating a source program into a machine language program, using operation definition information in which an operation that corresponds to a machine language instruction for the target processor is defined in a format of a function invocation, the compilation method including:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

24. A target processor for which a compiler uses a compilation method for translating a source program into a machine language program, using operation definition information in which an operation that corresponds to a machine language instruction for the target processor is defined in a format of a function invocation, the compilation method including:

a parser step of analyzing the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

25. A method of executing a program outputted by a compiler which uses a compilation method for translating a source program into a machine language program, using operation definition information in which an operation that corresponds to a machine language instruction for a target processor is defined in a format of a function invocation, the compilation method including:

a parser step of analyzing, using a processor, the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a combining sub-step of combining the first instructions and the second instructions into one machine language instruction.

26. A method of executing a program outputted by a compiler which uses a compilation method for translating a source program into a machine language program, using operation definition information in which an operation that corresponds to a machine language instruction for a target processor is defined in a format of a function invocation, the compilation method including:

a parser step of analyzing, using a processor, the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a removing sub-step of removing redundancy between the first instructions and the second instructions.

27. A method of executing a program outputted by a compiler which uses a compilation method for translating a source program into a machine language program, using operation definition information in which an operation that corresponds to a machine language instruction for a target processor is defined in a format of a function invocation, the compilation method including:

a parser step of analyzing, using a processor, the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

28. An apparatus including a program outputted by a compiler which uses a compilation method for translating a source program into a machine language program, using operation definition information in which an operation that corresponds to a machine language instruction for a target processor is defined in a format of a function invocation, the compilation method including:

a parser step of analyzing, using a processor, the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a combining sub-step of combining the first instructions and the second instructions into one machine language instruction.

29. An apparatus including a program outputted by a compiler which uses a compilation method for translating a source program into a machine language program, using operation definition information in which an operation that corresponds to a machine language instruction for a target processor is defined in a format of a function invocation, the compilation method including:

a parser step of analyzing, using a processor, the source program; and a code generation step of generating machine language instructions including first instructions and second instructions from the analyzed source program which includes operations defined in the operation definition information, the first instructions corresponding to the operations, the second instructions not corresponding to the operations, wherein the code generation step includes a removing sub-step of removing redundancy between the first instructions and the second instructions.

30. An apparatus including a program outputted by a compiler which uses a compilation method for translating a source program into a machine language program, using operation definition information in which an operation that corresponds to a machine language instruction for a target processor is defined in a format of a function invocation, the compilation method including:

- a parser step of analyzing, using a processor, the source program; and
- a code generation step of generating machine language instructions including first instructions and second instructions from the analyzed source program which includes operations defined in the operation definition information, the first instructions corresponding to the operations, the second instructions not corresponding to the operations, wherein the code generation step includes a changing sub-step of changing an order of the first instructions and the second instructions.

* * * * *